US010962253B2

(12) United States Patent
Bertini et al.

(10) Patent No.: US 10,962,253 B2
(45) Date of Patent: Mar. 30, 2021

(54) SYSTEMS FOR CIRCULATING AIR INSIDE A MANHOLE VAULT

(71) Applicant: Novinium, Inc., Kent, WA (US)

(72) Inventors: Glen J. Bertini, Tacoma, WA (US); Mark Newton, Kent, WA (US); Donald R. Songras, Kent, WA (US); James Steele, Kent, WA (US)

(73) Assignee: NOVINIUM, INC., Kent, WA (US)

( * ) Notice: Subject to any disclaimer, the term of this patent is extended or adjusted under 35 U.S.C. 154(b) by 321 days.

(21) Appl. No.: 15/173,633

(22) Filed: Jun. 4, 2016

(65) Prior Publication Data

US 2016/0356522 A1    Dec. 8, 2016

Related U.S. Application Data

(63) Continuation-in-part of application No. 15/084,321, filed on Mar. 29, 2016.
(Continued)

(51) Int. Cl.
*F24F 13/02* (2006.01)
*E02D 29/14* (2006.01)
*F24F 7/08* (2006.01)
*F24F 7/04* (2006.01)
*F28F 3/02* (2006.01)
(Continued)

(52) U.S. Cl.
CPC .......... *F24F 13/029* (2013.01); *E02D 29/124* (2013.01); *E02D 29/1436* (2013.01); *F24F 7/04* (2013.01); *F24F 7/08* (2013.01); *F24F 11/72* (2018.01); *F24F 11/77* (2018.01); *F24F 11/89* (2018.01); *F24F 13/02* (2013.01); *F28F 3/02* (2013.01); *E02D 29/14* (2013.01); *F24F 11/61* (2018.01); *F24F 2007/004* (2013.01)

(58) Field of Classification Search
CPC .......... F24F 2007/004; F24F 7/04; F24F 7/08; F24F 11/61; F24F 11/72; F24F 11/77; F24F 11/89; F24F 13/02; F24F 13/029; E01C 9/10; E02D 29/124; E02D 29/1436; E02D 29/14; F28F 3/02; Y02B 30/746
USPC ....................................................... 454/48
See application file for complete search history.

(56) References Cited

U.S. PATENT DOCUMENTS 713,990 A    11/1902  Keith
1,163,189 A  12/1915  Wolf
(Continued)

FOREIGN PATENT DOCUMENTS

AU    2016277726    7/2017
CA    2952984       6/2017
(Continued)

OTHER PUBLICATIONS

Rudin et al., "A process for predicting manhole events in Manhattan," Mach Learn, 2010, 80: 1-31.
(Continued)

*Primary Examiner* — Steven B McAllister
*Assistant Examiner* — Allen R Schult
(74) *Attorney, Agent, or Firm* — Davis Wright Tremaine LLP; Heather M. Colburn; George C. Rondeau, Jr.

(57) ABSTRACT

A system for circulating air inside a manhole vault. The system includes an air-moving device in fluid communication with the manhole vault and configured to circulate the air inside the manhole vault to prevent a concentration of combustible gasses or to enhance cooling therein.

32 Claims, 51 Drawing Sheets

Related U.S. Application Data

(60) Provisional application No. 62/171,803, filed on Jun. 5, 2015.

(51) Int. Cl.
| | |
|---|---|
| *E02D 29/12* | (2006.01) |
| *F24F 11/77* | (2018.01) |
| *F24F 11/89* | (2018.01) |
| *F24F 11/72* | (2018.01) |
| *F24F 7/00* | (2006.01) |
| *F24F 11/61* | (2018.01) |

(56) References Cited

U.S. PATENT DOCUMENTS

| | | | |
|---|---|---|---|
| 2,156,166 | A | 4/1939 | Smith |
| 3,302,658 | A | 2/1967 | Frees |
| 3,610,524 | A | 10/1971 | Wallen |
| 3,864,437 | A | 2/1975 | Blaszkowski |
| 4,030,851 | A | 6/1977 | Graybeal |
| 4,101,236 | A | 7/1978 | Meyer |
| 4,285,269 | A * | 8/1981 | Pelsue ............ E03F 5/08 454/338 |
| 4,315,579 | A | 2/1982 | Martin, Jr. |
| 4,408,421 | A | 10/1983 | Pai |
| 4,508,486 | A | 4/1985 | Tinker |
| 4,532,491 | A | 7/1985 | Rau et al. |
| 4,567,939 | A | 2/1986 | Dumbeck |
| 4,593,714 | A | 6/1986 | Madden |
| 4,953,450 | A | 9/1990 | Remondino |
| 5,051,022 | A | 9/1991 | Bowman |
| 5,062,735 | A | 11/1991 | Gaudin |
| 5,201,151 | A | 4/1993 | LeBlanc et al. |
| 5,209,697 | A | 5/1993 | Hurst et al. |
| 5,739,463 | A | 4/1998 | Diaz et al. |
| 5,820,828 | A | 10/1998 | Ferone |
| 5,911,537 | A | 6/1999 | Pulver |
| 5,980,065 | A | 11/1999 | Wooderson |
| 6,012,532 | A | 1/2000 | Kiefer et al. |
| 6,168,514 | B1 * | 1/2001 | Weston ............ E03F 5/08 454/48 |
| 6,338,637 | B1 | 1/2002 | Muench, Jr. et al. |
| 6,457,901 | B1 | 10/2002 | Sondrup |
| 6,489,554 | B1 | 12/2002 | Bertini et al. |
| 6,617,973 | B1 | 9/2003 | Osterman |
| 6,743,088 | B2 | 6/2004 | Closkey |
| 6,848,465 | B1 | 2/2005 | Ledbetter |
| 6,851,225 | B1 | 2/2005 | Harr et al. |
| 7,195,504 | B2 | 3/2007 | Bertini et al. |
| 7,353,601 | B1 | 4/2008 | Bertini |
| 7,611,748 | B2 | 11/2009 | Bertini |
| 7,768,413 | B2 | 8/2010 | Kosuge et al. |
| 7,932,466 | B2 | 4/2011 | Sanders |
| 7,944,352 | B2 | 5/2011 | Drake et al. |
| 8,493,223 | B2 | 7/2013 | Zadnikar et al. |
| 8,851,791 | B1 | 10/2014 | Putnam |
| 8,926,414 | B1 | 1/2015 | Kirkpatrick |
| 8,946,548 | B2 | 2/2015 | Sanders |
| 8,976,038 | B2 | 3/2015 | Miller, II et al. |
| 9,100,728 | B2 | 8/2015 | Higgins et al. |
| 9,151,431 | B2 | 10/2015 | Kiest, Jr. |
| 9,276,399 | B2 | 3/2016 | Sales Casals et al. |
| 9,541,432 | B2 | 1/2017 | Kertesz et al. |
| 9,546,466 | B2 | 1/2017 | Wander |
| 9,605,403 | B1 | 3/2017 | Putnam |
| 2002/0166759 | A1 | 11/2002 | Mabry et al. |
| 2005/0109764 | A1 | 5/2005 | Kopel |
| 2006/0284857 | A1 | 12/2006 | Oh |
| 2008/0173467 | A1 | 7/2008 | Bertini et al. |
| 2009/0027061 | A1 | 1/2009 | Curt et al. |
| 2011/0148647 | A1 | 6/2011 | Miller, II |
| 2011/0244702 | A1 | 10/2011 | Bertini et al. |
| 2012/0028560 | A1 | 2/2012 | Nikolic |
| 2012/0270488 | A1 | 10/2012 | Fujimura et al. |
| 2013/0092029 | A1 * | 4/2013 | Morgan ............ B01D 53/30 96/111 |
| 2014/0150286 | A1 * | 6/2014 | Jadhav ............ A47L 15/0034 34/443 |
| 2014/0227954 | A1 | 8/2014 | Sone et al. |
| 2015/0056908 | A1 | 2/2015 | Chapel et al. |
| 2015/0075201 | A1 | 3/2015 | Park et al. |
| 2015/0118946 | A1 | 4/2015 | Yeon |
| 2015/0276818 | A1 | 10/2015 | Nulty |
| 2015/0323510 | A1 | 11/2015 | Huynh et al. |
| 2015/0345819 | A1 | 12/2015 | Ostrovsky |
| 2016/0274176 | A1 | 9/2016 | Di Stefano et al. |
| 2016/0356521 | A1 | 12/2016 | Bertini et al. |
| 2016/0356522 | A1 | 12/2016 | Bertini et al. |
| 2017/0228998 | A1 | 8/2017 | Fu et al. |
| 2019/0166413 | A1 | 5/2019 | Klinger et al. |

FOREIGN PATENT DOCUMENTS

| | | |
|---|---|---|
| CN | 204475375 | 7/2015 |
| CN | 106284422 | 1/2017 |
| DE | 1010464 | 6/1957 |
| DE | 2857528 | 8/1980 |
| DE | 8419395 | 10/1984 |
| DE | 202007006848 | 9/2007 |
| EP | 0372545 | 6/1990 |
| EP | 0952263 | 10/1999 |
| EP | 1473414 | 11/2004 |
| EP | 1486619 | 12/2004 |
| EP | 1635000 | 3/2006 |
| EP | 3206028 | 8/2017 |
| FR | 2450912 | 10/1980 |
| GB | 2521217 | 6/2015 |
| JP | H03156035 | * 7/1991 |
| JP | H06272268 | 9/1994 |
| JP | H11118649 | 4/1999 |
| JP | H11148880 | 6/1999 |
| JP | 200494863 | 4/2004 |
| JP | 2009281982 | 12/2009 |
| JP | 2012162852 | 8/2012 |
| JP | 2013167078 | * 8/2013 |
| JP | 2015042816 | 3/2015 |
| KR | 20060083777 | 7/2006 |
| WO | 2004018787 | 3/2004 |
| WO | 2016033653 | 3/2016 |

OTHER PUBLICATIONS

Siemens, Inc., Report #R55-11, "Investigation of Manhole Incidents Occurring Around and in the Underground Distribution System of the Potomac Electric Power Company," Jun. 30, 2011.
International Search Report and Written Opinion, dated Aug. 25, 2016, received in International Application No. PCT/US2016/035934.
Non-Final Office Action, dated Mar. 28, 2018, received in U.S. Appl. No. 15/084,321.
Final Office Action, dated Oct. 5, 2018, received in U.S. Appl. No. 15/084,321.
International Search Report and Written Opinion, dated Aug. 5, 2016, received in International Application No. PCT/US2016/030282.
International Search Report and Written Opinion, dated Sep. 7, 2017, received in International Application No. PCT/US2017/030255.
International Search Report and Written Opinion, dated Sep. 12, 2017, received in International Application No. PCT/US2017/25601.
Information Disclosure Sheet Transmittal submitted herewith.
U.S. Appl. No. 16/114,697, filed Aug. 28, 2018.
U.S. Appl. No. 16/162,260, filed Oct. 16, 2018.
U.S. Appl. No. 16/189,639, filed Nov. 13, 2018.
U.S. Appl. No. 16/190,832, filed Nov. 14, 2018.
U.S. Appl. No. 16/208,098, filed Dec. 3, 2018.
U.S. Appl. No. 16/208,219, filed Dec. 3, 2018.
U.S. Appl. No. 16/207,633, filed Dec. 3, 2018.

(56) References Cited

OTHER PUBLICATIONS

U.S. Appl. No. 16/208,120, filed Dec. 3, 2018.
U.S. Appl. No. 16/219,137, filed Dec. 13, 2018.
U.S. Appl. No. 16/234,246, filed Dec. 27, 2018.
U.S. Appl. No. 16/514,530, filed Jul. 17, 2019.
Information Disclosure Statement Transmittal filed herewith.
Non-Final Office Action, dated Aug. 22, 2019, received in U.S. Appl. No. 15/476,775.
Extended European Search Report, dated Apr. 17, 2019, received in European Application No. 16803923.8.
Extended European Search Report, dated Oct. 28, 2019, received in European Application No. 17776872.8.
Non-Final Office Action, dated Oct. 31, 2019, received in U.S. Appl. No. 15/084,321.
McDermott, Mike, "London County Counsil small vented cover," https://www.flickr.com/photos/mikegmcdermott/23299770406/in/photostream/ (Year: 2013).
Non-Final Office Action, dated Aug. 27, 2020, received in U.S. Appl. No. 16/114,697.

\* cited by examiner

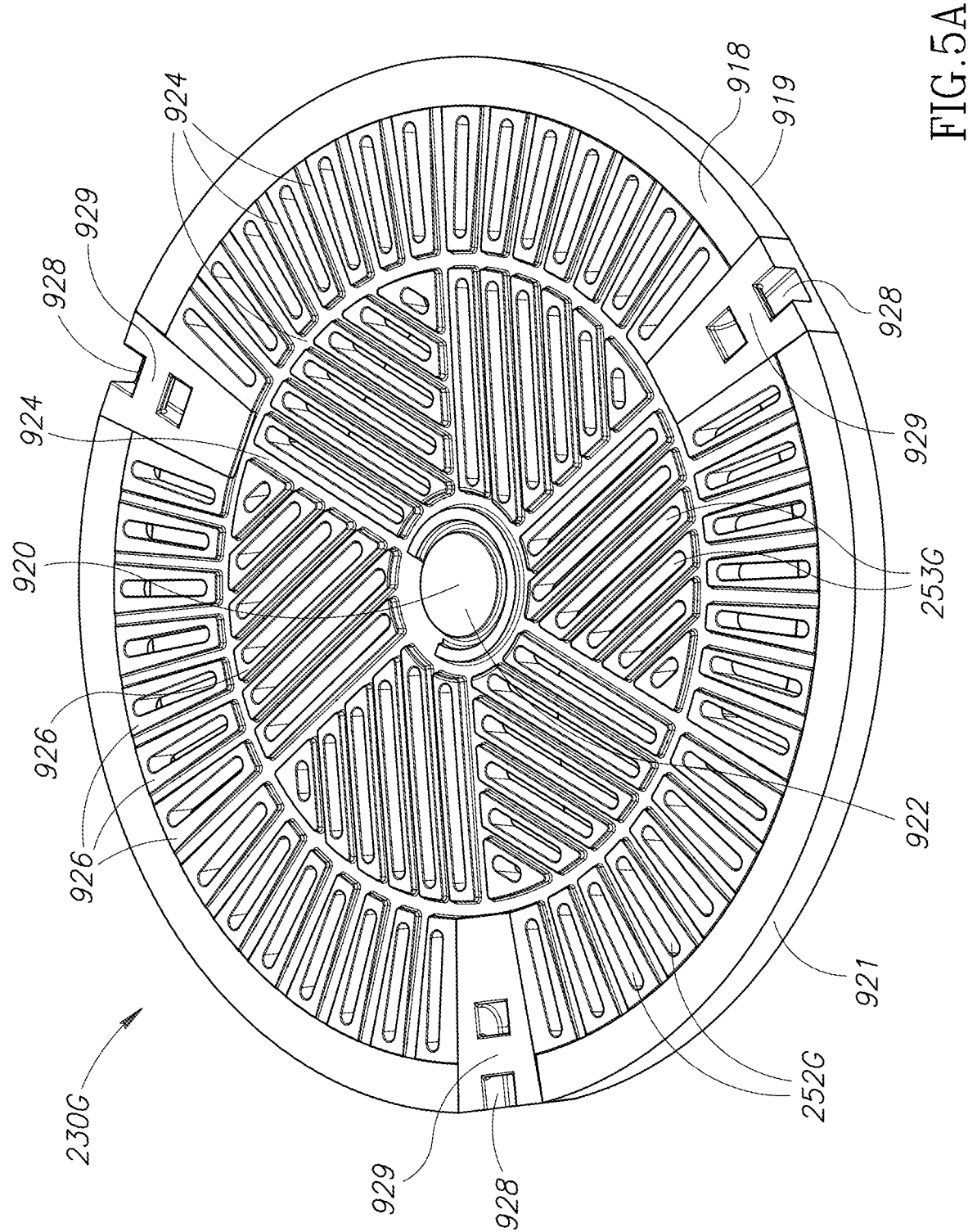

SYSTEMS FOR CIRCULATING AIR INSIDE A MANHOLE VAULT

CROSS REFERENCE TO RELATED APPLICATION(S)

This application is a continuation-in-part of U.S. patent application Ser. No. 15/084,321, filed on Mar. 29, 2016, and claims the benefit of U.S. Provisional Application No. 62/171,803, filed on Jun. 5, 2015, both of which are incorporated herein by reference in their entireties.

BACKGROUND

Field of the Invention

The present invention is directed generally to methods and devices for circulating gases inside underground chambers, such as manhole vaults.

Description of the Related Art

Underground utilities, such as water, sewer, natural gas, electricity, telephone, cable, and steam, are a common means of delivering the essentials of modern life in a developed society. Referring to FIG. 1, such utilities are often routed through an underground system 10 that includes a plurality of substantially identical underground chambers or manhole vaults 12 and 14 interconnected by one or more conduits 20A-20C. The vaults 12 and 14 may each be configured to house critical control equipment, monitoring equipment, and appropriate network connections.

As shown in FIG. 1, the vaults 12 and 14 and the conduit(s) 20A-20C are positioned below a street or sidewalk level (identified as a surface 30). In FIG. 1, only the two vaults 12 and 14 of the system 10 have been illustrated. However, the system 10 may include any number of vaults each substantially similar to one of the vaults 12 and 14. Similarly, only the three conduits 20A-20C have been illustrated. However, the system 10 may include any number of conduits each substantially similar to one of the conduits 20A-20C.

Because the vaults 12 and 14 are substantially identical to one another, for the sake of brevity, only the vault 12 will be described in detail. In FIG. 1, equipment (e.g., electrical equipment), commonly found within the vault 12 has been omitted for the sake of clarity. The vault 12 has an interior 50 with a rectangular prism-shaped main chamber 52. The main chamber 52 is defined by one or more sidewalls 54 that extend between a ceiling 56 and a floor 58. The conduits 20A-20C may pass at least partially through the main chamber 52. A cylindrical passageway 60 (also referred to as a "neck") defined by one or more wall(2) 64 provides personnel access (e.g., for a worker 61) to the main chamber 52 from the surface 30. The neck 60 is usually about 3 feet in diameter and generally extends at least about 3 feet below the surface 30. The neck 60 leads to a manhole 62, which is traditionally capped with a conventional manhole cover, such as a vented manhole cover 70 (see FIG. 2). The vented manhole cover 70 illustrated in FIG. 2 is a design often employed by Consolidated Edison ("ConEd") of New York. The manhole cover (e.g., the vented manhole cover 70 illustrated in FIG. 2) is fitted within a recess 63 in the manhole 62 and provides a measure of security with respect to pedestrian and vehicular traffic.

Underground electrical utilities are typically preferred over above ground systems because underground systems make efficient use of limited surface and air space in urban environments and preserve aesthetics in suburban environments. Underground systems are generally more secure than overhead circuits and, when well maintained, provide reliable service to the public. Underground systems may be configured to conduct low voltage, medium voltage, and/or high-voltage electricity.

Unfortunately, underground electrical utilities also present fire and/or explosion hazards proximate to areas of human habitation. For example, while the conduits 20A-20C provide passageways between the vaults 12 and 14 for interconnecting electrical cables, the conduits 20A-20C also allow air, gases, vapors, and water to enter the interiors 50 of the vaults 12 and 14. It is not unusual for such underground vaults and conduits to fill with water depending on the surface topography, water table, recent precipitation and recent snow melt brought on through the use of salts or chemicals. Water also enters through the cover. Particularly with low voltage cables, water allows for electro-chemical breakdown of the insulation to occur through tracking of cables in ducts (i.e., electrical discharge along degraded insulation) and electrical equipment failures inside one or more of the vaults 12 and 14, which produce hazardous concentrations of explosive and flammable gases within one or more of the vaults 12 and 14. Because air can never be excluded entirely from the vault 12, manhole events may result. Manhole events include both minor incidents (such as smoke or small fires) and/or major events (such as sustained fires and explosions). At best, a minor incident is likely to cause an electrical power outage. At worst, a major event, such as an explosion, can occasionally propel a manhole cover skyward causing property damage, injuries, and even death.

According to a paper by Rudin et al. ("A process for predicting manhole events in Manhattan," Mach Learn (2010) 80: 1-31), there were 6670 "serious event tickets" written for a total of 250,000 manholes in the ConEd (N.Y.) system over a ten-year period ending in 2006. In other words, the chance that a manhole will have a serious event in a given year is about 1 in 375. Incident rates in this range suggest, at a minimum, a need for regular inspection and maintenance of manhole vaults. Surprisingly, a report prepared for a Washington, D.C. utility indicated that such routine visits did not reduce the incidence rate of serious events (Siemens, Inc., Report #R55-11, "Investigation of Manhole Incidents Occurring Around and in the Underground Distribution System of the Potomac Electric Power Company," Jun. 30, 2011). Thus, other, more proactive measures are often employed, but as indicated in the following examples, each has been shown to have at least one major shortcoming.

For example, the manhole cover may be tethered (e.g., to the surface 30) to prevent the manhole cover from being launched beyond the length of the tether in the event of an explosion. Unfortunately, this approach does not prevent smoke and/or flames from spilling out of the manhole, which presents an unacceptable public hazard, or at least a nuisance.

Another approach is to substitute a light-weight manhole cover in place of the typically heavy metal manhole cover. This approach can reduce damage to structures, vehicles, and people because the light-weight manhole cover will lift more quickly in the event of an explosion. But, as with the aforementioned tethering approach, the issues of smoke and flames remain. Additional drawbacks to this approach include initial cost and questionable service life.

Some have suggested using electronic sensors to monitor the vault environment and transmit warning notices but this mitigation method is relatively expensive. Further, the electronics employed are somewhat unreliable given the usually harsh environment inside the vault and required long life-spans.

Yet another approach is to seal the conduits 20A-20C (that may house electrical cables) running between vaults 12 and 14 to minimize air entry therein, which produces a fuel-rich, oxygen-starved, environment inside the conduits 20A-20C. Unfortunately, this fuel-rich environment includes flammable gases that ultimately find ways out of the conduits 20A-20C (whether plugged or not) and into one or more of the vault(s) 12 and 14 connected to the conduits 20A-20C. This collection of flammable gases inside one or more of the vaults 12 and 14 can result in a manhole explosion that is more dangerous than a manhole that is merely smoking (referred to as a "smoker").

Some (see U.S. Pat. No. 6,012,532) have proposed limiting airflow within the vault by positioning an inflatable bladder inside the vault and filling the bladder with an inert gas that expands the bladder into the open volume in the vault. Unfortunately, this approach is impractical because the bladder must be deflated and re-inflated each time the manhole vault requires access, which is a large amount of work.

Referring to FIG. 2, using yet another approach, ConEd has installed vented manhole covers (like the vented manhole cover 70) that allow dangerous vault gases to escape from the vault. Unfortunately, vent openings or holes (e.g., vent holes 72) in the vented manhole cover present drawbacks of their own. The vented manhole cover 70 provides about 25% open space but contains no water mitigating features. Thus, the vent holes 72 allow more precipitation and corrosive road chemicals (e.g., road salt and other deicers) to enter the vault and such ingress has been implicated in circuit failures and manhole events. They also increase the likelihood that hazardous liquids, trash, human waste, and/or vermin will enter the vault—all of which can produce flammable vapors, either directly (e.g., a fuel spill) or indirectly by biodegradation of organic materials. Finally, the vent holes 72 can invite disposal of bio-hazards, such as used hypodermic syringes, into the vault, which slow any required maintenance because special procedures are necessary before personnel can enter the vault.

It is therefore apparent that a need exists for methods, equipment, and/or apparatus that effectively reduce the frequency and/or severity of manhole events. The present application provides these and other advantages as will be apparent from the following detailed description and accompanying figures.

BRIEF DESCRIPTION OF THE SEVERAL VIEWS OF THE DRAWING(S)

FIG. 5A is a perspective view of a top side of a manhole cover of the circulation system of FIG. 4.

Like reference numerals have been used to identify like components in the figures.

DETAILED DESCRIPTION OF THE INVENTION

Overview

Figure 1:
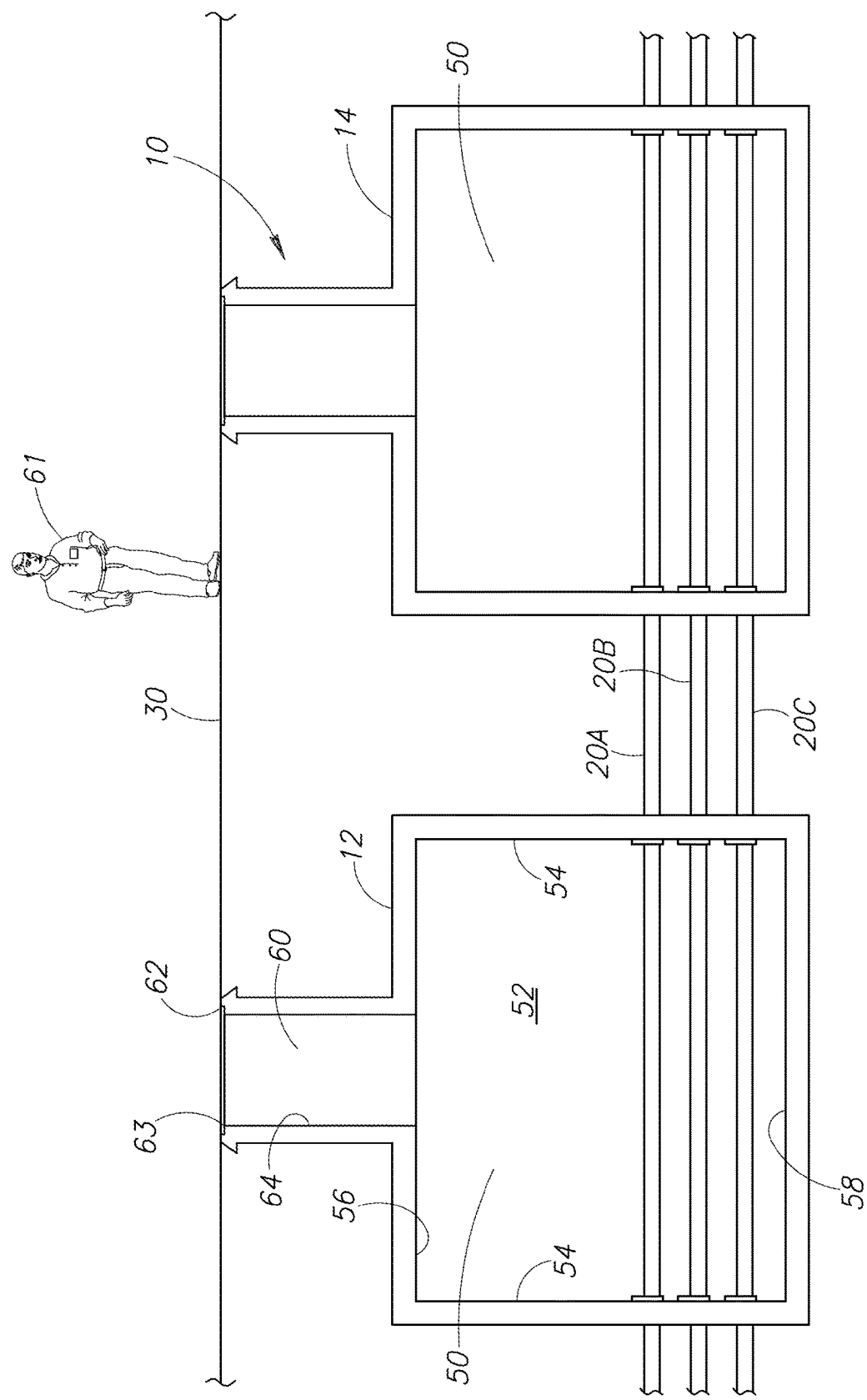
FIG. 1 is a cross-sectional view of a prior art underground system including a plurality of manhole vaults interconnected by a plurality of conduits.
Figure 3:
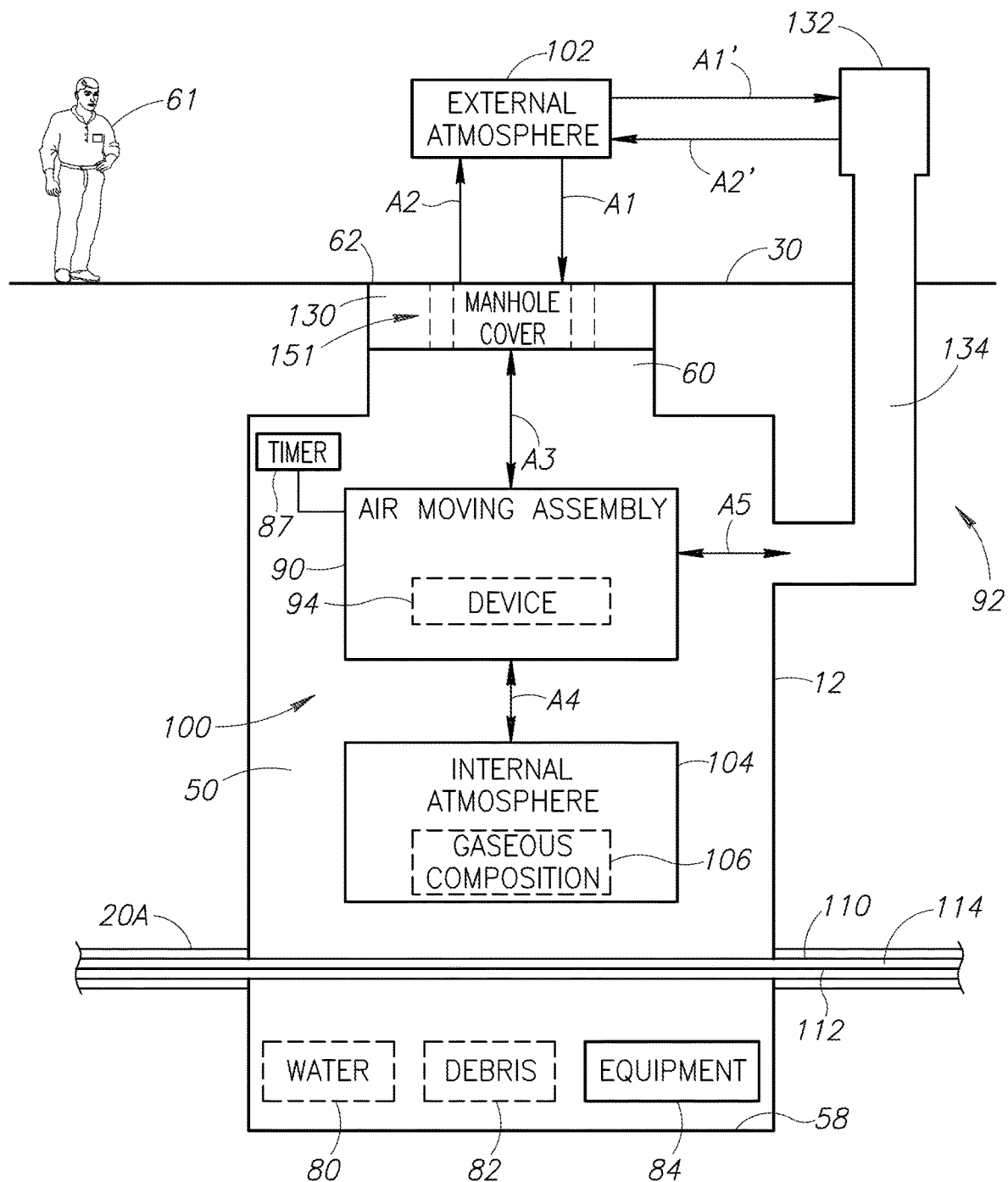
FIG. 3 is a block diagram of a circulation system for use in at least one of the manhole vaults of the underground system of FIG. 1.

FIG. 3 is block diagram of a circulation system 100 for use in one or more of the vaults 12 and 14 (see FIG. 1) of the underground system 10 (see FIG. 1). In FIG. 3, the circulation system 100 has been illustrated as being installed in the vault 12. For ease of illustration, the conduits 20B and 20C (see FIG. 1) have been omitted from FIG. 3. In the embodiment illustrated, each of the conduits 20A-20C (see FIG. 1) houses a cable 110 that has a conductor 112 surrounded by an outer layer 114 constructed from one or more cable insulation materials and/or cable shield materials. The vault 12 may house equipment 84 (e.g., electrical equipment). The vault 12 may also house undesirable materials, such as water 80 (e.g., flood water) and/or debris 82 (e.g., hazardous liquids, road salt, trash, human waste, vermin, hypodermic syringes, etc.).

The circulation system 100 includes an air moving assembly 90 and an interface 92 between an external atmosphere 102 (e.g., above the surface 30) outside the vault 12 and an internal atmosphere 104 inside the vault 12. The internal atmosphere 104 may include an undesired (and potentially dangerous) gaseous composition 106. The gaseous composition 106 may be non-uniformly distributed within the interior 50 of the vault 12. For example, the gaseous composition 106 may be adjacent or near the floor 58. Gases (that contribute to the gaseous composition 106) may result from electrochemical degradation of the outer layer 114 or a portion thereof (e.g., cable insulation). Further, electrical tracking may heat and decompose the outer layer 114 or a portion thereof (e.g., cable insulation) to create gases (that contribute to the gaseous composition 106).

All or a portion of the air moving assembly 90 may be positioned inside the internal atmosphere 104 of the vault 12. By way of another non-limiting example, the air moving assembly 90 may be positioned outside the vault 12 (e.g., in a manhole cover 130 or within a ventilation stack 132). Optionally, the air moving assembly 90 may include an air-moving device 94 (e.g., a blower, a heater, and the like). However, this is not a requirement.

When present, the air-moving device 94 may be controlled at least in part by a timer 87 that may be positioned inside or outside the vault 12. The timer 87 may be operable to turn the air-moving device 94 on or off at predetermined times. In this manner, the timer 87 may cycle the air-moving device 94 on/off at predetermined times (e.g., regular intervals, scheduled times, and the like). For example, the timer 87 may run the air-moving device 94 less than about 5 minutes every hour or less than about 15 minutes every hour.

The interface 92 may be implemented as the manhole cover 130 and/or the ventilation duct or ventilation stack 132. The ventilation stack 132 may be an existing external ventilation duct or ventilation stack (e.g., of the type currently in use in California).

In embodiments in which the interface 92 includes the manhole cover 130, the manhole cover 130 may include one or more through-holes 151. As will be described below, the manhole cover 130 may be configured to help prevent the ingress of water, debris, and other materials into the vault 12. A portion of the external atmosphere 102 (represented by an arrow A1) may to pass through the through-holes 151 of the manhole cover 130 and enter the internal atmosphere 104. On the other hand, a portion of the internal atmosphere 104 (represented by an arrow A2) may pass through the through-holes 151 of the manhole cover 130 and enter the external atmosphere 102. Optionally, the manhole cover 130 may be removably coupled to the air moving assembly 90.

In embodiments in which the interface 92 includes the manhole cover 130, the manhole cover 130 may be supported by a manhole ring support 250G (see FIGS. 4, 6, 9, 10, 13, 14, 16, 24, 30, 34, 39, 45A, and 45B) that is positioned inside the manhole 62. The manhole cover 130 rests on a ring-shaped bearing surface or ledge 254G (see FIG. 13) formed in the manhole ring support 250G. The ring support 250G also has an inside surface 256G (see FIG. 13) positioned below the ledge 254G (see FIG. 13) that faces into the neck 60. An optional waterproof seal (not shown), such as a gasket, an O-ring, putty, caulk, etc., may be positioned between the manhole cover 130 and the manhole ring support 250G. The seal (not shown) is configured to prevent water ingress into vault 12 from between the manhole cover 130 and the manhole ring support 250G.

In embodiments in which the interface 92 is the ventilation stack 132, the ventilation stack 132 provides a passageway 134 in fluid communication with both the external and internal atmospheres 102 and 104. Thus, a portion of the external atmosphere 102 (represented by an arrow A1') may pass through the passageway 134 and enter the internal atmosphere 104. On the other hand, a portion of the internal atmosphere 104 (represented by an arrow A2') may pass through the passageway 134 and enter the external atmosphere 102.

The arrows A1 and A1' represent exterior (fresh) air flowing from the external atmosphere 102 into the internal atmosphere 104. On the other hand, the arrows A2 and A2' represent interior (stale and/or contaminated) air flowing from the internal atmosphere 104 into the external atmosphere 102. Together, the arrows A1 and A2 represent an air exchange between the external and internal atmospheres 102 and 104 through the manhole cover 130, and the arrows A1' and A2' represent an air exchange between the external and internal atmospheres 102 and 104 through the ventilation stack 132.

The air moving assembly 90 causes the air exchange represented by one or more of the arrows A1, A1', A2, and A2'. In other words, in embodiments in which the interface 92 includes the manhole cover 130, the air moving assembly 90 may cause at least a portion of the internal atmosphere 104 (represented by the arrow A2) to be expelled outwardly from the vault 12 through the through-holes 151 in the manhole cover 130, and/or at least a portion of the external atmosphere 102 (represented by the arrow A1) to be drawn into the vault 12 through the through-holes 151 in the manhole cover 130. In embodiments in which the interface 92 includes the ventilation stack 132, the air moving assembly 90 may cause at least a portion of the internal atmosphere 104 (represented by the arrow A2') to be expelled outwardly from the vault 12 through the passageway 134 and/or at least a portion of the external atmosphere 102 (represented by the arrow A1') to be drawn into the vault 12 through the passageway 134. Optionally, the air-moving device 94 may be external to the vault. For example, as will be described below, the air-moving device 94 may be located within the ventilation stack 132.

In embodiments in which the interface 92 includes the manhole cover 130, double-headed arrows A3 and A4 represent airflow inside the vault 12 generated by the air moving assembly 90. In such embodiments, the air moving assembly 90 may be configured to push (e.g., blow) internal air toward the through-holes 151 of the manhole cover 130, pull (e.g., suck) external air in through the through-holes 151 of the manhole cover 130, or both. In embodiments in which the interface 92 includes the ventilation stack 132, double-headed arrows A4 and A5 represent airflow inside the vault 12 generated by the air moving assembly 90. In such embodiments, the air moving assembly 90 may be configured to push (e.g., blow) internal air into the passageway 134 of the ventilation stack 132, pull (e.g., blow) external air in through the passageway 134 of the ventilation stack 132, or both.

The conduits 20A-20C (see FIG. 1) interconnecting the vaults 12 and 14 (see FIG. 1) provide passageways through which air (and other gases) may travel between the vaults 12 and 14 of the system 10 (see FIG. 1). The air moving assembly 90 may cause air (and other gases) to flow into the internal atmosphere 104 from one or more of the conduits 20A-20C (see FIG. 1) and/or one or more of the neighboring vaults (via the conduits 20A-20C). Additionally, the air moving assembly 90 may cause air (and other gases) to flow out of the internal atmosphere 104 into one or more of the conduits 20A-20C (see FIG. 1) and potentially into one or more neighboring vaults (via the conduits 20A-20C). In other words, the air moving assembly 90 may move air between a particular vault (e.g., the vault 12) and one or more of the conduits 20A-20C (see FIG. 1). Further, the air moving assembly 90 may move air between a particular vault (e.g., the vault 12) and one or more neighboring vaults via the conduits 20A-20C (see FIG. 1).

The following embodiments provide exemplary implementations of the circulation system 100.

First Embodiment

Figure 4:
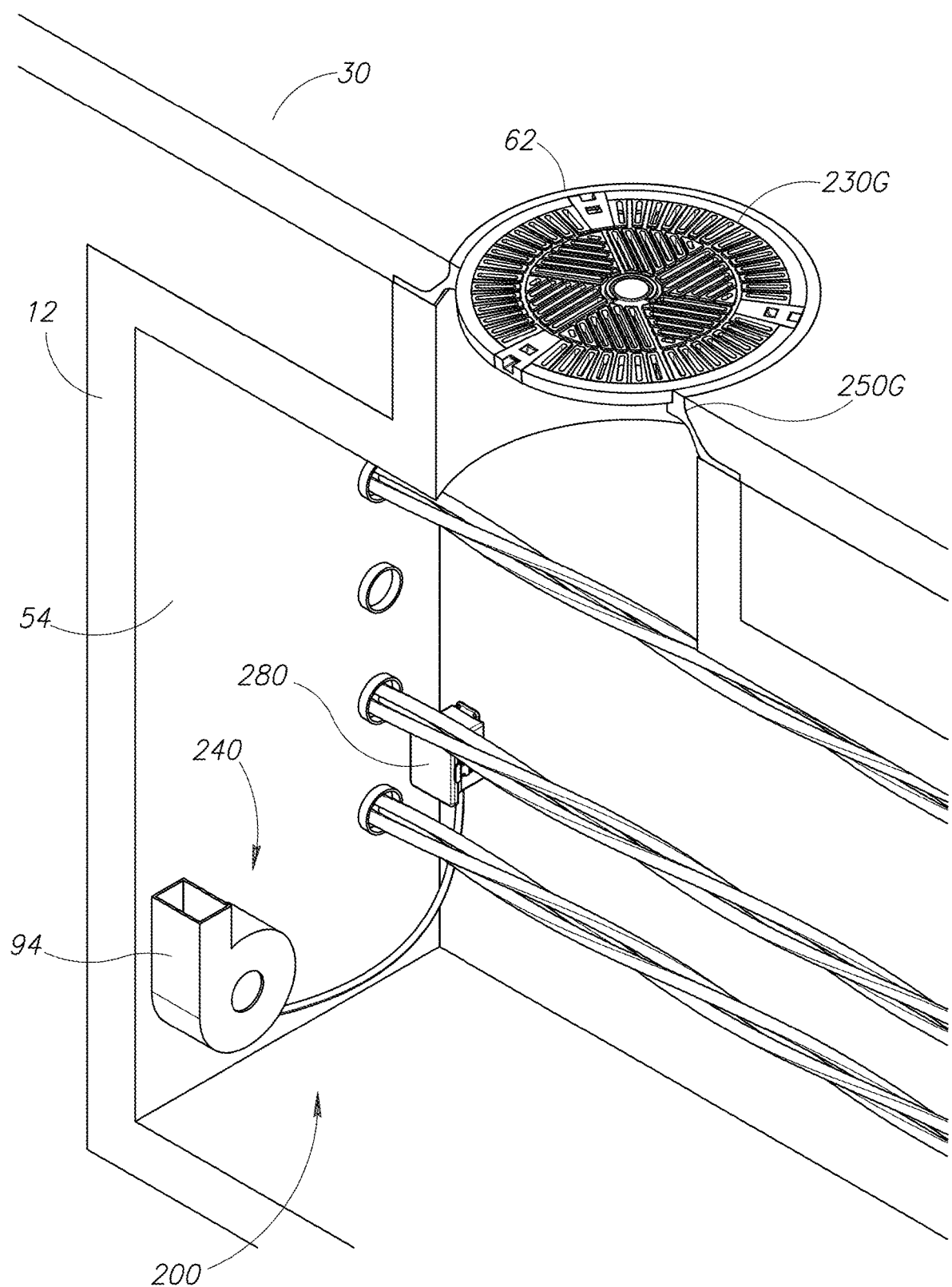
FIG. 4 is a perspective view of a first embodiment of the circulation system.

FIG. 4 depicts a first embodiment of a circulation system 200 that is an exemplary implementation of the circulation system 100 (see FIG. 3). In this embodiment, the interface 92 (see FIG. 3) includes a manhole cover 230G (positioned on the ring support 250G inside the manhole 62) and the air moving assembly 90 (see FIG. 3) is implemented as an air moving assembly 240 that includes the air-moving device 94. The circulation system 200 may include the ventilation stack 132 (see FIG. 3). However, this is not a requirement and the ventilation stack 132 (see FIG. 3) has been omitted from FIG. 4.

Figure 5B:
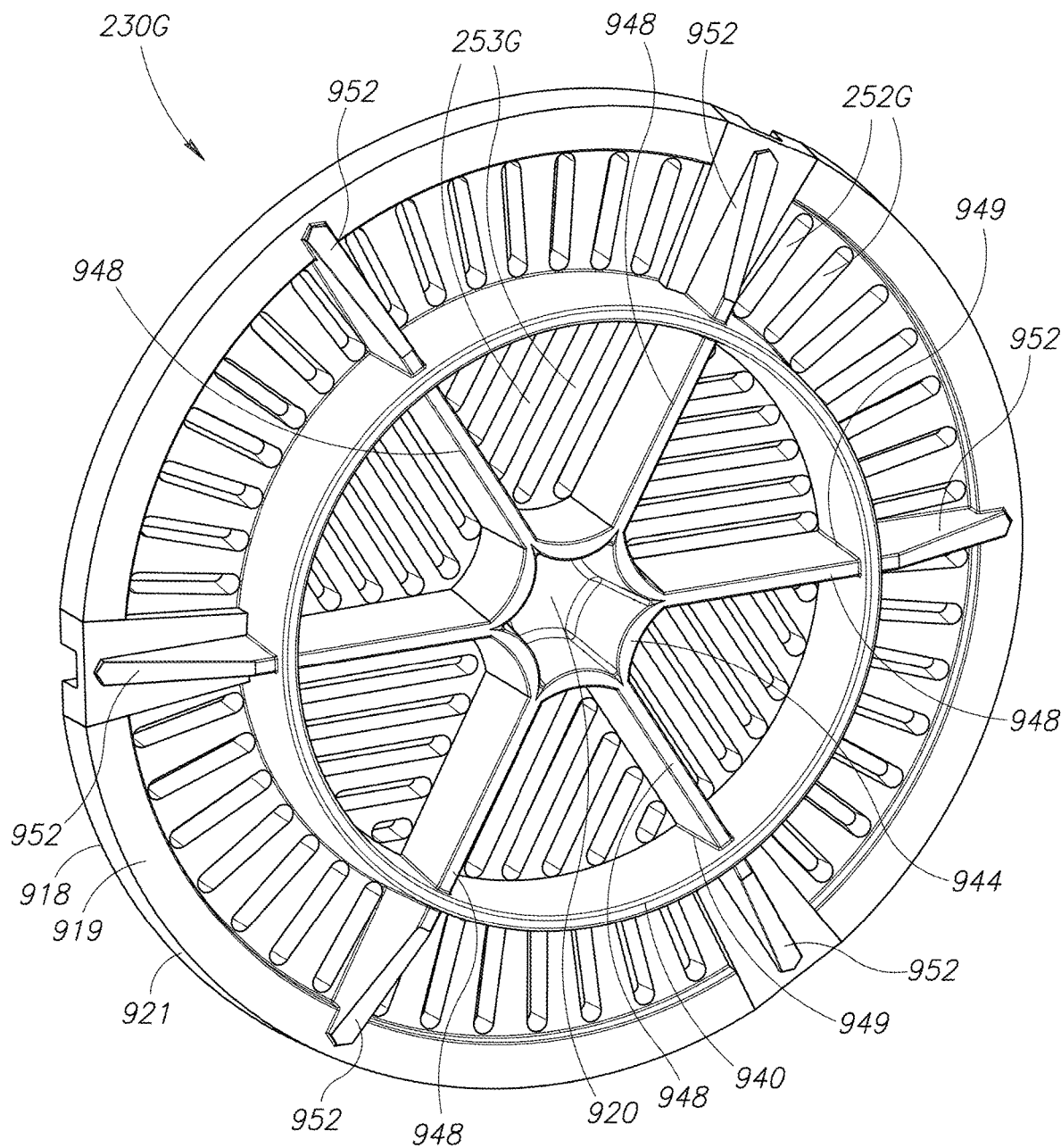
FIG. 5B is a perspective view of a bottom side of the manhole cover of the circulation system of FIG. 4.

While the circulation system 200 has been illustrated as including the manhole cover 230G, other vented manhole covers (e.g., the conventional manhole cover 70 illustrated in FIG. 2) may be used. The manhole cover 230G has been implemented using a manhole cover 230G described in U.S. patent application Ser. No. 15/084,321, filed on Mar. 29, 2016. FIGS. 5A and 5B correspond to FIGS. 22A and 22B of U.S. patent application Ser. No. 15/084,321. Referring to FIGS. 5A and 5B, the manhole cover 230G has an outwardly facing top side 918 opposite an inwardly facing bottom side 919. Referring to FIG. 5A, the manhole cover 230G has a center portion 920 surrounded by a peripheral edge 921. Although the manhole cover 230G has been illustrated as having a traditional round manhole cover shape, the manhole cover 230G may have an alternate shape, such as rectangular.

A plurality of outlets or exhaust holes 253G are positioned adjacent to the center portion 920 and a plurality of inlets or vent holes 252G are positioned adjacent to the peripheral edge 921. In the embodiment illustrated, the vent and exhaust holes 252G and 253G do not overlap radially.

However, this is not a requirement. The vent holes 252G (which are implementations of the through-holes 151 depicted in FIG. 3) allow a portion (represented by the arrow A1 in FIG. 3) of the external atmosphere 102 (see FIG. 3) to flow into the internal atmosphere 104 (see FIG. 3). On the other hand, the exhaust holes 253G (which are implementations of the through-holes 151 depicted in FIG. 3) allow a portion (represented by the arrow A2 in FIG. 3) of the internal atmosphere 104 (see FIG. 3) to flow into the external atmosphere 102 (see FIG. 3). However, the exhaust holes 253G may be converted to vent holes and the vent holes 252G may be converted to exhaust holes by reversing the direction of the flow therethrough. Further, all of the vent and exhaust holes 252G and 253G may be used as exhaust holes or all of the vent and exhaust holes 252G and 253G may be used as vent holes.

Referring to FIGS. 5A and 5B, it may be beneficial to maximize the overall size (area) of the vent and exhaust holes 252G and 253G to reduce flow restrictions posed by the manhole cover 230G. However, as is apparent to those of ordinary skill in the art, the vent and exhaust holes 252G and 253G should be configured such that structural integrity of the manhole cover 230G is adequate to withstand normal usage (e.g., usage specified by OSHA 1926.502, AASHTO-M306, etc.).

The manhole cover 230G may include water control features. For example, referring to FIG. 5A, the top side 918 may include channels 924 arranged to provide throughways through which precipitation and surface water may flow. The channels 924 direct surface water away from the vent and exhaust holes 252G and 253G. The channels 924 may define a top surface portion 922 in which information (e.g., branding, logos, etc.) may be displayed.

In the embodiment illustrated, the channels 924 are spaced apart from each of the vent and exhaust holes 252G and 253G and define a dam-like portion 926 that partially or completely surrounds each of the vent and exhaust holes 252G and 253G. These dam-like portions 926 help prevent surface water from entering the vent and exhaust holes 252G and 253G. The channels 924 are continuous with both a peripheral portion of the top side 918 near the peripheral edge 921 and a portion of the top side 918 surrounding the top surface portion 922. The portion of the top side 918 surrounding the top surface portion 922 is higher than the peripheral portion of the top side 918 near the peripheral edge 921 (e.g., by about ⅛ inches in this embodiment) to promote water flow off the manhole cover 230G.

The top side 918 of the manhole cover 230G may have a curved or generally domed shape that is taller near the center portion 920 and curves downwardly toward the peripheral edge 921. This domed shape helps direct water away from the center portion 920 and toward the peripheral edge 921. The domed shape also positions the vent and exhaust holes 252G and 253G above the surface 30 (see FIG. 4) by a predetermined amount (e.g., about ⅛ inch, about ⅜ inches in accordance with requirements specified by Americans with Disabilities Act, at least about ⅛ inches, or about ⅜ inches. Alternative shapes (e.g., conical or pyramidal) may be used to helps direct water away from the center portion 920 (and toward the peripheral edge 921) and/or positions the vent and exhaust holes 252G and 253G above the surface 30 (see FIG. 4) by the predetermined amount.

Along its periphery, the manhole cover 230G includes one or more conventional closed end wells 928 configured to be used to lift the manhole cover 230G from the manhole 62. Each of the wells 928 extends radially inward from the peripheral edge 921 toward the center portion 920 and passes under a transverse bridge portion 929. The worker 61 (see FIGS. 1 and 3) may insert a tool (e.g., a pick, not shown) into one of the wells 928, hook onto the bridge portion 929, and lift the manhole cover 230G upwardly and out of the manhole 62.

Optionally, referring to FIG. 5B, the bottom side 919 includes a downwardly extending ring-shaped wall 940 that surrounds the exhaust holes 253G. The bottom side 919 may include a downwardly extending structure 944 positioned inside the wall 940. In the embodiment illustrated, the structure 944 is generally hexagonally shaped and positioned at or near the central portion 920 of the manhole cover 230G. A plurality of support walls 948 extend radially outwardly from the structure 944 and pass through rounded fillets 949 formed in the wall 940. Each of the walls 948 has a tapered distal end portion 952 that terminates before reaching the peripheral edge 921. The exhaust holes 253G are positioned between the structure 944 and the wall 940. The vent holes 252G are positioned between the wall 940 and the peripheral edge 921.

Figure 2:
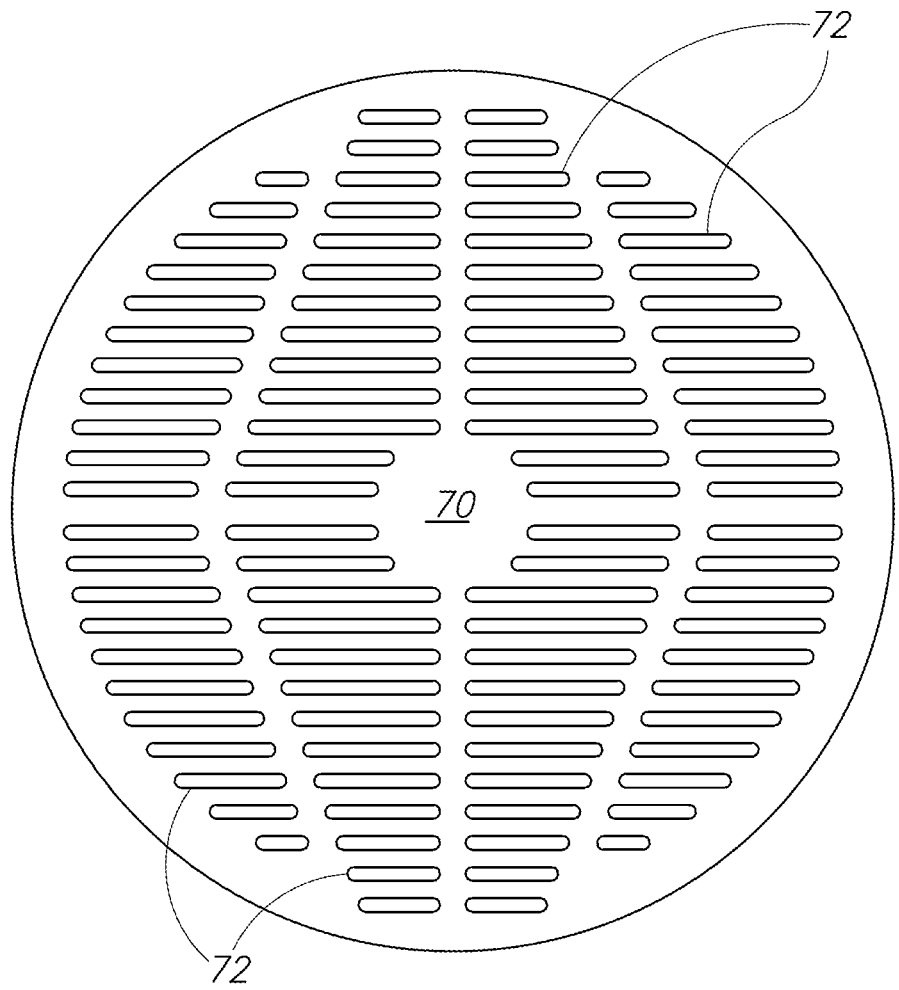
FIG. 2 is a top view of a prior art vented manhole cover.

Referring to FIG. 4, while the circulation system 200 has been described as including the manhole cover 230G, the circulation system 200 may alternatively include a conventional vented manhole cover (e.g., vented manhole cover 70 illustrated in FIG. 2).

By way of a non-limiting example, the air-moving device 94 may be implemented as a fan. While in FIG. 4 the air-moving device 94 has been illustrated as a fixed centrifugal squirrel cage type blower, any other type of active air mover may be used. By way of non-limiting examples, the air-moving device 94 may be implemented using a fixed or oscillating axial fan, a ceiling mounted fan, and the like. Further, other types of air movers could be used, such as a heater.

Referring to FIG. 3, the air-moving device 94 circulates air within the vault 12 to prevent localized concentrations of the gaseous composition 106 (e.g., combustible gasses). For example, the air-moving device 94 may prevent the gaseous composition 106 from reaching a concentration that exceeds a lower explosion limit ("LEL") of the gaseous composition 106. The internal atmosphere 104 is circulated by the air-moving device 94 and may be exchanged with the external atmosphere 102 (e.g., through the vent and exhaust holes 252G and 253G in the manhole cover 230G, through a gap between the manhole cover 230G and the ring support 250G, through the ventilation stack 132 illustrated in FIG. 3, through the conduits 20A-20C illustrated in FIG. 1, and the like).

Referring to FIG. 4, the air-moving device 94 may be powered by an alternating current ("AC") outlet or receptacle 280 through a ground fault circuit interrupter (not shown), which may be installed with the air-moving device 94 or may be present in the vault 12 before installation. In the embodiment illustrated, the air-moving device 94 has been mounted or affixed to the sidewalls 54 of the vault 12 and additionally could be employed to provide equipment cooling. However, this is not a requirement.

Second Embodiment

Figure 6:
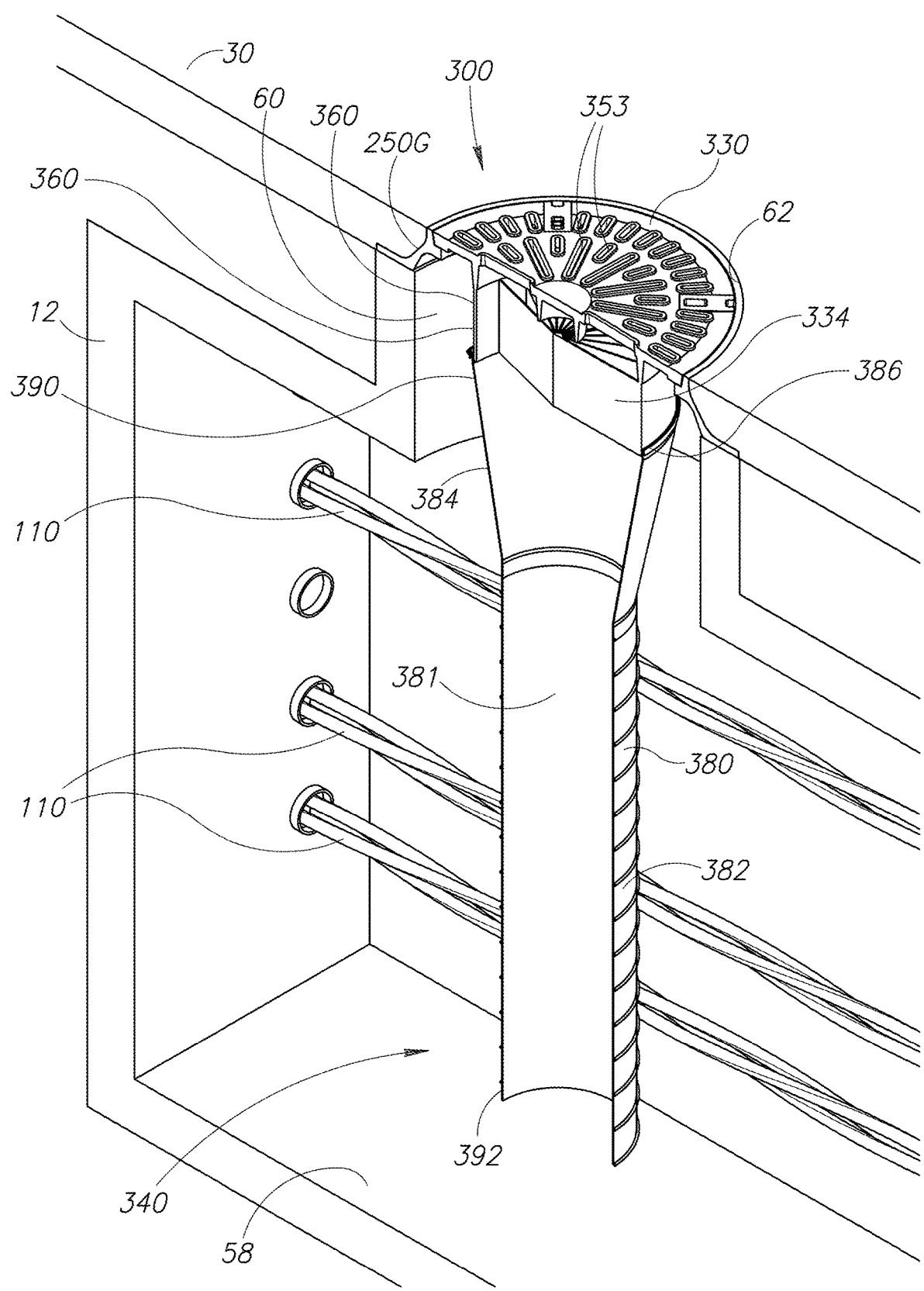
FIG. 6 is a cross-sectional view of a second embodiment of the circulation system.

FIG. 6 is a cross-section of a second embodiment of a circulation system 300 that is an exemplary implementation of the circulation system 100 (see FIG. 3). In this embodiment, the interface 92 (see FIG. 3) includes a manhole cover 330 (positioned on the ring support 250G inside the manhole 62) and the air moving assembly 90 (see FIG. 3) is implemented as an air moving assembly 340. The circulation system 300 may include the ventilation stack 132 (see FIG. 3). However, this is not a requirement and the ventilation stack 132 (see FIG. 3) has been omitted from FIG. 6.

Figure 7:
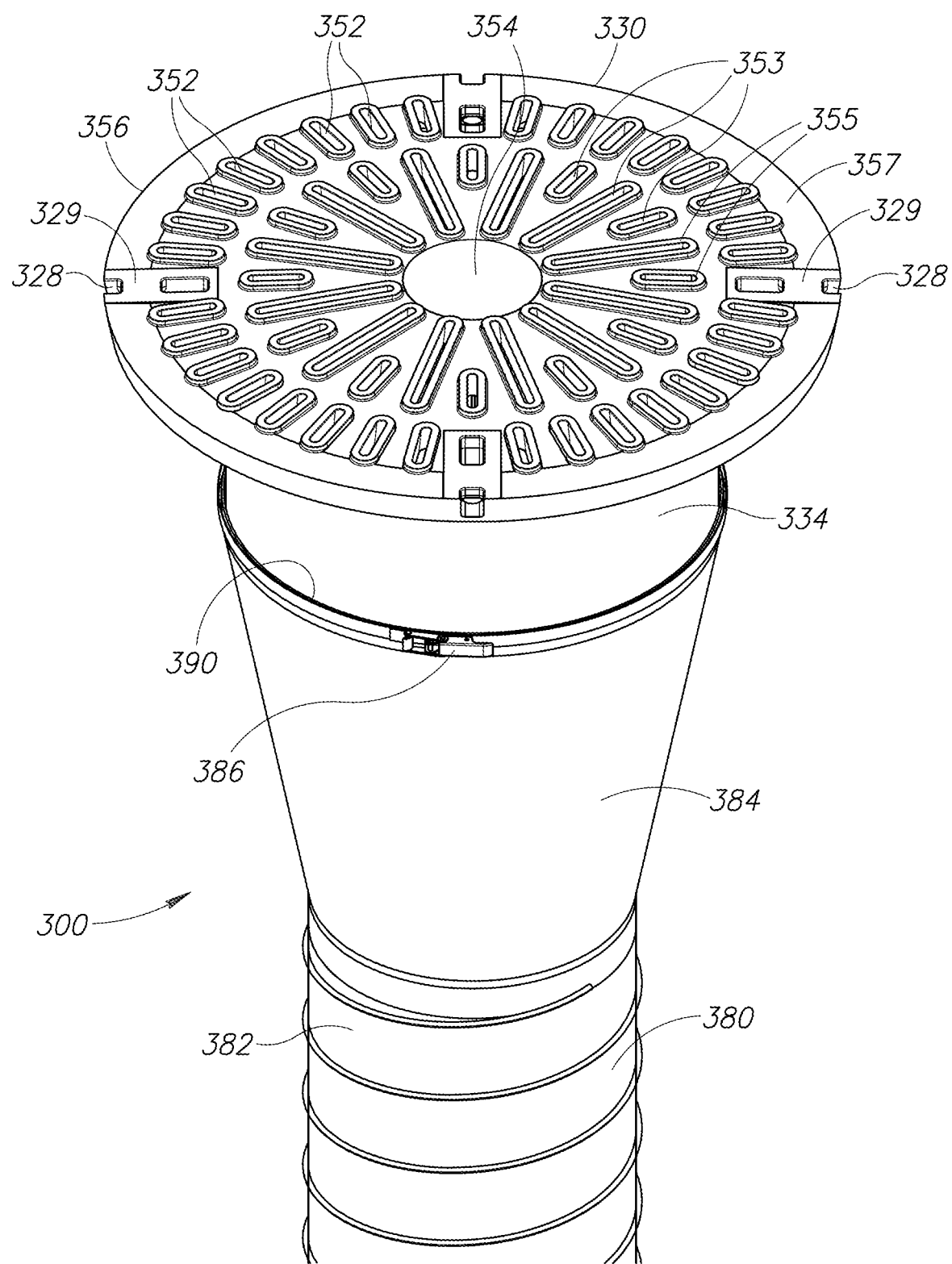
FIG. 7 is a perspective view of a top portion of the circulation system depicted in FIG. 6.

Referring to FIG. 7, the manhole cover 330 includes one or more vent holes 352 and one or more exhaust holes 353. The vent and exhaust holes 352 and 353 are implementations of the through-holes 151 depicted in FIG. 3. The exhaust hole(s) 353 are positioned adjacent to a center portion 354 of the manhole cover 330 and the vent hole(s) 352 are positioned adjacent to a peripheral edge 356 of the manhole cover 330. In the embodiment illustrated, the vent and exhaust holes 352 and 353 do not overlap radially. However, this is not a requirement. Although the manhole cover 330 has been illustrated as having a traditional round manhole cover shape, the manhole cover 330 may have an alternate shape, such as rectangular.

Along its periphery, the manhole cover 330 includes one or more conventional closed end wells 328 configured to be used to lift the manhole cover 330 from the ring support 250G (see FIG. 6) positioned inside the manhole 62 (see FIG. 6). Each of the wells 328 extends radially inward from the peripheral edge 356 toward the center portion 354 and passes under a transverse bridge portion 329. The worker 61 (see FIGS. 1 and 3) may insert a tool (e.g., a pick, not shown) into one of the wells 328, hook onto the bridge portion 329, and lift the manhole cover 330 upwardly and out of the manhole 62 (see FIG. 6).

The manhole cover 330 may have a curved or generally domed top surface 357 that is taller near the center portion 354 and curves downwardly toward the peripheral edge 356. This domed shape helps direct water away from the center portion 354 and toward the peripheral edge 356. The domed shape also positions the exhaust holes 353 above the surface 30 (see FIG. 6) by a predetermined amount (e.g., about ⅛ inch, about ⅜ inches in accordance with requirements specified by Americans with Disabilities Act, at least about ⅛ inches, or about ⅜ inches.

The manhole cover 330 may include water control features. For example, the top surface 357 may include dams 355 arranged to prevent precipitation and surface water from flowing into the vent and/or exhaust holes 352 and 353. The dams 355 may partially or completely surround the vent and/or exhaust holes 352 and 353.

Referring to FIG. 6, the manhole cover 330 includes or is positioned near a heat sink 334. The heat sink 334 is positioned under the exhaust holes 353 and extends downwardly into the neck 60. The heat sink 334 may be installed within the vault 12 (as shown in FIG. 6) and/or within the manhole cover 330. In the embodiment illustrated, the heat sink 334 is coupled to or integrally formed in an underside 358 (see FIG. 8) of the manhole cover 330. Referring to FIG. 6, the heat sink 334 circulates the internal atmosphere 104 (see FIG. 3) using convection by heating or cooling at least a portion of the internal atmosphere 104. The heat sink 334 may be heated or cooled by the external atmosphere 102 (see FIG. 3) or other freely available energy (e.g., solar energy). Alternatively, the heat sink 334 may receive energy (e.g., heat) from one or more of the cables 110.

Referring to FIG. 7, when the heat sink 334 is warmer than the internal atmosphere 104 (see FIG. 3), at least a portion of the internal atmosphere 104 (see FIG. 3) may be exhausted through the exhaust holes 353, which helps prevent a buildup of the gaseous composition 106 (see FIG. 3). At the same time, a portion of the external atmosphere 102 (see FIG. 3) may enter the vault 12 through the vent holes 352. By way of a non-limiting example, the heat sink 334 may be warmer than the internal atmosphere 104 (see FIG. 3) when solar energy from the sun heats the heat sink 334. Thus, the heat sink 334 transfers heat obtained from solar radiation to the internal atmosphere 104 (see FIG. 3) and induces natural convection that causes at least a portion of the internal atmosphere 104 to vent from within the vault 12.

On the other hand, when the heat sink 334 is cooler than the internal atmosphere 104 (see FIG. 3), at least a portion of the external atmosphere 102 (see FIG. 3) may enter the vault 12 through the exhaust holes 353, which helps prevent a buildup of the gaseous composition 106 (see FIG. 3). At the same time, a portion of the internal atmosphere 104 (see FIG. 3) may exit the vault 12 through the vent holes 352. Thus, the heat sink 334 pulls a sinking column of air through the exhaust holes 353 of the manhole cover 330 to improve circulation and venting. By way of a non-limiting example, the heat sink 334 may be cooler than the internal atmosphere 104 (see FIG. 3) when snow or ice has accumulated on top of the manhole cover 330. Further, the heat sink 334 may be cooler than the internal atmosphere 104 during peak loading of the electrical cables 110 (see FIG. 6) and/or when components (such as steam pipes) of other utilities that share the manhole vault 12 (see FIG. 6) are loaded and heat the internal atmosphere 104.

Figure 8:
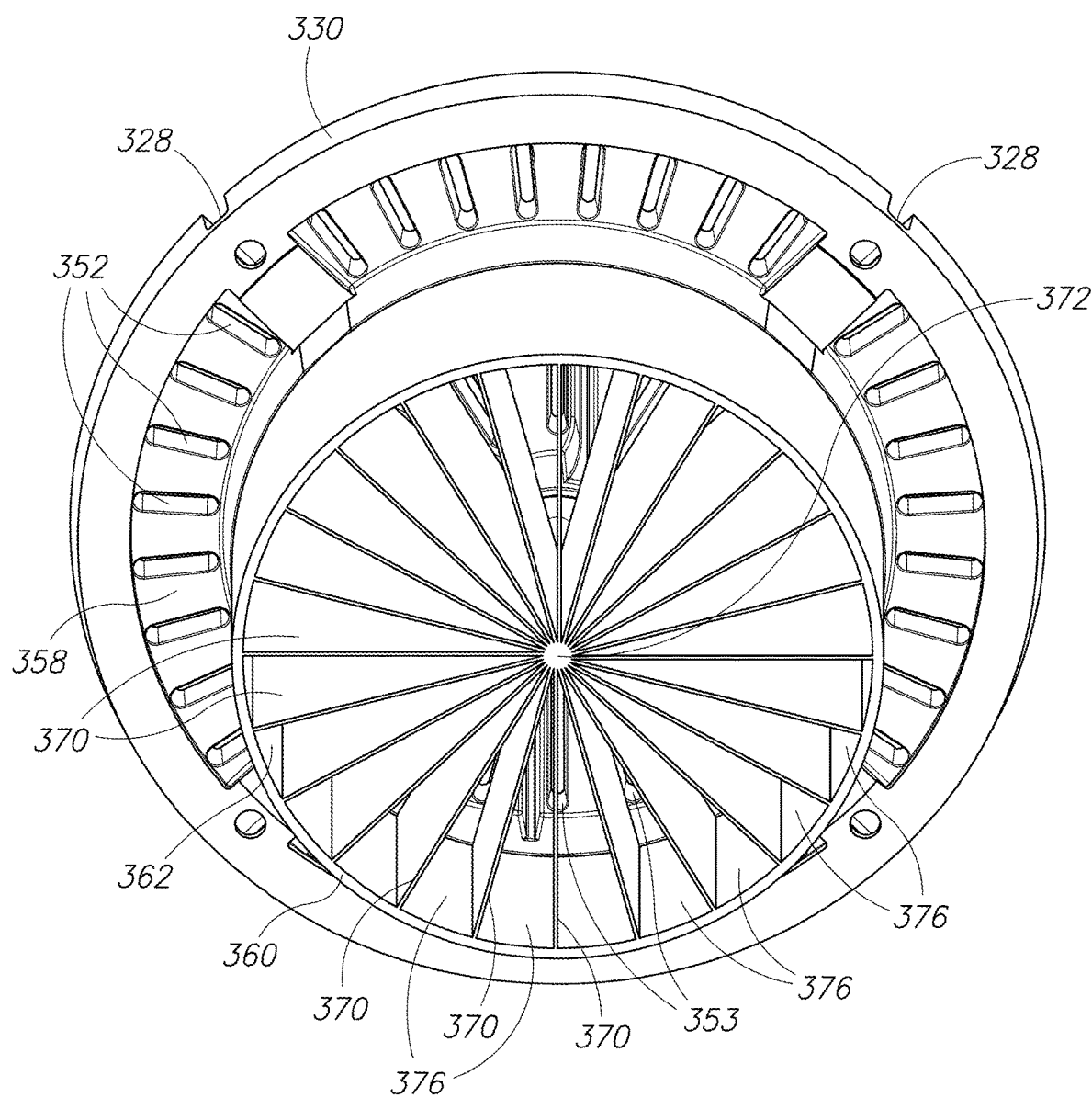
FIG. 8 is a perspective view of an underside of a heat sink of the circulation system depicted in FIG. 6.

Referring to FIG. 8, in the embodiment illustrated, the heat sink 334 has a generally cylindrical shape with a generally circular cross-sectional shape defined by a sidewall 360. The sidewall 360 is positioned between the vent holes 352 and the exhaust holes 353. The sidewall 360 isolates the exhaust holes 353 from the vent holes 352 inside an interior 362 defined by the sidewall 360 and the underside 358 of the manhole cover 330. A plurality of radially extending fins 370 extend from the sidewall 360 to a central portion 372 adjacent the center portion 354 (see FIG. 7) of the manhole cover 330. Interstitial spaces 376 are defined between each pair of adjacent fins 370. The exhaust holes 353 are positioned within the interstitial spaces 376. The external and/or internal atmospheres 102 and 104 (see FIG. 3) flow through the exhaust holes 353 and into the interstitial spaces 376.

Referring to FIG. 6, an optional open-ended duct 380 may be used to help remove gasses in the internal atmosphere 104 (see FIG. 3) from the bottom of the vault 12 (e.g., near the floor 58). The duct 380 has a passageway 381 that extends between first and second open ends 390 and 392. The first open end 390 may be attached (e.g., with a band clamp 386) to the sidewall 360 of the heat sink 334. The second open end 392 may be positioned inside the vault 12 (e.g., at or near the floor 58).

When the heat sink 334 is warmer than the internal atmosphere 104 (see FIG. 3), the heat sink 334 may draw a portion of the internal atmosphere 104 (see FIG. 3) from the bottom of the vault 12 (e.g., near the floor 58) through the second open end 392. That portion of the internal atmosphere 104 (see FIG. 3) flows through the passageway 381 and exits therefrom through the first open end 390. Then, the portion of the internal atmosphere 104 (see FIG. 3) flows outwardly through the exhaust holes 253 of the manhole cover 330. In this manner, any gasses near the floor 58 may be drawn out of the vault 12. This helps prevent the gasses from concentrating sufficiently to achieve their LEL.

On the other hand, when the heat sink 334 is cooler than the internal atmosphere 104 (see FIG. 3), the heat sink 334 may draw a portion of the external atmosphere 102 (see FIG. 3) into the vault 12 through the exhaust holes 253. That portion of the external atmosphere 102 (see FIG. 3) flows into the passageway 381 through the first open end 390 and exits therefrom through the second open end 392 positioned at or near the bottom of the vault 12 (e.g., near the floor 58). In this manner, any gasses near the floor 58 are disrupted and at least partially dispersed. This helps prevent the gasses from concentrating sufficiently to achieve their LEL.

Optionally, the duct 380 may have one or more holes (substantially similar to second opening(s) 448 formed in wall(s) 430 illustrated in FIG. 51 and described below) formed therein (e.g., near the second open end 392). Any hole(s) positioned above water partially filling the vault 12 allow the internal atmosphere 104 (see FIG. 3) to enter the passageway 381 through the hole(s) and/or the external atmosphere 102 (see FIG. 3) to exit the passageway 381 through the hole(s).

In the embodiment illustrated, the duct 380 has a flexible portion 382 attached to a tapered portion 384. The tapered portion 384 is positioned adjacent the heat sink 334 and the flexible portion 382 hangs downwardly from the tapered portion 384. The first open end 390 is formed in an upper portion of the tapered portion 384, and the second open end 392 is formed in a lower portion of the flexible portion 382.

In alternate embodiments, instead of the heat sink 334, the air-moving device 94 (see FIG. 3) may be used to generate heat or cold or designed to act as a manhole cooling or heating system. In such embodiments, the air-moving device 94 (see FIG. 3) may be implemented as a steam generator, a resistive heater, and the like.

Third Embodiment

Figure 9:
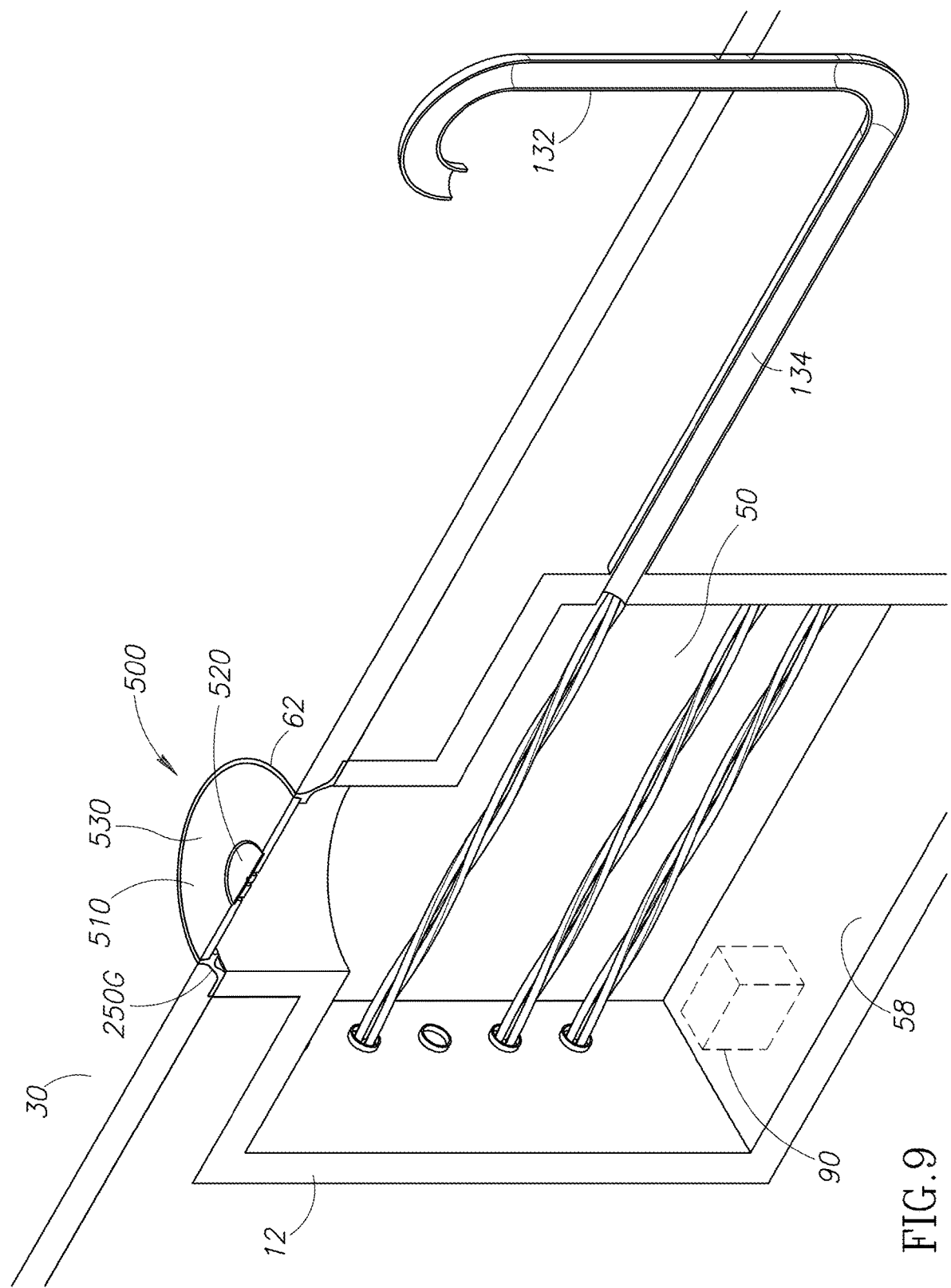
FIG. 9 is a cross-sectional view of a third embodiment of the circulation system including a manhole cover assembly.
Figure 10:
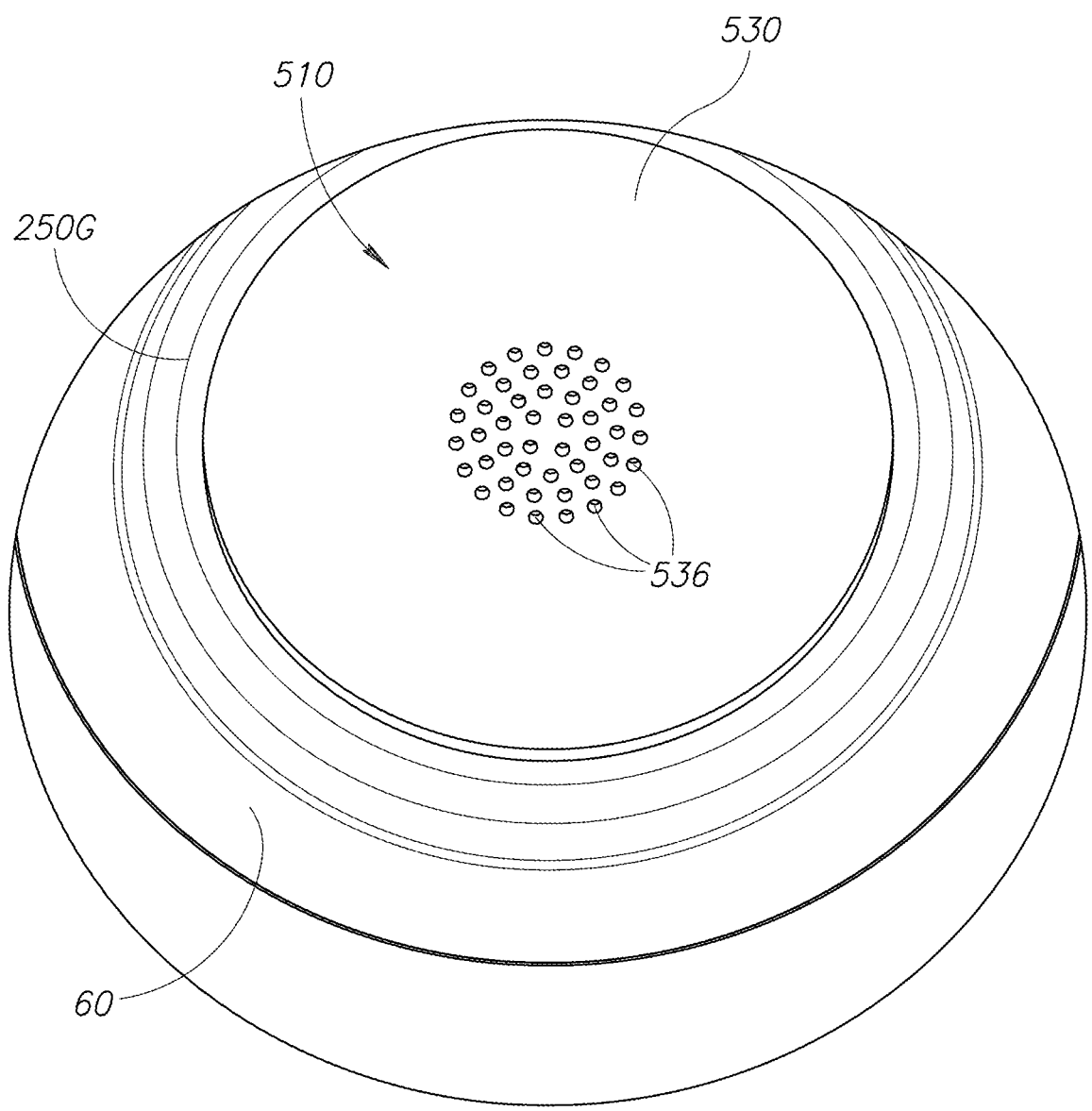
FIG. 10 is a perspective view of an underside of the manhole cover assembly of the circulation system depicted in FIG. 9.

FIG. 9 is a cross-section of a third embodiment of a circulation system 500 that is an exemplary implementation of the circulation system 100 (see FIG. 3). In this embodiment, the interface 92 (see FIG. 3) includes a manhole cover assembly 510. The interface 92 (see FIG. 3) may also include the ventilation stack 132. However, this is not a requirement. Optionally, the circulation system 500 may include the air moving assembly 90 (see FIG. 3), which may be implemented using any of the air moving assemblies described herein.

Figure 11:
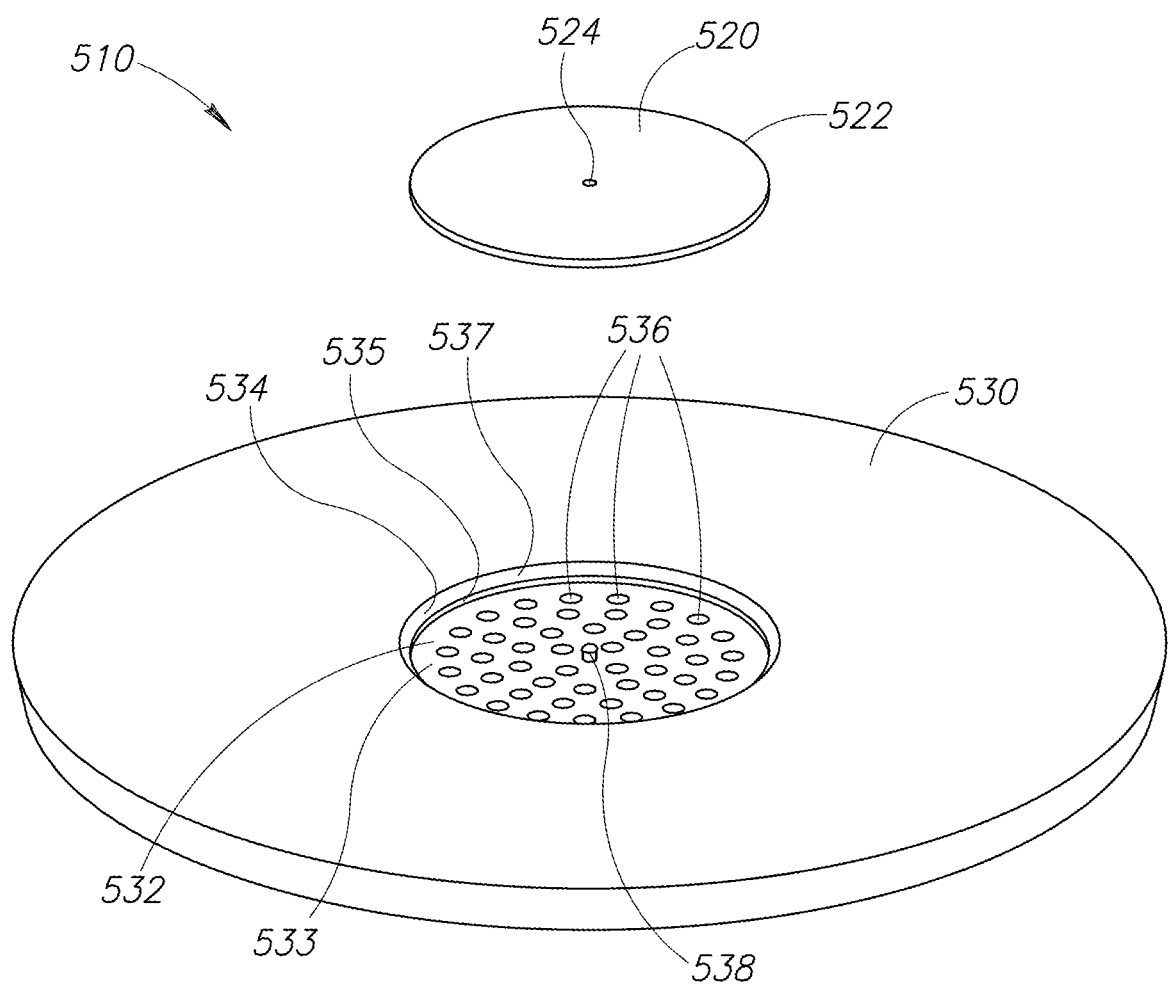
FIG. 11 is an exploded perspective view of the manhole cover assembly of the circulation system depicted in FIG. 9.

Referring to FIG. 11, the manhole cover assembly 510 includes a movable disk 520 and a manhole cover 530 (positioned on the ring support 250G inside the manhole 62 illustrated in FIG. 9). The disk 520 has a peripheral edge 522 and a central through-hole 524. By way of a non-limiting example, the disk 520 may be constructed from a flexible or deformable material, such as rubber.

The manhole cover 530 includes a central recess 532 defined by a sidewall 534 surrounding an upwardly facing surface 533. The sidewall 534 has a lower portion 535 and an upper portion 537. The upper portion 537 may be radiused or taper outwardly. The peripheral edge 522 of the disk 520 is configured to fit snuggly within the lower portion 535 of the sidewall 534. On the other hand, a gap 548 (see FIG. 12B) is defined between the peripheral edge 522 of the disk 520 and the upper portion 535 of the sidewall 534 when the peripheral edge 522 is deformed upwardly as described below. Nevertheless, the disk 520 may remain recessed inside the central recess 532 to prevent passing cars from damaging the disk 520.

Through-holes 536 are formed in the upwardly facing surface 533 of the recess 532. The through-holes 536 are implementations of the through-holes 151 (see FIG. 3).

Figure 12A:
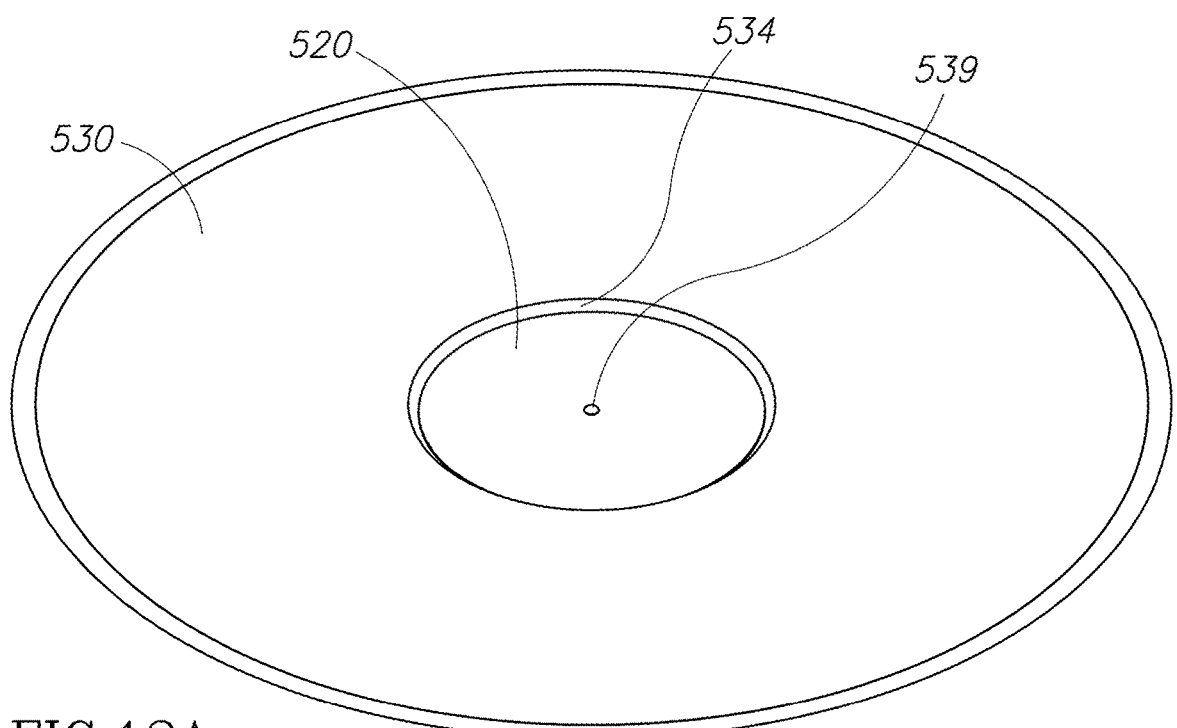
FIG. 12A is a perspective view of a check valve of the manhole cover assembly of the circulation system depicted in FIG. 9 depicted in a closed position.

A peg 538 extends upwardly from the central recess 532 at or near the center of the upwardly facing surface 533. The peg 538 has a distal stop portion 539 (see FIGS. 12A and 12B). The central through-hole 524 of the disk 520 is configured to be mounted on the peg 538. The distal stop portion 539 helps maintain the disk 520 on the peg 538 and anchors the central portion of the disk 520 to the manhole cover 530. The disk 520 is configured to flex or deform vertically at or near its peripheral edge 522 between an open position (see FIG. 12B) and a closed position (see FIG. 12A).

Together, the disk 520, the recess 532, the through-holes 536, and the peg 538 may be characterized as forming a flapper valve or a check valve. Pressure inside the vault 12 pushes or pulls on the disk 520 at or near its peripheral edge 522. For example, referring to FIG. 12B, when pressure inside the vault 12 (see FIG. 9) exceeds pressure outside the vault 12 by at least a predetermined amount, the disk 520 flexes outwardly at or near its peripheral edge 522 to space the peripheral edge 522 from the through-holes 536 (see FIG. 11). At the same time, the gap 548 (see FIG. 12B) is formed between the peripheral edge 522 of the disk 520 and the upper portion 535 (see FIG. 11) of the sidewall 534 (see FIG. 11). Thus, at least a portion of the internal atmosphere 104 may flow through the through-holes 536 (see FIG. 11) and the gap 548 into the external atmosphere 102 (see FIG. 3). By way of a non-limiting example, referring to FIG. 11, the predetermined amount of pressure may be sufficient to prevent water from entering the through-holes 536 when the disk 520 is in the open position (see FIG. 12B) thereby preventing the intrusion of water through the through-holes 536.

On the other hand, when the internal atmosphere 104 (see FIG. 3) has a pressure that is less than the predetermined pressure, the disk 520 seals against the through-holes 536 and prevents water and debris from flowing therethrough. By way of a non-limiting example, the disk 520 may be implemented as a flexible rubber membrane configured to deform when the internal atmosphere 104 (see FIG. 3) has at least the predetermined pressure, allowing a portion of the internal atmosphere 104 to vent into the external atmosphere 102 (see FIG. 3). On the other hand, when the pressure of the internal atmosphere 104 (see FIG. 3) is less than the predetermined pressure, the disk 520 seals against the through-holes 536 and prevents water and debris from flowing therethrough.

Because the internal atmosphere 104 (see FIG. 3) is vented through the through-holes 536, a portion of the external atmosphere 102 (see FIG. 3) or make up air may be passively pulled into the vault 12 through the ventilation stack 132 or the conduits 20A-20C (see FIG. 1) connected to adjacent vaults (e.g., the vault 14 illustrated in FIG. 1). The ventilation stack 132 may provide make up air if flow through the conduits 20A-20C (see FIG. 1) or air leaks in the vault 12 provide too little airflow. Optionally, the manhole cover 530 may include water dams (e.g., the dams 355 illustrated in FIG. 7, dams 1524 illustrated in FIG. 40, and the like) configured to further help prevent water ingress.

Figure 12B:
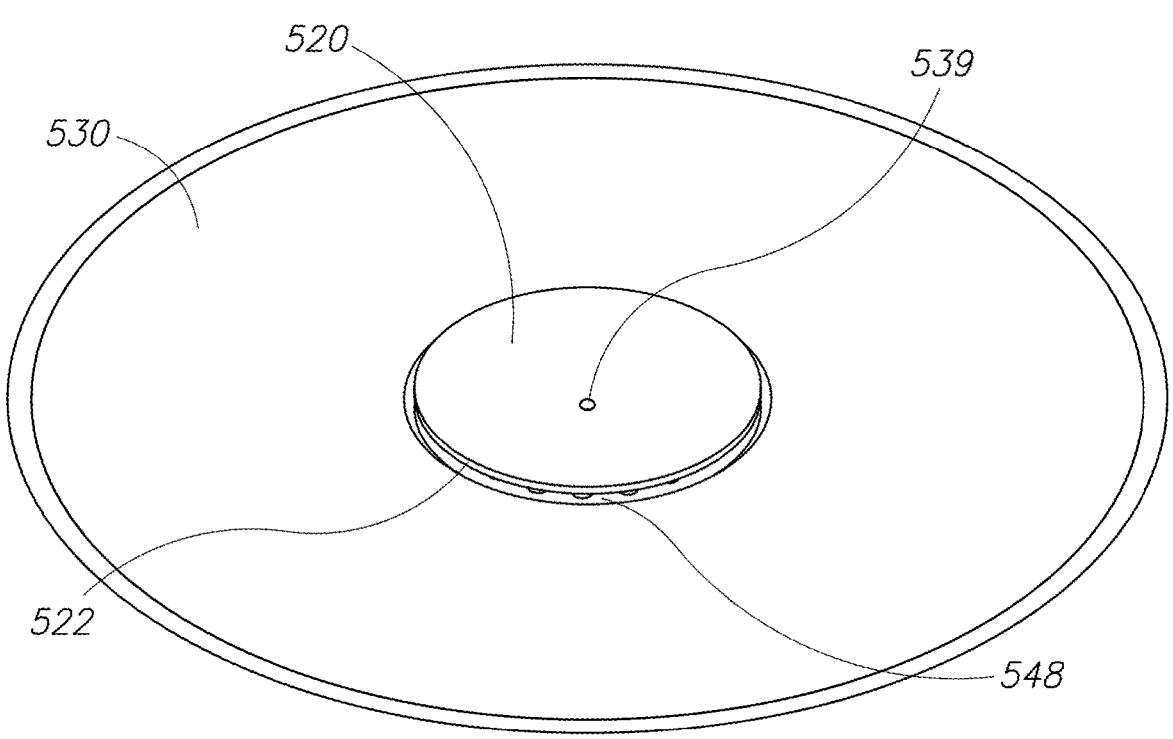
FIG. 12B is a perspective view of the check valve of the manhole cover assembly of the circulation system depicted in FIG. 9 depicted in an open position.

Optionally, referring to FIG. 9, the air moving assembly 90 may be used to increase the pressure inside the vault 12 and/or the neck 60 to cause the disk 520 to flex or deform into the open position (see FIG. 12B). Alternatively, changes in temperature may cause the pressure inside the vault 12 and/or the neck 60 to increase and the disk 520 to flex or deform into the open position (see FIG. 12B). By way of another non-limiting example, pressure changes due to traffic may cause the pressure inside the vault 12 and/or the neck 60 to be greater than pressure outside the vault 12 (e.g., by creating a vacuum over the manhole cover 530) and the disk 520 to flex or deform into the open position (see FIG. 12B).

Optionally, an open-ended duct (e.g., like the open-ended duct 380 illustrated in FIGS. 6 and 7) may be used to help remove gasses or create cooling in the internal atmosphere 104 (see FIG. 3) from the bottom of the vault 12 (e.g., near the floor 58). A first open end (e.g., like the first open end 390 illustrated in FIGS. 6 and 7) of the duct may be attached at or near the through-holes 536 (see FIGS. 10 and 11) along the underside of the manhole cover 530. A second open end (e.g., like the second open end 392 illustrated in FIG. 6) of the duct may be positioned inside the vault 12 (e.g., at or near the floor 58). Thus, when the disk 520 is in the open position (see FIG. 12B), the duct may draw a portion of the internal atmosphere 104 (see FIG. 3) from the bottom of the vault 12 (e.g., near the floor 58) through the second open end. This may help prevent the gasses from concentrating sufficiently to achieve their LEL.

Fourth Embodiment

Figure 13:
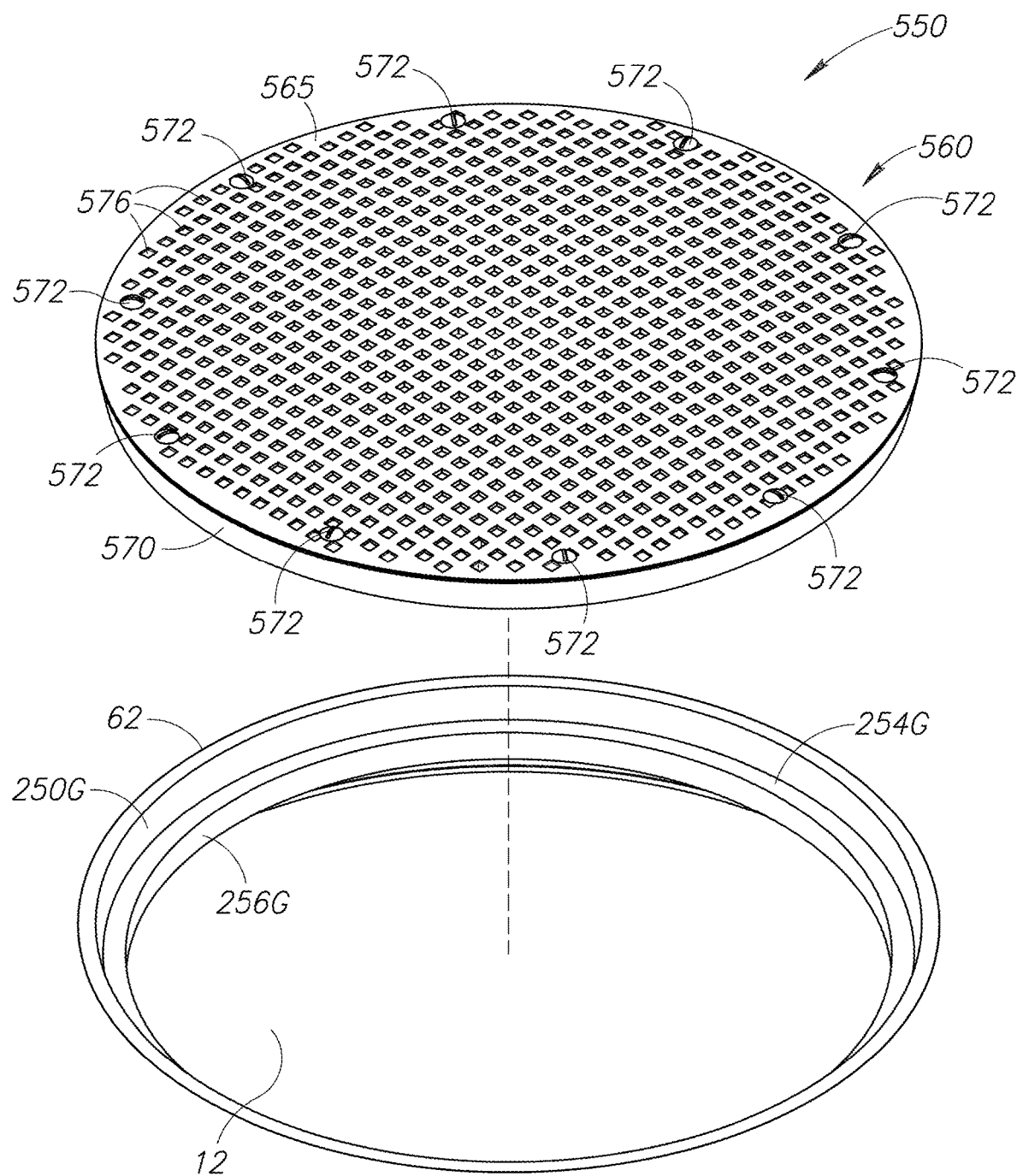
FIG. 13 is a perspective view of a fourth embodiment of the circulation system including a manhole cover assembly.

FIG. 13 depicts a fourth embodiment of a circulation system 550 that is an exemplary implementation of the circulation system 100 (see FIG. 3). In this embodiment, the interface 92 (see FIG. 3) includes a manhole cover assembly 560. The interface 92 (see FIG. 3) may also include the ventilation stack 132 (see FIG. 3). However, this is not a requirement. Optionally, the circulation system 550 may include the air moving assembly 90 (see FIG. 3), which may be implemented using any of the air moving assemblies described herein.

Figure 14:
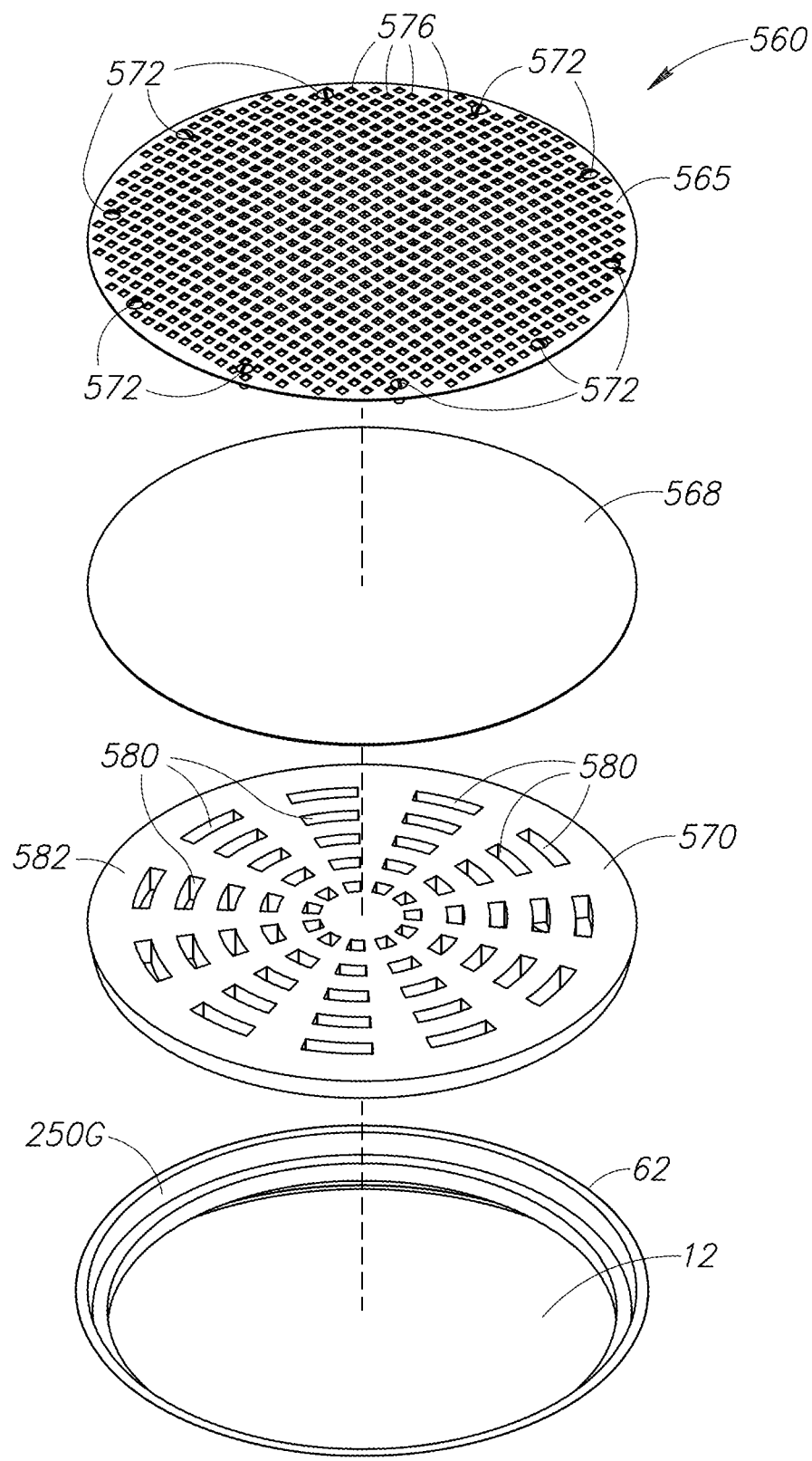
FIG. 14 is an exploded perspective view of the manhole cover assembly of the circulation system depicted in FIG. 13.

Referring to FIG. 14, the manhole cover assembly 560 includes a grate 565, a gas permeable membrane 568, and a manhole cover 570 (positioned on the ring support 250G inside the manhole 62). The membrane 568 is sandwiched in between the grate 565 and the manhole cover 570. A plurality of removable fasteners 572 extend through the grate 565, the membrane 568, and the manhole cover 570 and connect these components together.

In the embodiment illustrated, the grate 565 is positioned on top of the membrane 568 and the manhole cover 570 is positioned under the membrane 568. The grate 565 helps protect the membrane 568 (e.g., from automobiles driving over the manhole cover assembly 560). However, in alternate embodiments, the manhole cover 570 may be positioned on top of the membrane 568 and the grate 565 may be positioned under the membrane 568. In such embodiments, the manhole cover 570 helps protect the membrane 568 (e.g., from automobiles driving over the manhole cover assembly 560).

Figure 15:
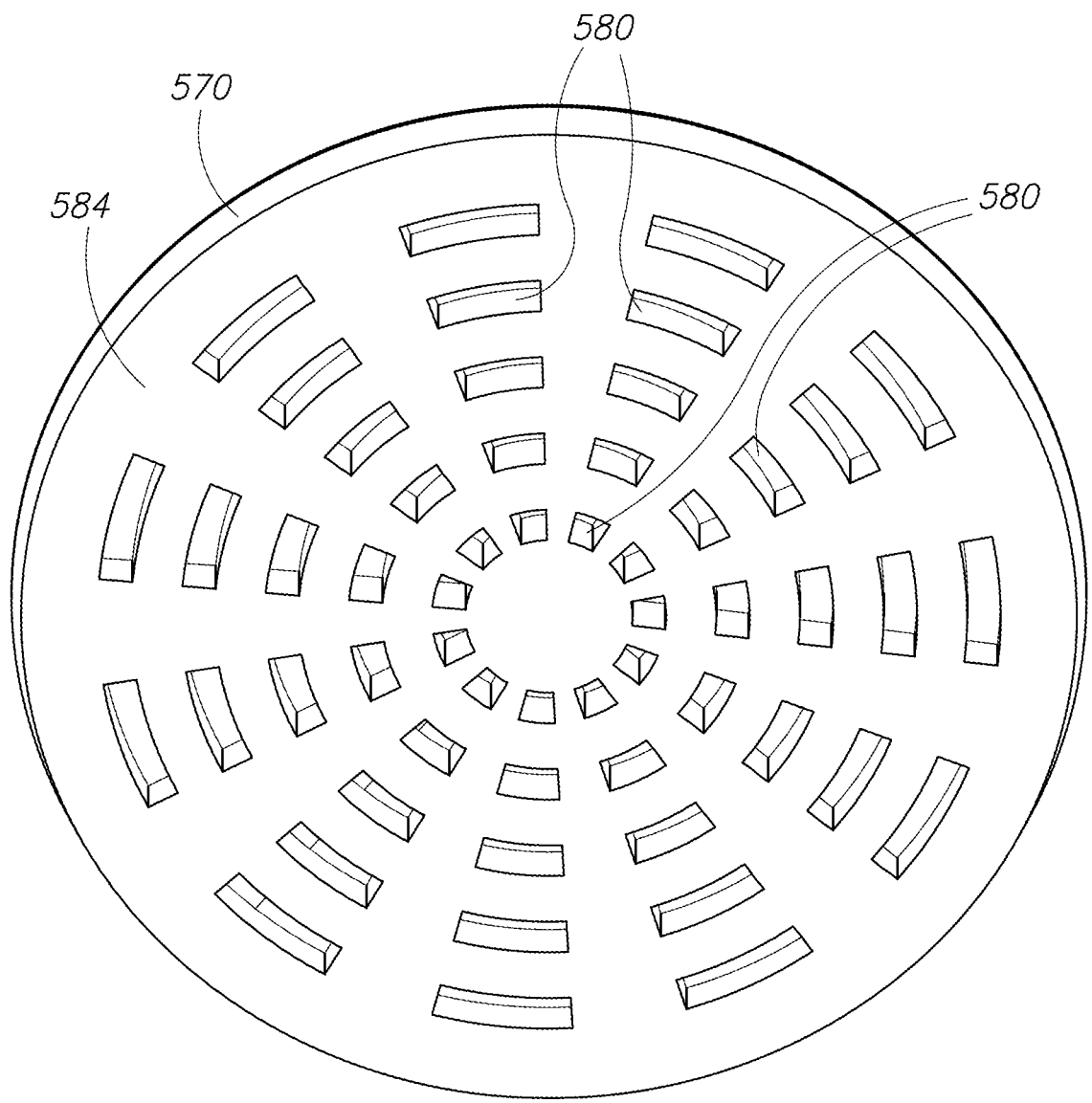
FIG. 15 is a perspective view of an underside of the manhole cover assembly of the circulation system depicted in FIG. 13.

The grate 565 includes a plurality of through-holes 576 that allow a portion of the internal atmosphere 104 (see FIG. 3) and/or a portion of the external atmosphere 102 (see FIG. 3) to pass therethrough. The grate 565 may be readily removed and/or replaced. After the grate 565 has been removed, the membrane 568 may be cleaned or replaced. The manhole cover 570 includes a plurality of through-holes 580 that extend between its upper and lower surfaces 582 and 584 (see FIG. 15).

In the embodiment illustrated, the membrane 568 is generally disk shaped. The membrane 568 is configured to prevent water from passing therethrough and, at the same time, to allow a portion of the internal atmosphere 104 to flow therethrough (e.g., when the internal atmosphere 104 (see FIG. 3) has at least a predetermined pressure). The manhole cover assembly 560 allows gasses (e.g., a portion of the external and/or internal atmospheres 102 and 104 illustrated in FIG. 3) to diffuse through the through-holes 576 of the grate 565, the membrane 568, and the through-holes 580 of the manhole cover 570. However, the membrane 568 acts a barrier that prevents water from flowing therethrough. Thus, the membrane 568 is configured to allow diffusion of gasses out of the vault 12, but does not allow ingress of liquids (such as water, oils, solvents, and/or gasoline) into the vault 12. In other words, the membrane 568 is both liquid proof and breathable. In one embodiment, the membrane 568 is constructed from a thin, microporous polytetrafluoroethylene ("PTFE").

Optionally, an open-ended duct (e.g., like the open-ended duct 380 illustrated in FIGS. 6 and 7) may be used to help remove gasses in the internal atmosphere 104 (see FIG. 3) from the bottom of the vault 12 (e.g., near the floor 58). A first open end (e.g., like the first open end 390 illustrated in FIGS. 6 and 7) of the duct may be attached at or near the through-holes 580 along the lower surface 584 (see FIG. 15) of the manhole cover 570. A second open end (e.g., like the second open end 392 illustrated in FIG. 6) of the duct may be positioned inside the vault 12 (e.g., at or near the floor 58). Thus, the duct may draw a portion of the internal atmosphere 104 (see FIG. 3) from the bottom of the vault 12 (e.g., near the floor 58) through the second open end or channel a portion of the external atmosphere 102 (see FIG. 3) to the bottom of the vault 12. This may help prevent the gasses from concentrating sufficiently to achieve their LEL.

Fifth Embodiment

Figure 16:
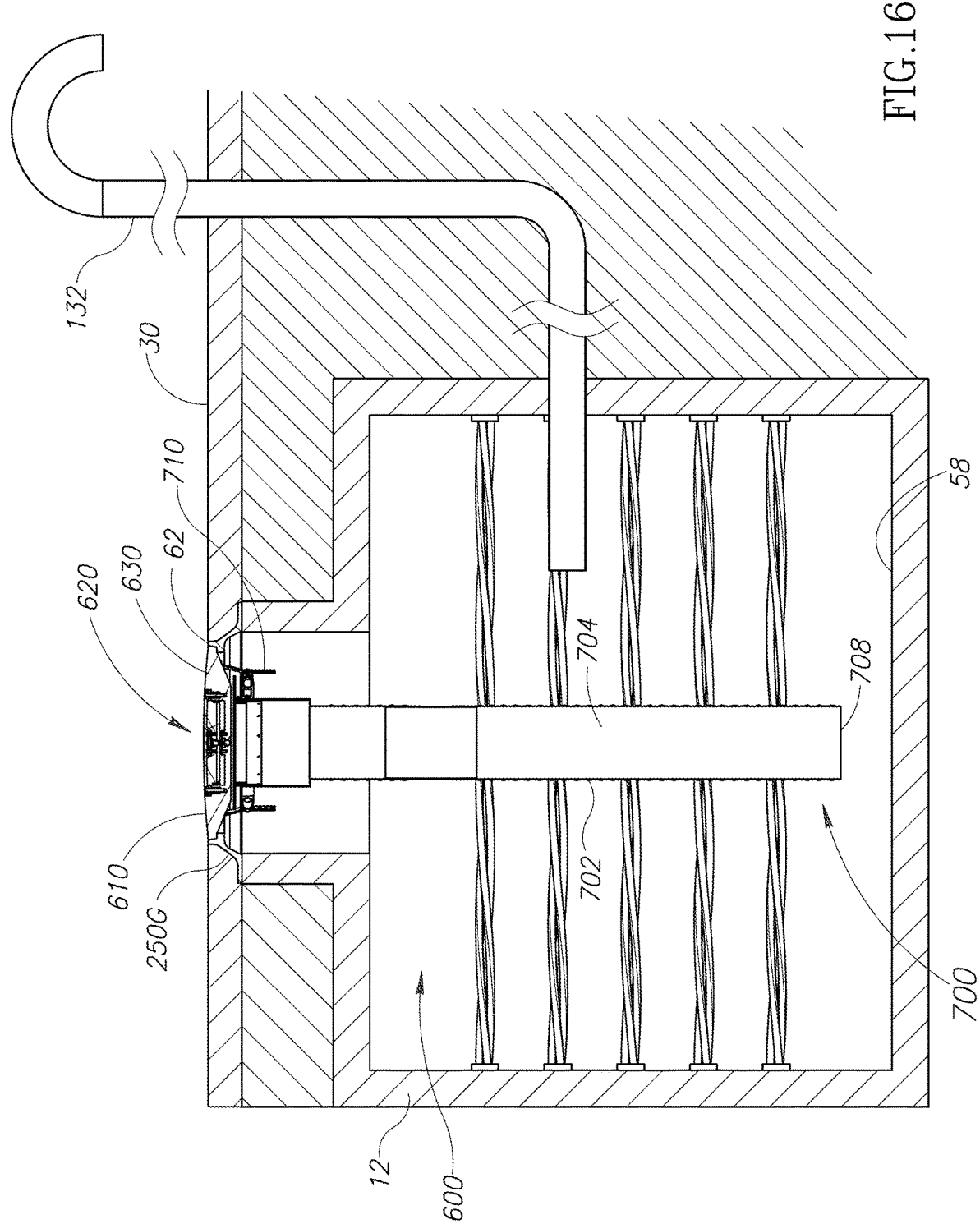
FIG. 16 is a cross-sectional view of a fifth embodiment of the circulation system including a manhole cover assembly.

FIG. 16 is a cross-section of a fifth embodiment of a circulation system 600 that is an exemplary implementation of the circulation system 100 (see FIG. 3). In this embodiment, the interface 92 (see FIG. 3) includes a manhole cover assembly 610. The interface 92 (see FIG. 3) may also include the ventilation stack 132. However, this is not a requirement. In this embodiment, the air moving assembly 90 (see FIG. 3) is implemented as a pump assembly 620 of the manhole cover assembly 610. Optionally, the air moving assembly 90 (see FIG. 3) may also include any of the air moving assemblies described herein. However, this is not a requirement.

Figure 17:
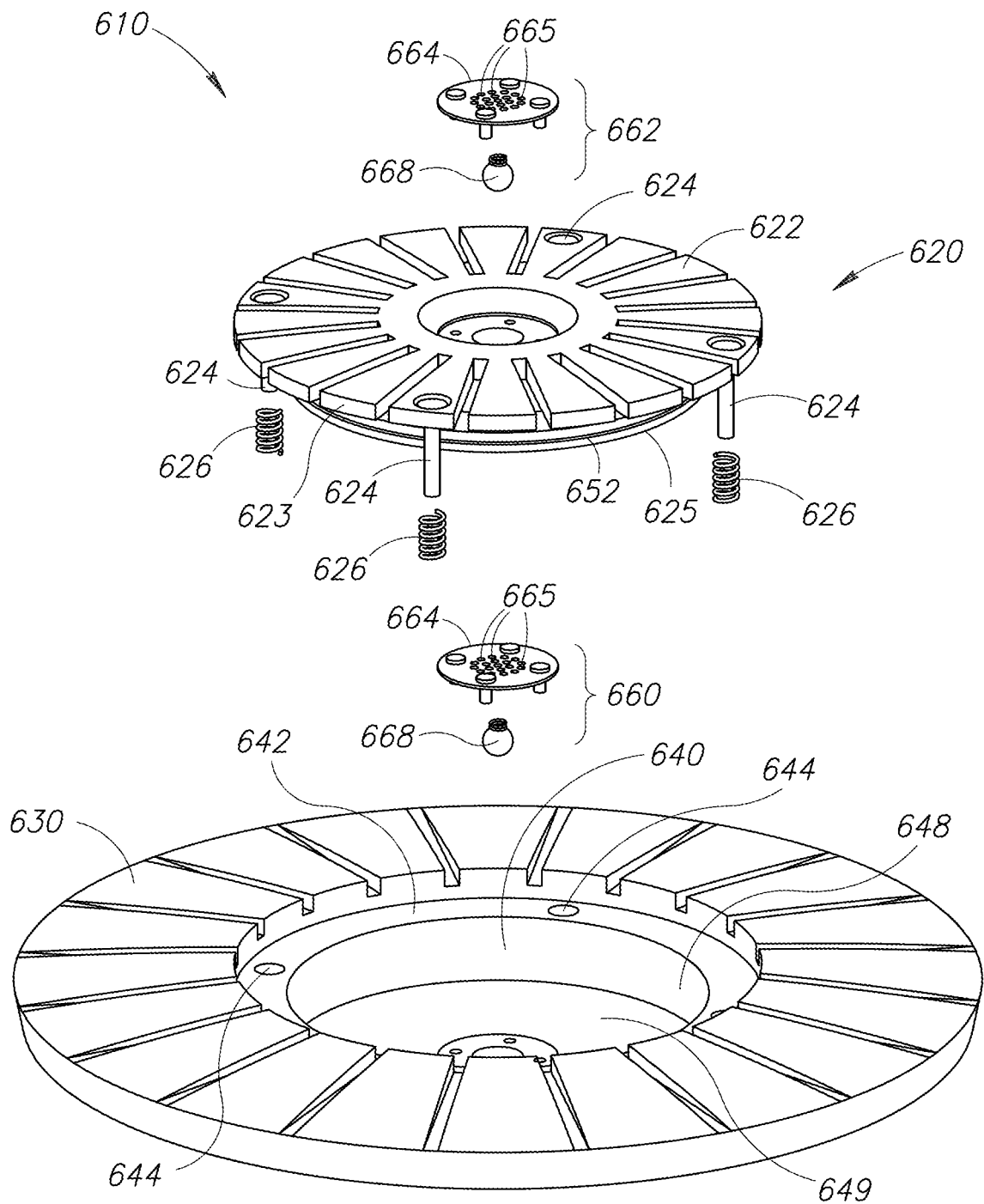
FIG. 17 is an exploded perspective view of the manhole cover assembly of the circulation system depicted in FIG. 16.
Figure 18:
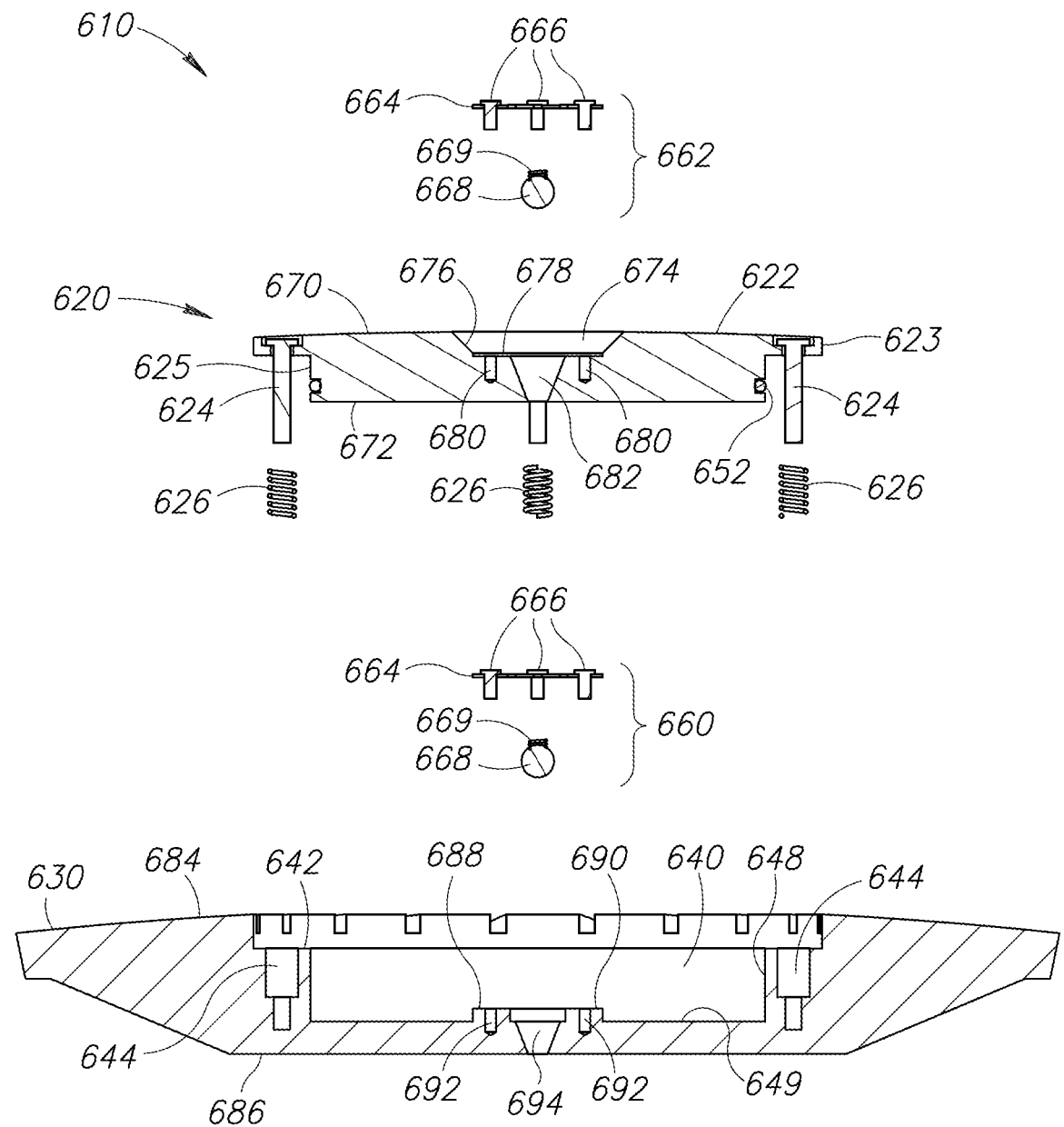
FIG. 18 is an exploded cross-sectional view of the manhole cover assembly of the circulation system depicted in FIG. 16.

The manhole cover assembly 610 includes a manhole cover 630 positioned on the ring support 250G inside the manhole 62. Referring to FIGS. 17 and 18, the manhole cover 630 is configured to house the pump assembly 620. The pump assembly 620 includes a movable piston 622 having one or more downwardly extending pins or guide members 624. In the embodiment illustrated, the piston 622 has an annular shaped overhang portion 623 and the guide members 624 have been implemented as pins inserted into through-holes formed in the overhang portion 623. The overhang portion 623 is positioned above and overhangs a generally cylindrically shaped body portion 625. The guide members 624 are spaced apart radially from the body portion 625 and extend downwardly beyond the body portion 625.

Figure 19A:
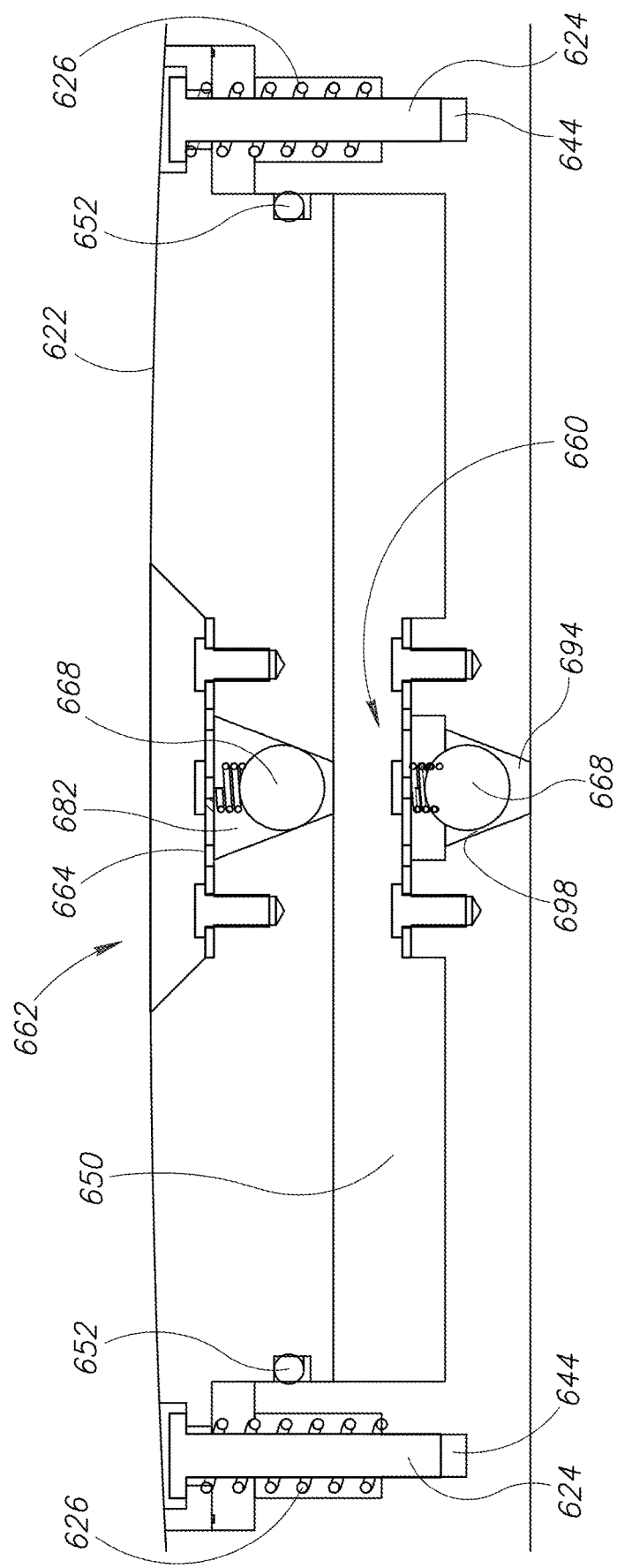
FIG. 19A is a cross-sectional view of a movable piston of the manhole cover of the circulation system depicted in FIG. 16 depicted in an outward first position.
Figure 19B:
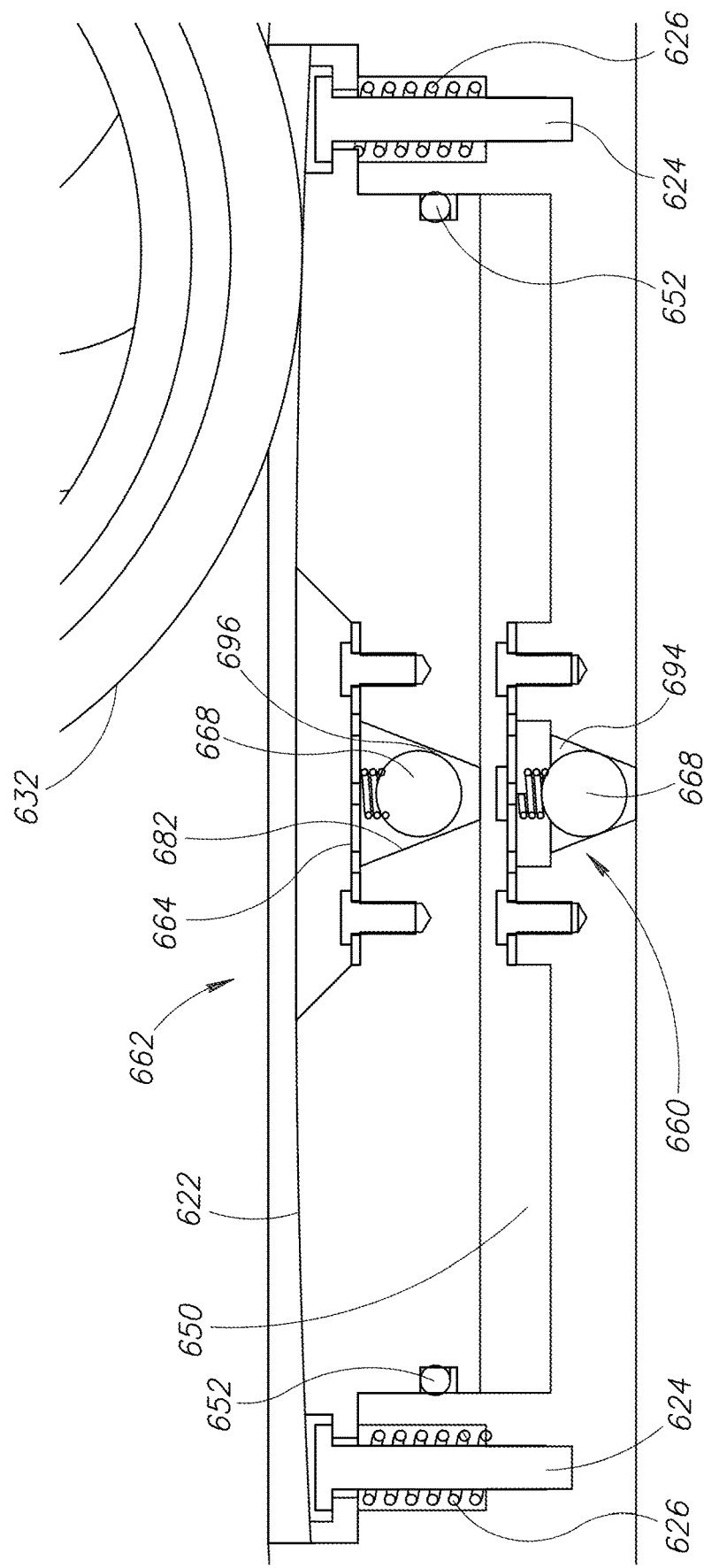
FIG. 19B is a cross-sectional view of the movable piston of the manhole cover of the circulation system depicted in FIG. 16 depicted in an inward second position.

One or more biasing members 626 (e.g., coil springs) bias the piston 622 in an outward first position (see FIG. 19A). In the embodiment illustrated, each of the biasing member(s) 626 has been implemented as a coil spring that is wrapped around one of the guide members 624. Referring to FIG. 19B, a downwardly directed force (e.g., applied by a wheel 632 of an automobile) of sufficient magnitude to overcome a biasing force applied by the biasing member(s) 626 transitions the piston 622 from the outward first position (see FIG. 19A) to an inward second position illustrated in FIG. 19B.

Referring to FIGS. 17 and 18, the manhole cover 630 has an upwardly opening central recess 640 formed therein. A ledge 642 is formed in the recess 640. The overhang portion 623 is configured to be adjacent the ledge 642 when the piston 622 is positioned inside the central recess 640. The ledge 642 includes an opening 644 for each guide member 624. Each opening 644 is configured to receive one of the guide members 624 therein. In the embodiment illustrated, each opening 644 also receives the biasing member 626 wrapped around the guide member 624. Each opening 644 is configured to allow the guide member 624 to slide inwardly and outwardly therein. Below the ledge 642, the recess 640 has a sidewall 648 that extends upwardly from an upwardly facing surface 649. The sidewall 648 is configured to be adjacent to the body portion 625 when the piston 622 is positioned inside the central recess 640.

Referring to FIG. 19A, when the piston 622 is positioned inside the central recess 640, the body portion 625 defines an inner cavity 650 inside the recess 640 (see FIGS. 17 and 18). Referring to FIGS. 17 and 18, optionally, a seal 652 (e.g., an O-ring) surrounds the body portion 625 and forms an airtight seal with the sidewall 648 of the recess 640 and seals the inner cavity 650. However, the seal 652 is not required.

The manhole cover assembly 610 includes inner and outer check valves 660 and 662. Referring to FIG. 18, each of the check valves 660 and 662 has a movable disk member 664, one or more fasteners 666, a ball-shaped or spherical member 668, and a biasing member 669. Referring to FIG. 17, the disk member 664 has a plurality of through-holes 665 formed therein.

The spherical members 668 are each configured to be transitioned between open and closed positions. In FIG. 19A, the spherical member 668 of the inner check valve 660 is in the open position and the spherical member 668 of the outer check valve 662 is in the closed position. When the spherical member 668 of the inner check valve 660 is in the open position, the inner cavity 650 is in fluid communication with the internal atmosphere 104 (see FIG. 3). When the spherical member 668 of the outer check valve 662 is in the closed position, the inner cavity 650 is not in fluid communication with the external atmosphere 102 (see FIG. 3).

In FIG. 19B, the spherical member 668 of the inner check valve 660 is in the closed position and the spherical member 668 of the outer check valve 662 is in the open position. When the spherical member 668 of the outer check valve 662 is in the open position, the inner cavity 650 is in fluid communication with the external atmosphere 102 (see FIG. 3). When the spherical member 668 of the inner check valve 660 is in the closed position, the inner cavity 650 is not in fluid communication with the internal atmosphere 104 (see FIG. 3).

Referring to FIG. 18, in the embodiment illustrated, the piston 622 has an upper surface 670 opposite a lower surface 672. An upper recess 674 is formed in the upper surface 670 and configured to receive the disk member 664 of the outer check valve 662. The upper recess 674 is defined by a sidewall 676 and an upwardly facing surface 678. The sidewall 676 tapers outwardly from the upwardly facing surface 678 toward the upper surface 670. The upper recess 674 also includes an opening 680 for each of the fasteners 666 of the outer check valve 662.

The openings 680 are spaced apart from a central through-hole 682. The central through-hole 682 tapers outwardly from the lower surface 672 toward the upwardly facing surface 678. The central through-hole 682 is configured to receive the spherical member 668 of the outer check valve 662. The biasing member 669 of the outer check valve 662 is positioned above the spherical member 668 of the outer check valve 662 inside the central through-hole 682. The central through-hole 682 is covered by the disk member 664, which traps the biasing member 669 and the spherical member 668 inside the central through-hole 682. The biasing member 669 is positioned between the disk member 664 and the spherical member 668. The biasing member 669 presses against the disk member 664 and biases the spherical member 668 toward the closed position (see FIG. 19A). Referring to FIG. 19A, in the closed position, the spherical member 668 is pressed against the piston 622 inside the central through-hole 682 and prevents the external atmosphere 102 (see FIG. 3) from flowing through the central through-hole 682. On the other hand, referring to FIG. 19B, in the open position, the spherical member 668 is spaced apart from the piston 622 (by an annular gap 696) inside the central through-hole 682 and allows the external atmosphere 102 (see FIG. 3) to flow through the central through-hole 682.

Referring to FIG. 18, the manhole cover 630 has an upper surface 684 opposite a lower surface 686. The upwardly facing surface 649 of the recess 640 has a central raised portion 688 configured to abut and support the disk member 664 of the inner check valve 660. The central raised portion 688 has an upwardly facing surface 690 with an opening 692 (substantially identical to the opening 680) for each of the fasteners 666 of the inner check valve 660.

The openings 692 are spaced apart from a central through-hole 694 (substantially similar to the central through-hole 682). The central through-hole 694 is configured to receive the spherical member 668 of the inner check valve 660. The biasing member 669 of the inner check valve 660 is positioned above the spherical member 668 of the inner check valve 660 inside the central through-hole 694. The central through-hole 694 is covered by the disk member 664, which traps the biasing member 669 and the spherical member 668 inside the central through-hole 694. The biasing member 669 is positioned between the disk member 664 and the spherical member 668. The biasing member 669 presses against the disk member 664 and biases the spherical member 668 toward the closed position (see FIG. 19B). Referring to FIG. 19B, in the closed position, the spherical member 668 of the inner check valve 660 is pressed against the manhole cover 630 inside the central through-hole 694 and prevents the internal atmosphere 104 (see FIG. 3) from flowing through the central through-hole 694. On the other hand, referring to FIG. 19A, in the open position, the spherical member 668 of the inner check valve 660 is spaced apart from the manhole cover 630 (by an annular gap 698) inside the central through-hole 694 and allows the internal atmosphere 104 (see FIG. 3) to flow through the central through-hole 694.

Referring to FIG. 19B, when a downwardly directed force (e.g., applied by the wheel 632) of sufficient magnitude to overcome a biasing force applied by the biasing member(s) 626 is applied to the upper surface 670 of the piston 622, the piston 622 transitions to the inward second position. As the piston 622 transitions to the inward second position, pressure inside the sealed inner cavity 650 increases. The increased pressure presses on the spherical member 668 of the outer check valve 662, which presses on and compresses the biasing member 669 of the outer check valve 662 allowing the spherical member 668 to move outwardly thereby defining the annular gap 696 between the spherical member 668 and the tapered central through-hole 682. Thus, the outer check valve 662 is actuated (or opened). When the outer check valve 662 is open, the portion of the internal atmosphere 104 (see FIG. 3) inside the inner cavity 650 vents into the external atmosphere 102 (see FIG. 3) through the through-holes 665 (see FIG. 17) of the disk member 664. At the same time, the increased pressure inside the inner cavity 650 presses on the spherical member 668 of the inner check valve 660 in the same direction as the biasing member 669 (see FIG. 18), pushing the spherical member 668 farther into the central through-hole 694. This closes the lower inner check valve 660.

On the other hand, referring to FIG. 19A, when the downwardly directed force is no longer applied to the upper surface 670 of the piston 622, the biasing member(s) 626 (see FIGS. 17 and 18) return the piston 622 to the outward first position. As the piston 622 transitions to the outward first position, the pressure inside the sealed inner cavity 650 decreases. This decreased pressure pulls on and actuates (or opens) the lower inner check valve 660, allowing a portion of the internal atmosphere 104 (see FIG. 3) to enter the inner cavity 650 from the vault 12 through the central through-hole 694 and the through-holes 665 (see FIG. 17) of the disk member 664. At the same time, the decreased pressure inside the inner cavity 650 no longer presses on (or actuates) the outer check value 662. Instead, the decreased pressure pulls the spherical member 668 downwardly and closes the outer check valve 662.

Referring to FIG. 16, a duct system 700 may be removably coupled to the ring support 250G below the manhole cover assembly 610. The duct system 700 includes a duct 702 coupled to the ring support 250G by a support bracket assembly 710. The duct 702 may be substantially similar to a ventilation pipe 400 (illustrated in FIGS. 39, 45A, 49, 50, and 51 and described below). The duct 702 has a channel 704 with a first opening 706 (see FIG. 21B) positioned at or near the manhole cover assembly 610 and a second opening 708 positioned inside the vault 12 (e.g., at or near the floor 58).

Optionally, the duct 702 may have one or more holes (substantially similar to the second opening(s) 448 formed in the wall(s) 430 illustrated in FIG. 51 and described below) formed therein (e.g., near the second opening 708). Any hole(s) positioned above water partially filling the vault 12 allow the internal atmosphere 104 (see FIG. 3) to enter the channel 704 through the hole(s) and/or the external atmosphere 102 (see FIG. 3) to exit the channel 704 through the hole(s).

Figure 21A:
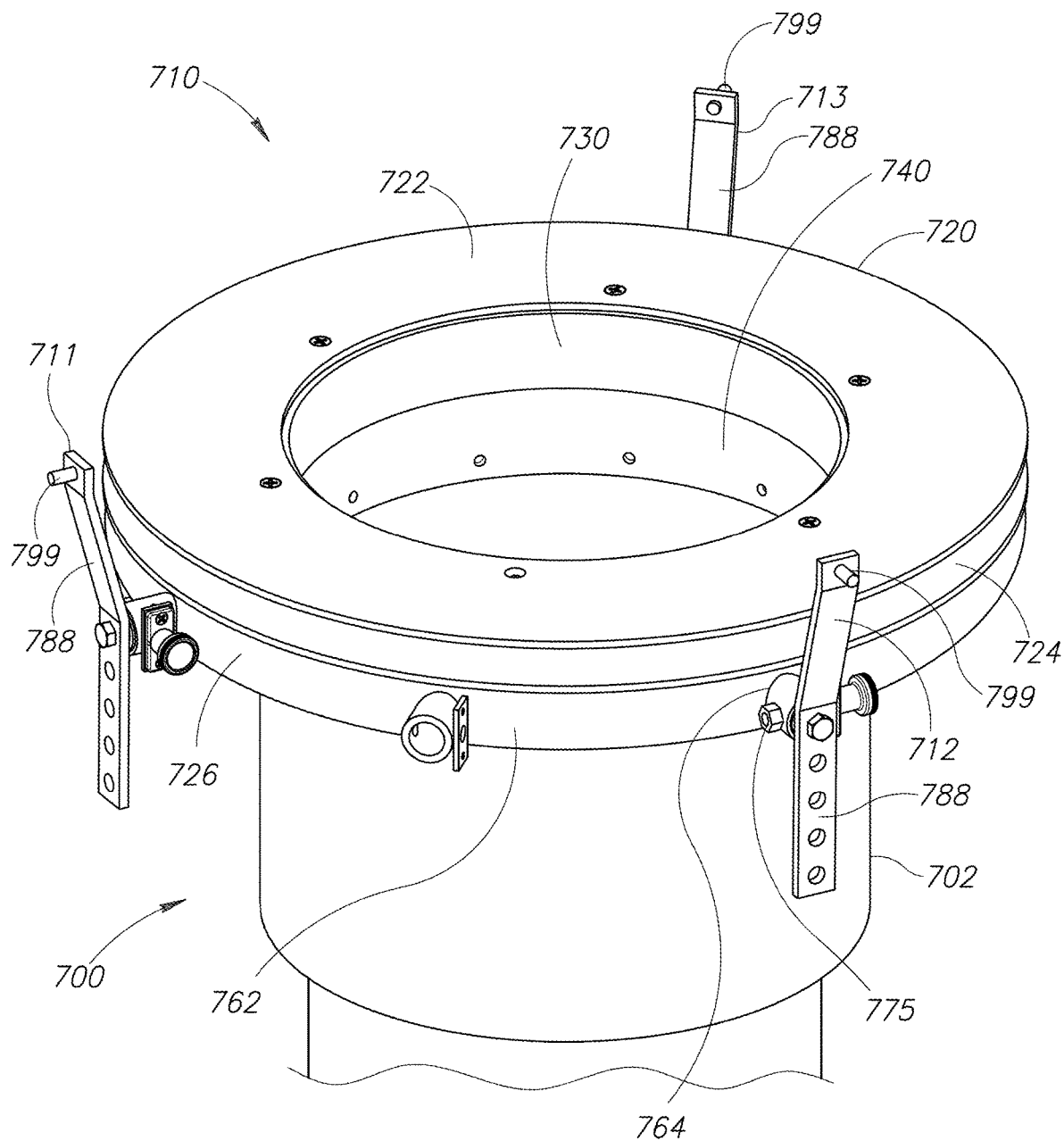
FIG. 21A is a perspective view of an upper portion of a duct system of the circulation system depicted in FIG. 16.
Figure 21B:
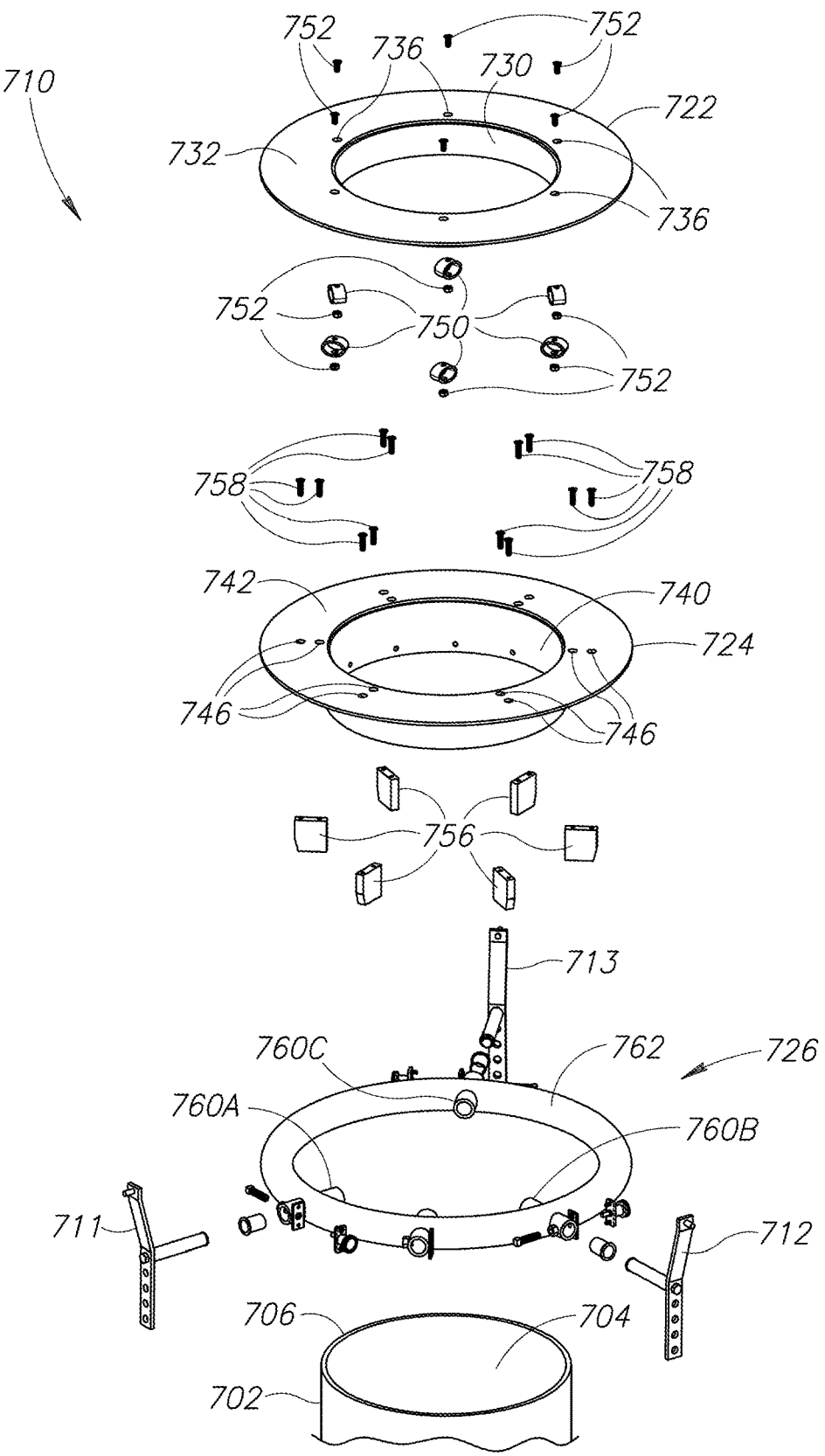
FIG. 21B is an exploded view of the upper portion of the duct system of FIG. 21A.

Referring to FIG. 21A, the support bracket assembly 710 includes a plurality of mounting assemblies 711-713 coupled to a support frame 720. The support frame 720 includes annular shaped first and second support members 722 and 724, and a ring-shaped mounting support assembly 726. Referring to FIG. 21B, the first support member 722 has an annular shaped sidewall 730 with an annular shaped upper flange 732 extending outwardly therefrom. The upper flange 732 has a plurality of through-holes 736 formed therein. Similarly, the second support member 724 has an annular shaped sidewall 740 with an annular shaped upper flange 742 extending outwardly therefrom. The upper flange 742 has a plurality of through-holes 746 formed therein.

A plurality of ring-shaped spring members 750 are positioned between the upper flanges 732 and 742 of the first and second support members 722 and 724. A plurality of fasteners 752 (e.g., nuts and bolts) extend through the through-holes 736 formed in the upper flange 732 and fasten the spring members 750 to the upper flange 732. The spring members 750 rest upon the upper flange 742 of the second support member 724 and position the first support member 722 at a desired height above the second support member 724. The sidewall 730 of the first support member 722 is inserted inside and extends along at least a portion of the sidewall 740 of the second support member 724.

The first opening 706 of the duct 702 surrounds the sidewall 740 of the second support member 724. In the embodiment illustrated, the duct 702 abuts the upper flange 742. However, this is not a requirement.

A plurality of spacers 756 are coupled to the upper flange 742 of the second support member 724 by a plurality of fasteners 758 (e.g., screws) inserted into the through-holes 746. The spacers 756 are positioned between the sidewall 740 of the second support member 724 and the mounting support assembly 726. The upper flange 742 of the second support member 724 overhangs and rests upon the mounting support assembly 726. The spacers 756 may help center the sidewall 740 with respect to the mounting support assembly 726. Additionally, the spacers 756 may be positioned adjacent the duct 702 and may help couple the duct 702 to the sidewall 740 of the second support member 724.

The mounting support assembly 726 includes a plurality of tube assemblies 760A-760C mounted to a hoop-shaped support member 762. Each of the tube assemblies 760A-760C is immovably affixed inside a different aperture 764 (see FIGS. 21A, 22, and 23A) formed in the support member 762 and extends through the support member 762 radially. In the embodiment illustrated, the mounting support assembly 726 includes the three tube assemblies 760A-760C. However, this is not a requirement.

Figure 23A:
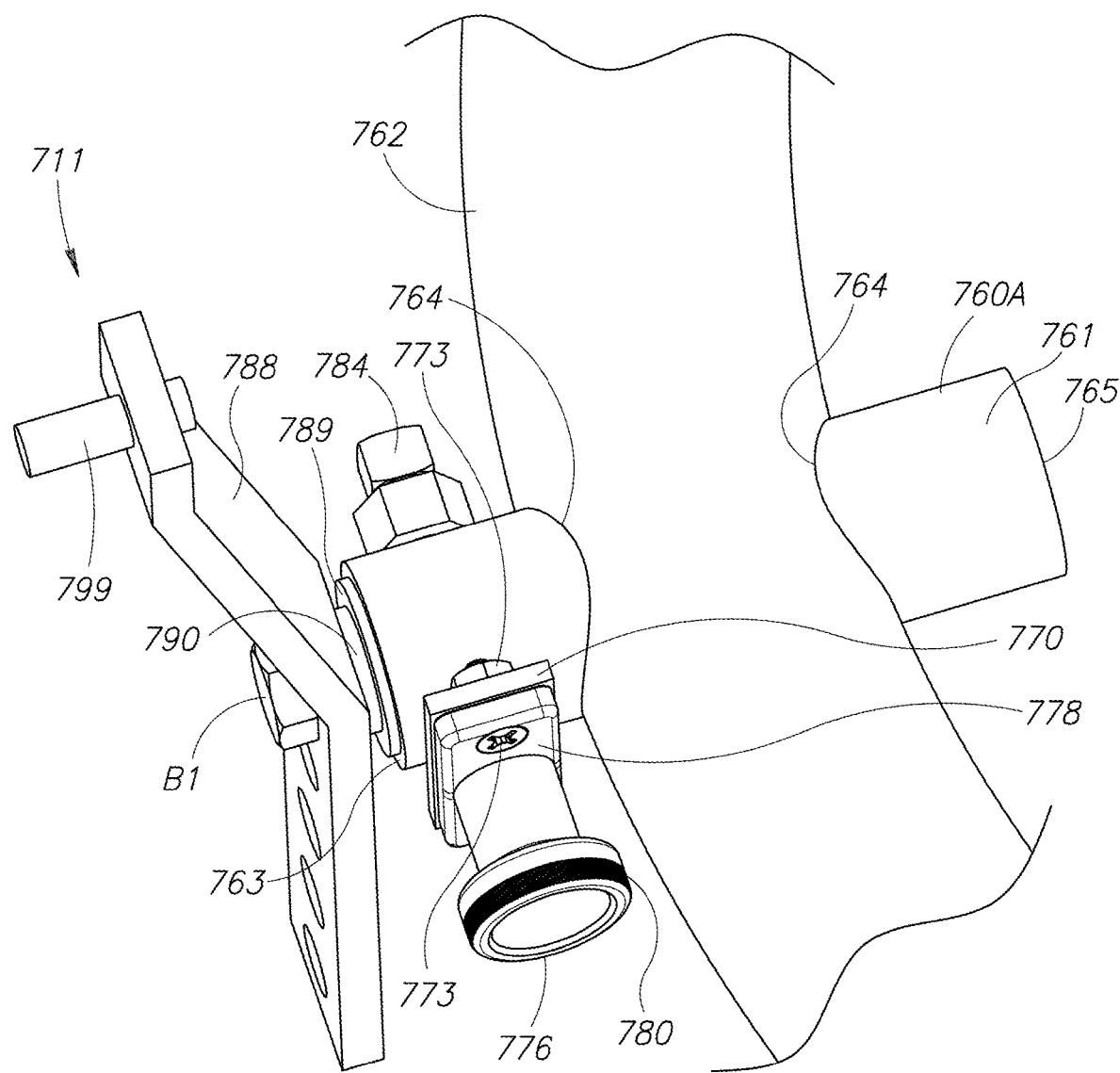
FIG. 23A is a perspective view of a mounting assembly and a hoop-shaped support member of the support bracket assembly of the duct system of FIG. 21A.
Figure 23B:
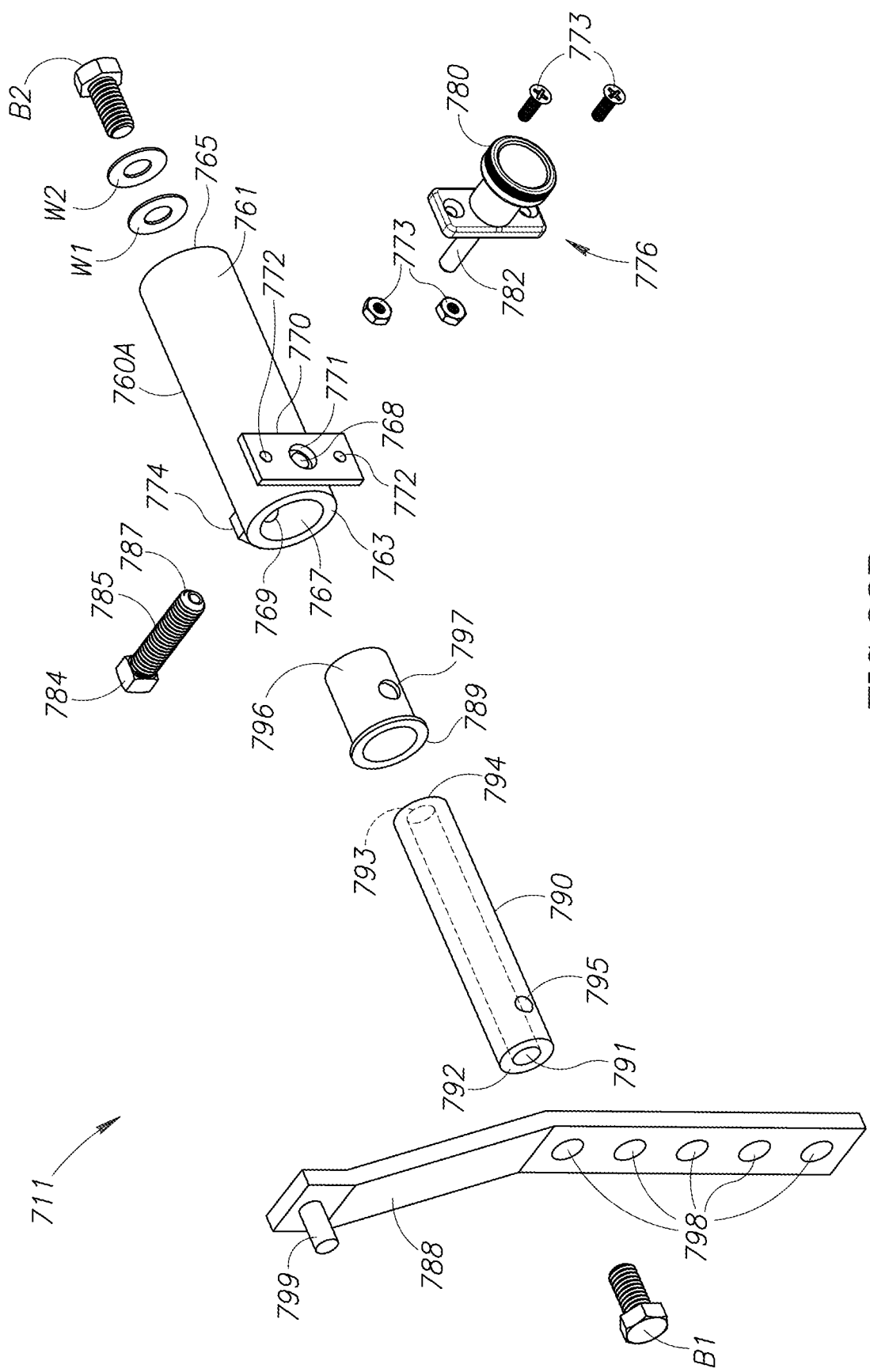
FIG. 23B is an exploded view of the mounting assembly of FIG. 23A.

The tube assemblies 760A-760C are substantially identical to one another so for the sake of brevity, only the tube assembly 760A will be described in detail. However, the tube assemblies 760B and 760C each have substantially identical component parts to the tube assembly 760A. Therefore, like reference numerals have been used to identify like components of the tube assemblies 760A-760C. Referring to FIG. 23A, the tube assembly 760A includes a mount tube 761 that is generally cylindrically shaped with a generally circular cross-sectional shape. Referring to FIG. 23B, an open-ended channel 767 extends longitudinally through the mount tube 761. The channel 767 is open at first and second ends 763 and 765 of the mount tube 761. Near the first end 763, the mount tube 761 has a first through-hole 768 aligned across the channel 767 with a second through-hole 769.

Figure 20:
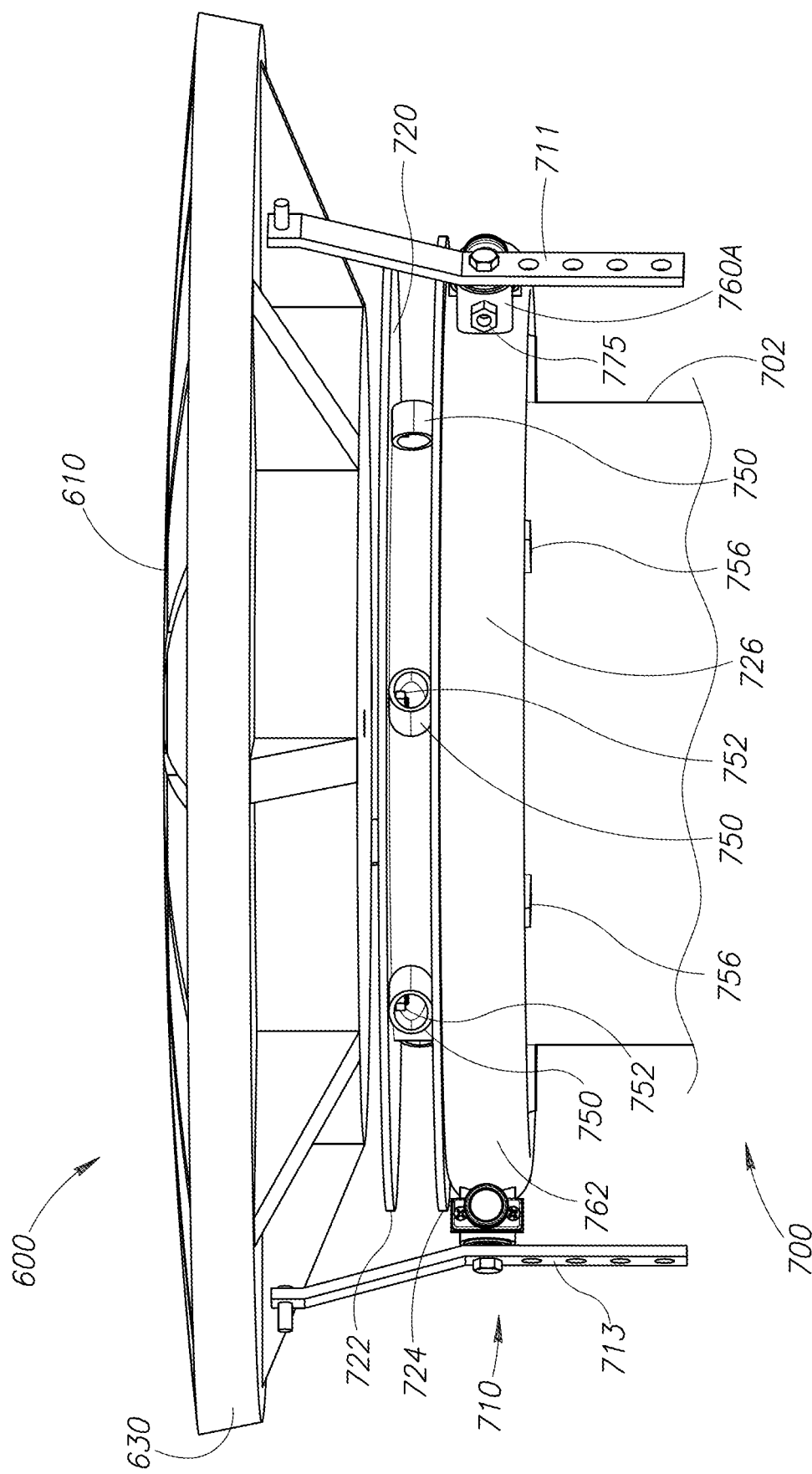
FIG. 20 is a perspective view of an upper portion of the circulation system depicted in FIG. 16.

The tube assembly 760A includes a plunger mount plate 770 mounted (e.g., welded) to the mount tube 761. The plunger mount plate 770 has a through-hole 771 that is aligned with the first through-hole 768. Optionally, the plunger mount plate 770 may include one or more through-holes 772 configured to receive one or more fasteners 773 (e.g., nuts and bolts). A nut 774 with a threaded through-hole 775 (see FIG. 20) may be mounted (e.g., welded) to the mount tube 761 adjacent the second through-hole 769.

Figure 22:
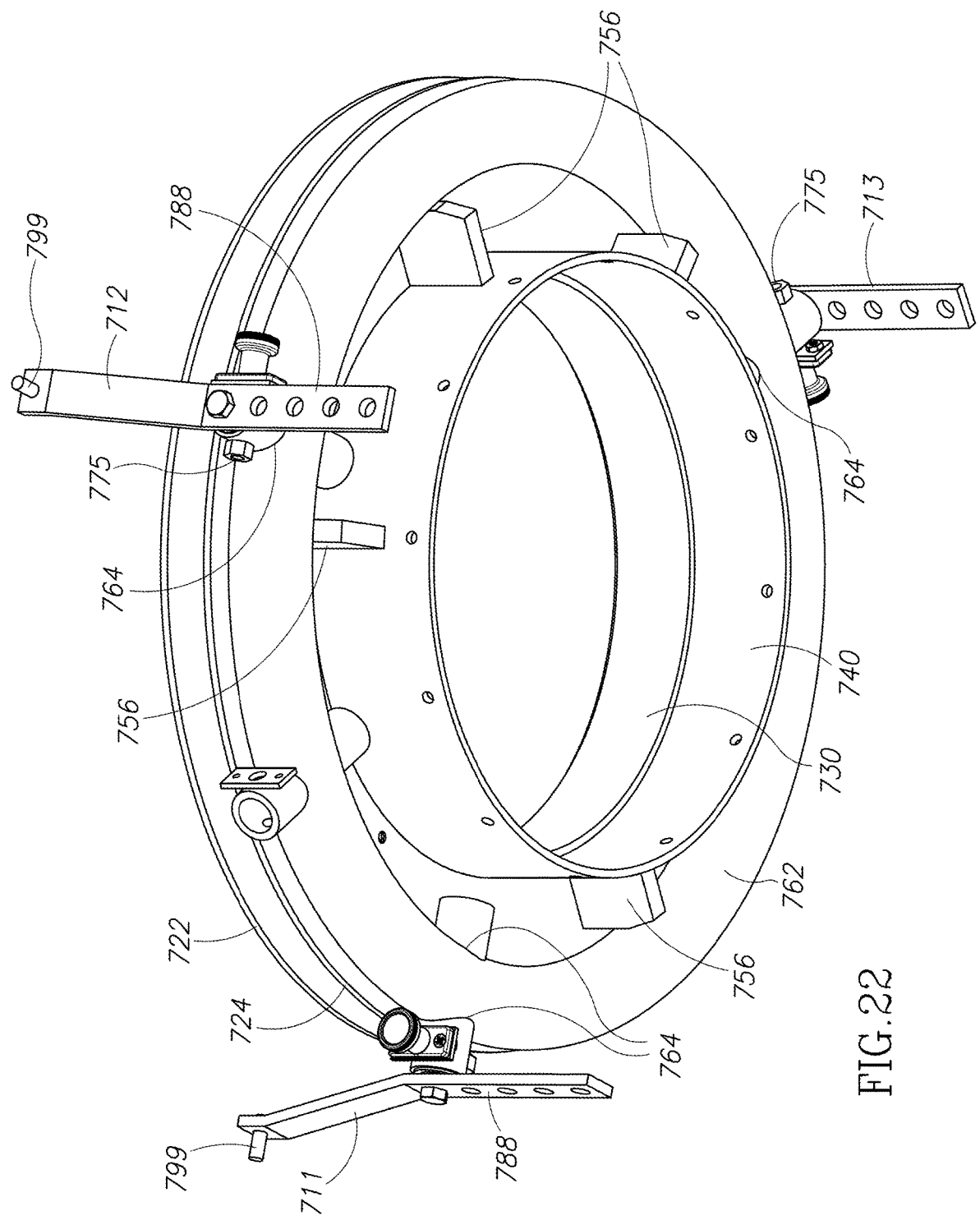
FIG. 22 is a perspective view of a lower portion of a support bracket assembly of the duct system of FIG. 21A.

Referring to FIG. 22, the mounting assemblies 711-713 are substantially identical to one another. For the sake of brevity, only the mounting assembly 711 will be described in detail below. However, the like reference numerals have been used to identify substantially identical components of the mounting assemblies 711-713.

Referring to FIG. 23A, the mounting assembly 711 includes a plunger assembly 776 with a mounting plate 778 configured to be mounted to the plunger mount plate 770 (e.g., by the one or more fasteners 773). Referring to FIG. 23B, the plunger assembly 776 has a spring loaded retractable handle 780 and a pin 782 configured to be inserted into the through-hole 771 formed in the plunger mount plate 770. Pulling the handle 780 outwardly causes the pin 782 to retract toward the handle 780. On the other hand, releasing the handle 780 (and allowing it to retract) causes the pin 782 to extend further away from the handle 780 (as shown in FIG. 23B). Thus, selectively pulling on the handle 780 or releasing it, the pin 782 may be selectively retracted and extended.

A set screw 784 with outside threads 785 is configured to be threaded into the threaded through-hole 775 (see FIG. 20) of the nut 774. The set screw 784 has been omitted from the mounting assemblies 711-713 in FIGS. 20, 21A, and 22 to provide a view of the threaded through-hole 775. Referring to FIG. 23B, the set screw 784 has a free end 787.

The mounting assembly 711 includes an upright arm 788 coupled to a plunger tube 790 configured to be positioned inside the channel 767 of the mount tube 761. The set screw 782 fixes the position of the plunger tube 790 inside the mount tube 761. The plunger tube 790 is configured to extend longitudinally through the channel 767. The plunger tube 790 has a first threaded opening 791 formed in its first end 792 and a second threaded opening 793 formed in its second end 794. As will be explained below, during installation, a through-hole 795 may be formed in the plunger tube 790.

A bushing or sleeve 796 may be inserted into the channel 767 at the first end 763 of the mount tube 761. The sleeve 796 may have a flange 789 formed in one end configured to abut the first end 763 of the mount tube 761 and remain outside the channel 767. The plunger tube 790 may be inserted into the channel 767 of the mount tube 761 through the sleeve 796. In such embodiments, referring to FIG. 23A, the first end 792 (see FIG. 23B) of the plunger tube 790 may extend outwardly toward the arm 788 beyond both the flange 789 of the sleeve 796 (see FIG. 23B) and the first end 763 of the mount tube 761. As will be explained below, during installation, a through-hole 797 may be formed in the sleeve 796.

Referring to FIG. 23B, first and second threaded bolts B1 and B2 are configured to be removably received inside the first and second threaded openings 791 and 793, respectively, of the plunger tube 790. Optionally, one or more washers W1 and W2 may be positioned between a head of the second threaded bolt B2 and the second end 794 of the plunger tube 790. The bolt B2 secures the washers W1 and W2 to the second end 794 of the plunger tube 790. The washers W1 and W2 support the second end 794 of the plunger tube 790 and help it to slide more easily through the sleeve 796. The washers W1 and W2 have a larger diameter than both the plunger tube 790 and the through-channel of the sleeve 796. The washers W1 and W2 help support the second end 794 when the tube assembly 760A is under load and the plunger tube 790 tends to pivot around the sleeve 796. The washers W1 and W2 may also prevent the plunger tube 790 from being removed or falling out because the washers W1 and W2 are stopped by the sleeve 796.

The arm 788 has at least one through-hole 798 formed therein. The arm 788 may be welded to the first end 792 of the plunger tube 790 with a selected one of the through-hole(s) 798 aligned with the first threaded opening 791 of the plunger tube 790. Alternatively, the bolt B1 may be used to couple the arm 788 to the first end 792 of the plunger tube 790. In such embodiments, the bolt B1 passes through the selected one of the through-hole(s) 798 and into the first threaded opening 791 of the plunger tube 790.

The arm 788 has a projection 799 positioned to engage the ring support 250G (see FIG. 16). In the embodiment illustrated, the arm 788 is non-linear (e.g., bent) to help position the projection 799 near the ring support 250G (see FIG. 16) and avoid any inwardly extending protrusions that may be present in the ring support 250G (e.g., a ring support having a different configuration than the ring support 250G illustrated).

The set screw 784 is configured to be threaded into the threaded through-hole 775 (see FIG. 20) of the nut 774 and passes through the second through-hole 769 formed in one of the mount tube 761 to engage the outside of the sleeve 796. The free end 787 of the set screw 784 bears against the outside of the sleeve 796 and limits or locks its rotation. Tightening the set screw 784 against the outside of the sleeve 796 presses the sleeve 796 against the exterior of the plunger tube 790 thereby gripping the plunger tube 790 and preventing its longitudinal and rotational movement inside the mount tube 761. Loosening the set screw 794 allows the position of the plunger tube 790 (as well as the positions of the arm 788 and the projection 799) to be adjusted within the ring support 250G (see FIG. 16). The plunger tube 790 may be held in a desired position and the position of the through-hole 795 marked for drilling in the field. The through-hole 795 receives the pin 782 assuring the plunger tube 790 as well as the arm 788 and the projection 799 are correctly located after any service work is done.

The pin 782 passes through (1) the through-hole 771 formed in the plunger mount plate 770, (2) the first through-hole 768 of the mount tube 761, (3) the first through-hole 797 formed in the sleeve 796, and (4) the first through-hole 795 formed in the plunger tube 790. Engagement between the pin 782 and the through-holes 768, 797, and 795 prevents the plunger tube 790 from rotating and translating with respect to the mount tube 761.

The through-holes 795 and 797 may be formed (e.g., drilled) in the field (e.g., after measuring and test fitting), so that the projections 799 of the support bracket assembly 710 may be positioned inside holes (not shown) drilled in the ring support 250G (see FIG. 16). Referring to FIG. 16, the holes in the ring support 250G may be drilled when the duct system 700 is installed in the manhole vault 12.

Referring to FIG. 16, a portion of the external atmosphere 102 (see FIG. 3) or make up air may be passively pulled into the vault 12 through the ventilation stack 132 or the conduits 20A-20C (see FIG. 1) connected to adjacent vaults (e.g., the vault 14 illustrated in FIG. 1). The ventilation stack 132 may provide make up air if flow through the conduits 20A-20C (see FIG. 1) or air leaks in the vault 12 provide too little airflow. Optionally, the manhole cover 630 may include water dams (e.g., the dams 355 illustrated in FIG. 7, the dams 1524 illustrated in FIG. 40, and the like) configured to further help prevent water ingress.

Sixth Embodiment

Figure 24:
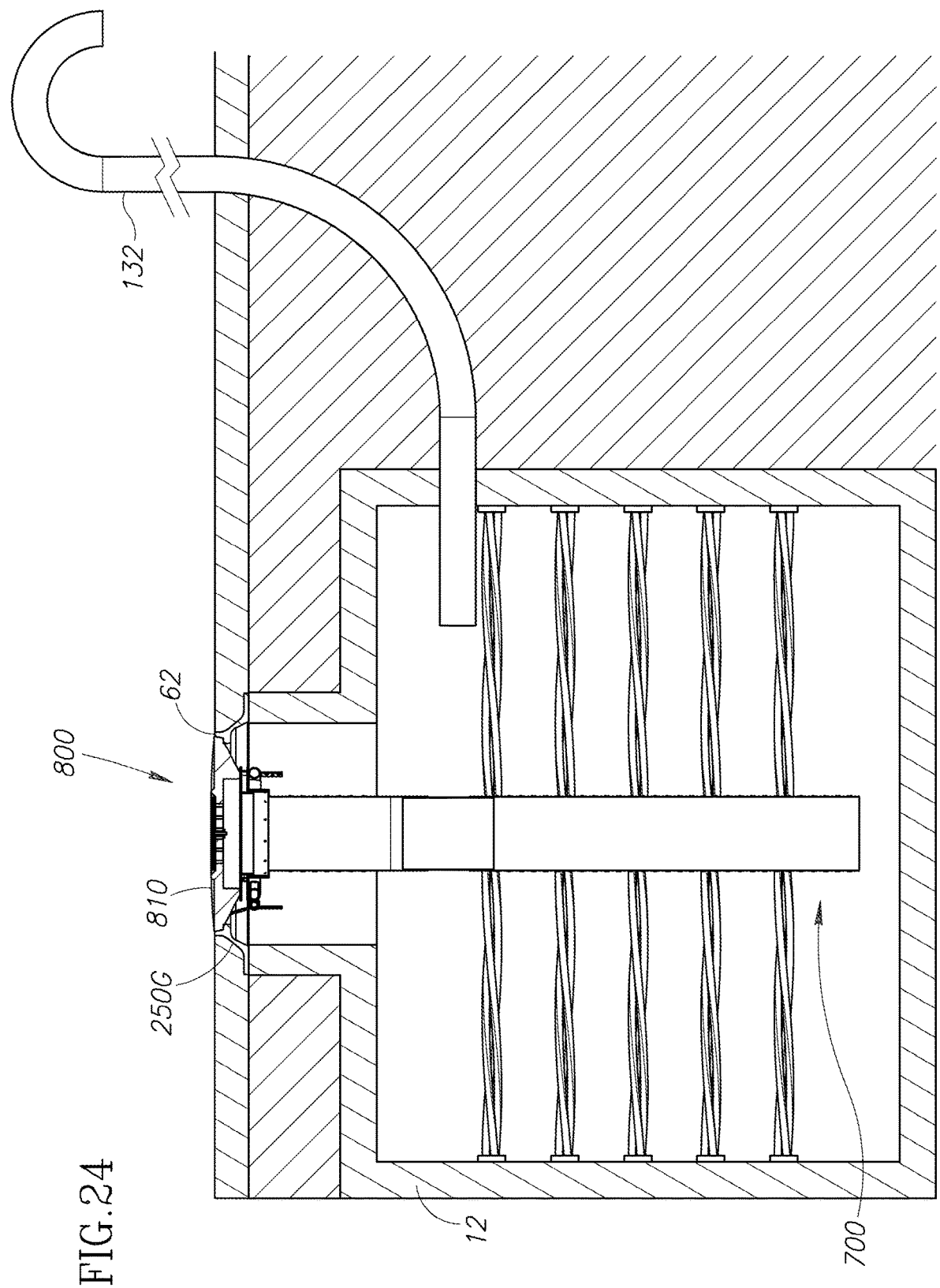
FIG. 24 is a cross-sectional view of a sixth embodiment of the circulation system including a manhole cover assembly.
Figure 25:
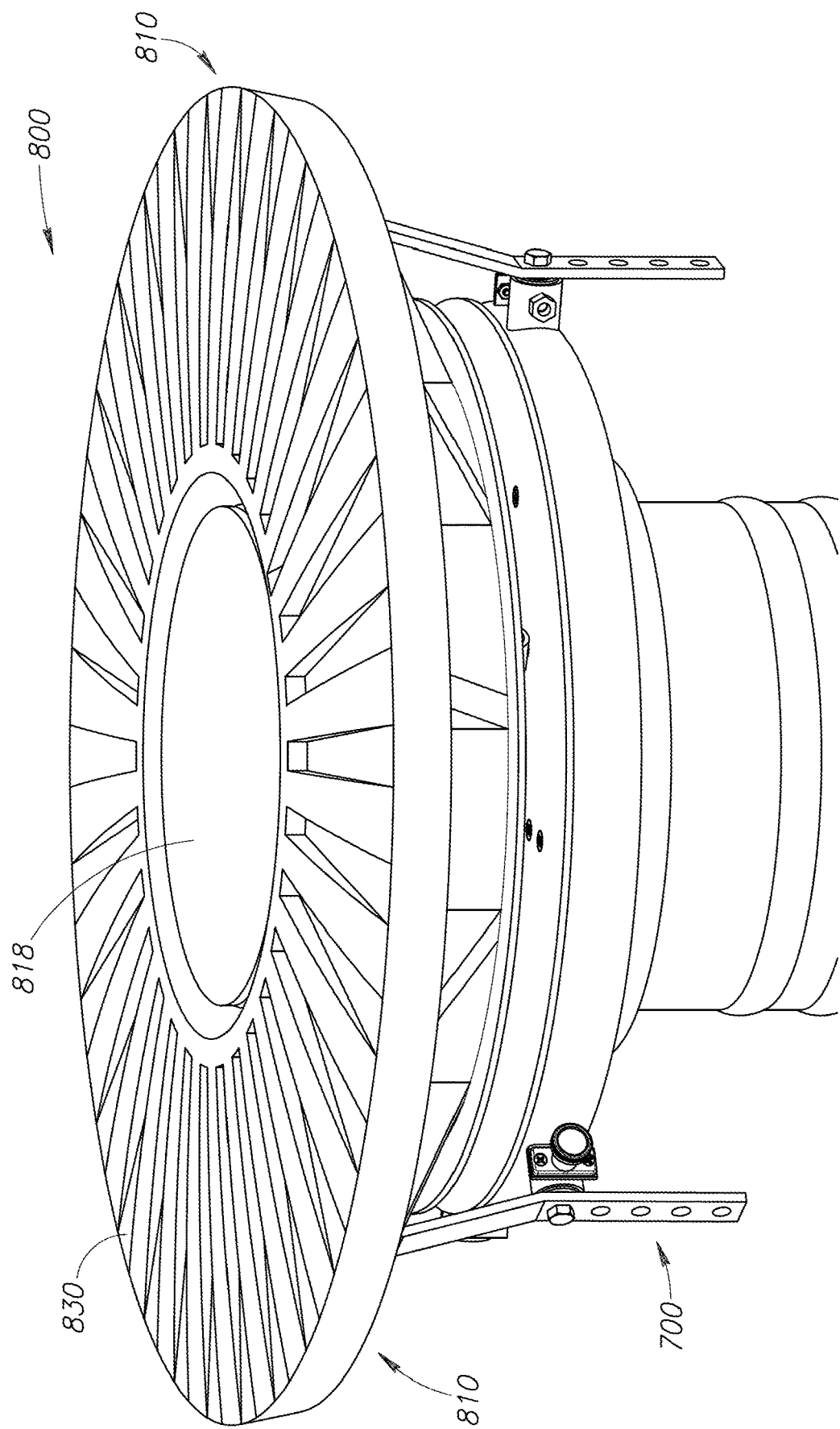
FIG. 25 is a perspective view of an upper portion of the circulation system depicted in FIG. 24.
Figure 26:
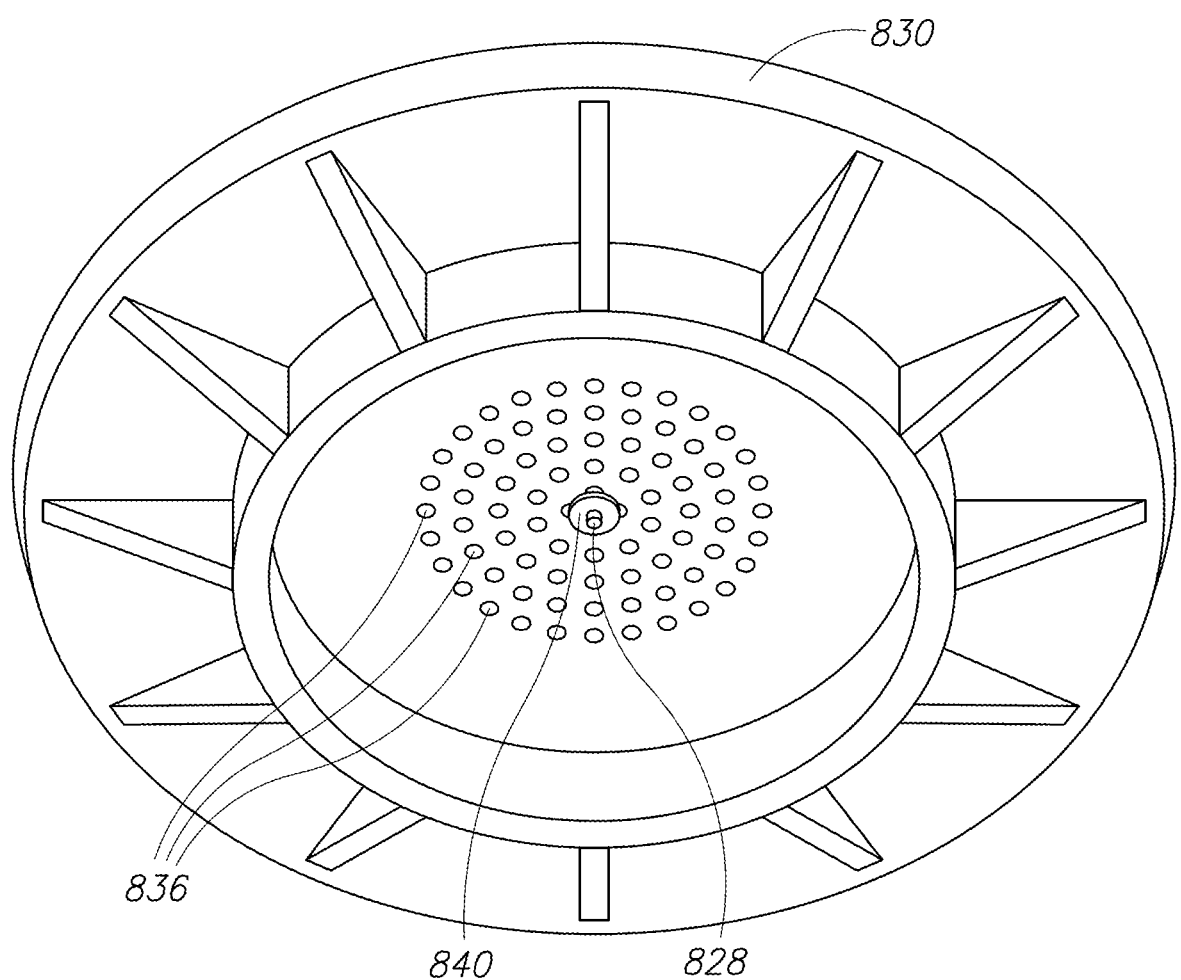
FIG. 26 is a perspective view of an underside of the manhole cover assembly of the circulation system depicted in FIG. 24.

FIG. 24 is a cross-section of a sixth embodiment of a circulation system 800 that is an exemplary implementation of the circulation system 100 (see FIG. 3). In this embodiment, the interface 92 (see FIG. 3) includes a manhole cover assembly 810. The interface 92 (see FIG. 3) may also include the ventilation stack 132. However, this is not a requirement. Referring to FIG. 25, in this embodiment, the air moving assembly 90 (see FIG. 3) is implemented as a flapper valve or check valve 818 component of the manhole cover assembly 810. Optionally, the air moving assembly 90 (see FIG. 3) may also include any of the air moving assemblies described herein. However, this is not a requirement. The circulation system 800 may also include the duct system 700 installed below the manhole cover assembly 810.

Figure 27:
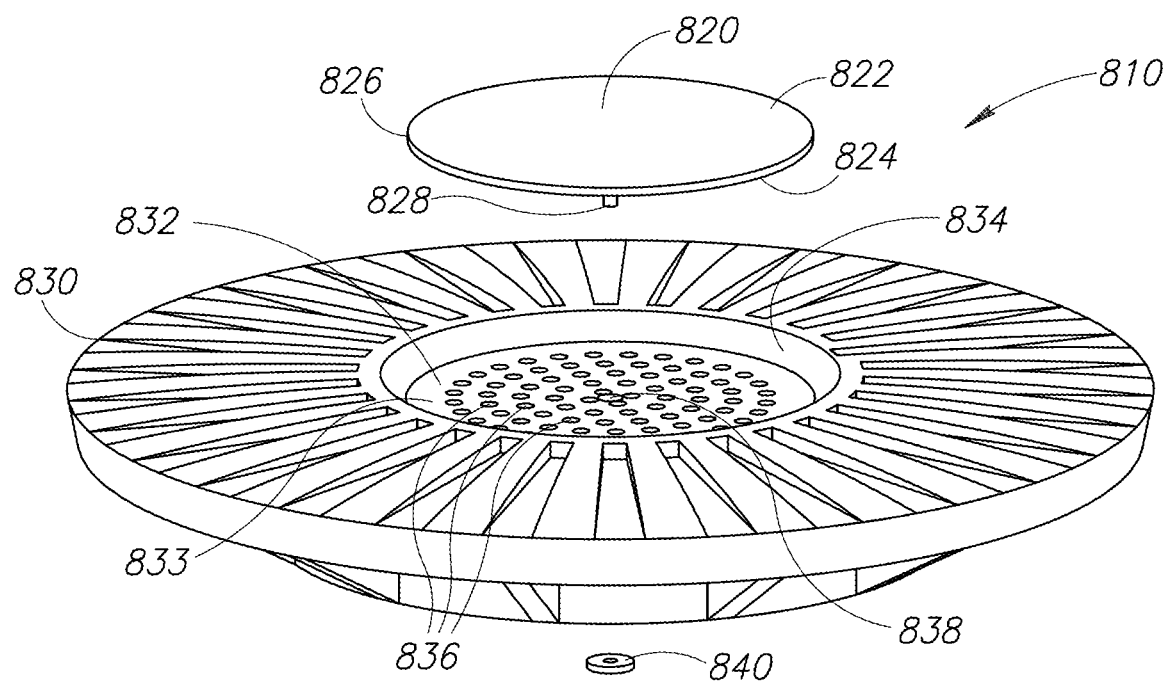
FIG. 27 is an exploded perspective view of the manhole cover assembly of the circulation system depicted in FIG. 24.
Figure 28:
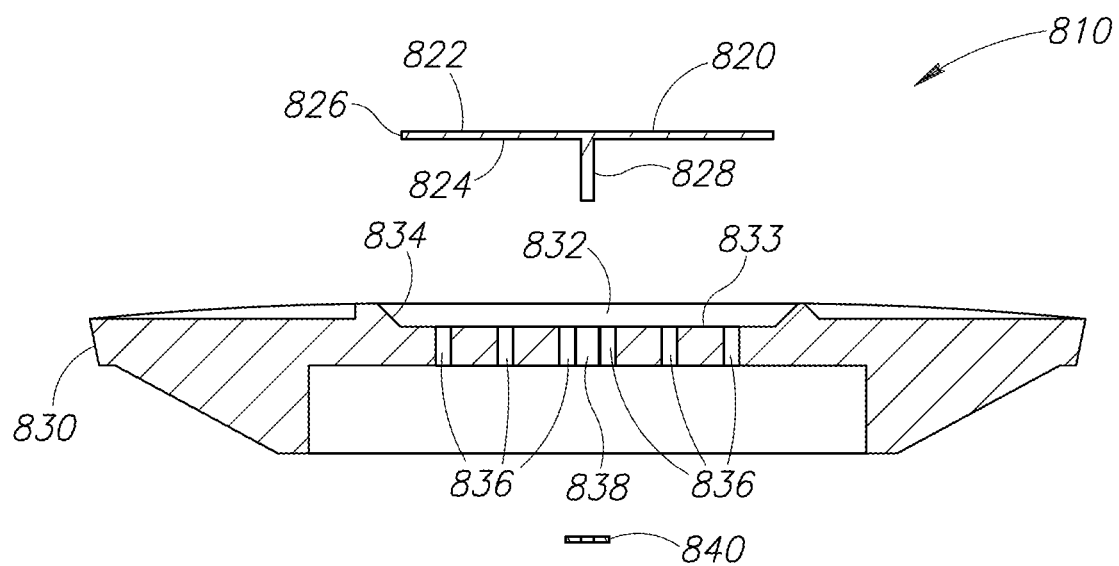
FIG. 28 is an exploded cross-sectional view of the manhole cover assembly of the circulation system depicted in FIG. 24.

Referring to FIGS. 27 and 28, the manhole cover assembly 810 includes a movable disk 820 and a manhole cover 830 (positioned on the ring support 250G inside the manhole 62 as shown in FIG. 24). The disk 820 has an upper surface 822, a lower surface 824, a peripheral edge 826, and a central projection or pin 828 that extends downwardly from the lower surface 824.

The manhole cover 830 includes a central recess 832 with an upwardly facing surface 833 surrounded by a sidewall 834. The sidewall 834 may be radiused or taper outwardly from the upwardly facing surface 833. The peripheral edge 826 of the disk 820 is configured to fit snuggly within the recess 832 adjacent the upwardly facing surface 833. However, a gap 850 (see FIG. 29B) is defined between the peripheral edge 826 of the disk 820 and the sidewall 834 when the disk 820 deforms outwardly at or near its peripheral edge 826.

Through-holes 836 are formed in the upwardly facing surface 833 of the recess 832. The through-holes 836 are implementations of the through-holes 151 (see FIG. 3). The manhole cover 830 includes a central through-hole 838 formed in the upwardly facing surface 833 and configured to receive the pin 828 when the disk 820 is positioned inside the recess 832. The pin 828 is long enough to extend through the central through-hole 838. A fastener 840 may be coupled to a portion of the pin 828 extending outwardly from the central through-hole 838.

Figure 29A:
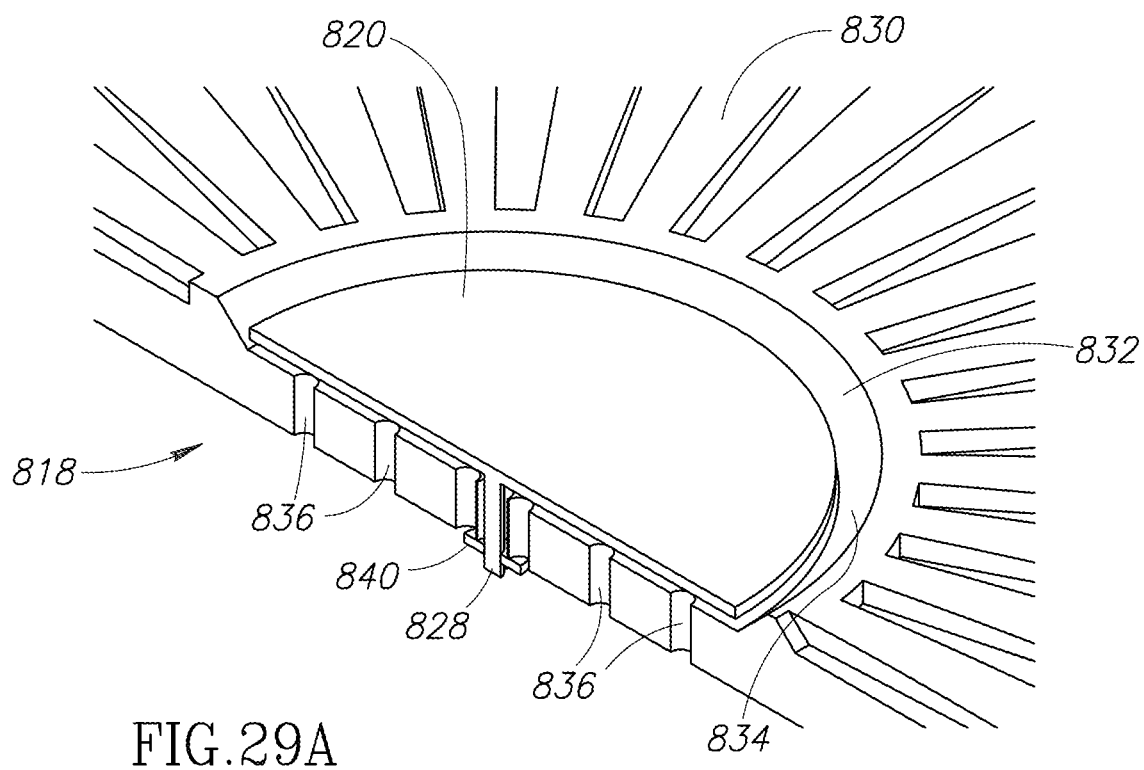
FIG. 29A is a perspective view of a check valve of the manhole cover assembly of the circulation system depicted in FIG. 24 depicted in a closed position.
Figure 29B:
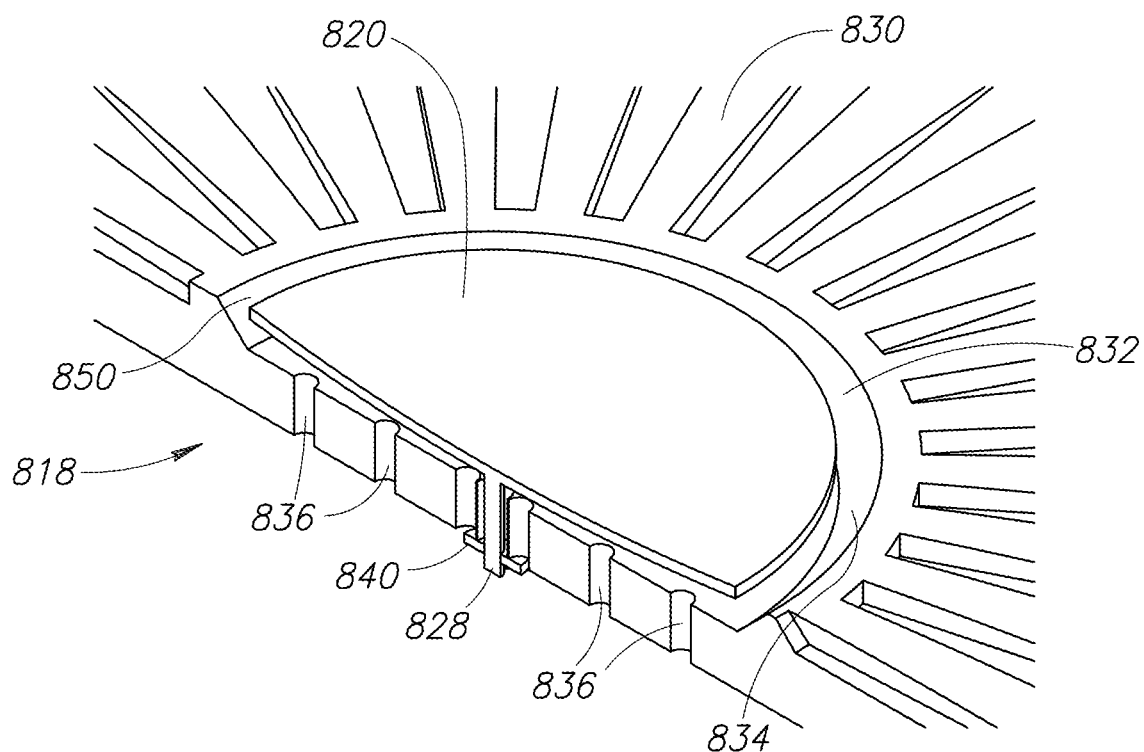
FIG. 29B is a perspective view of the check valve of the manhole cover assembly of the circulation system depicted in FIG. 24 depicted in an open position.

Referring to FIG. 29B, like the disk 520 (see FIGS. 9 and 11-12B), the disk 820 is configured to flex or deform from a closed position (see FIG. 29A) into an open position. In both the open and closed positions, the disk 820 may be recessed inside the central recess 832 formed in the manhole cover 830 to prevent damage to the check valve 818 from passing cars.

Pressure outside the vault 12 pushes or pulls on the disk 820. For example, when pressure outside the vault 12 falls below pressure inside the vault 12 by at least a predetermined amount, the disk 820 transitions from the closed position (see FIG. 29A) to the open position (see FIG. 29B). For example, when an automobile passes over the manhole cover assembly 810, pressure drops above the disk 820. When this occurs, the lower pressure above the disk 820 pulls the disk 420 from the closed position (see FIG. 29A) into the open position (see FIG. 29B) allowing at least a portion of the internal atmosphere 104 (see FIG. 3) to escape through the gap 850 (see FIG. 29B).

On the other hand, when the pressure outside the vault 12 is not below the pressure inside the vault 12 by at least the predetermined amount, the disk 820 remains in the closed position (see FIG. 29A) or transitions from the open position (see FIG. 29B) to the closed position. Referring to FIG. 29A, in the closed position, the disk 820 blocks the through-holes 836 and prevents water and/or debris from entering the vault 12 through the through-holes 836.

By way of a non-limiting example, the disk 820 of the check valve 818 may be in closed position (see FIG. 29A) as a vehicle approaches and creates a high-pressure zone over the manhole cover assembly 810. Then, the disk 820 of the check valve 818 may transition to the open position (see FIG. 29B) as the vehicle travels over the manhole cover assembly 810 and creates a low-pressure zone over the manhole cover assembly 810. Thus, the check valve 818 may be characterized as being vehicle actuated.

Referring to FIG. 24, a portion of the external atmosphere 102 (see FIG. 3) or make up air may be passively pulled into the vault 12 through the ventilation stack 132 or the conduits 20A-20C (see FIG. 1) connected to adjacent vaults (e.g., the vault 14 illustrated in FIG. 1). The ventilation stack 132 may provide make up air if flow through the conduits 20A-20C (see FIG. 1) or air leaks in the vault 12 provide too little airflow. Optionally, the manhole cover 630 may include water dams (e.g., the dams 355 illustrated in FIG. 7, the dams 1524 illustrated in FIG. 40, and the like) configured to further help prevent water ingress.

Seventh Embodiment

Figure 30:
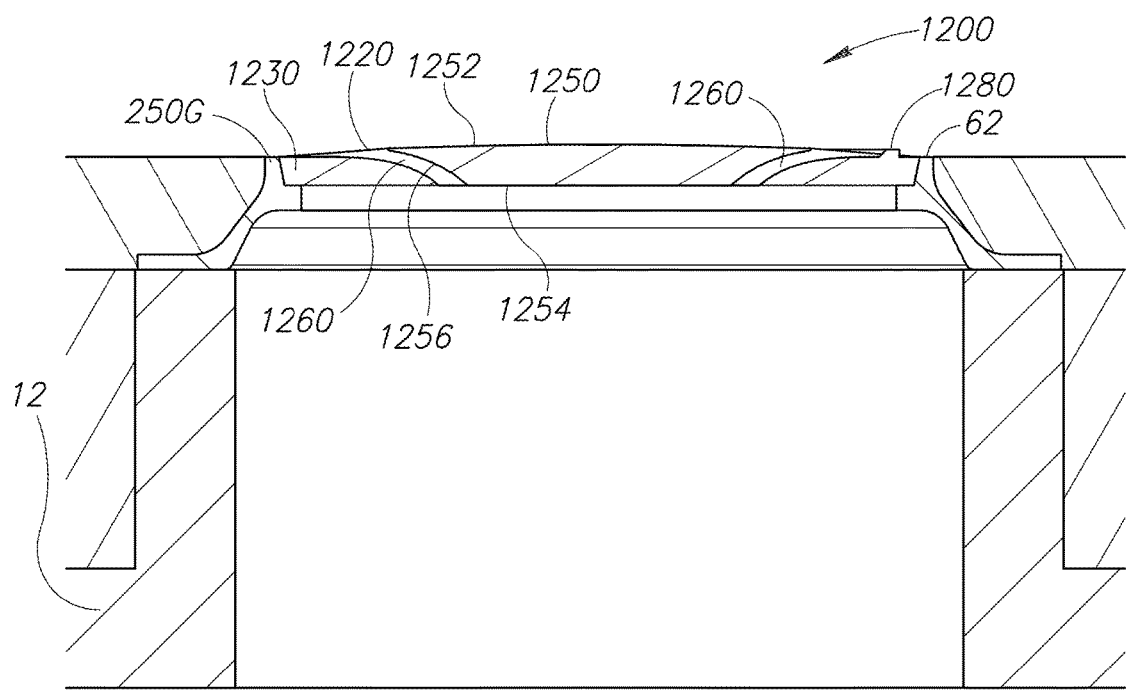
FIG. 30 is a cross-sectional view of a seventh embodiment of the circulation system including a manhole cover with an air scoop formed therein.

FIG. 30 is a cross-section of a seventh embodiment of a circulation system 1200 that is an exemplary implementation of the circulation system 100 (see FIG. 3). In this embodiment, the interface 92 (see FIG. 3) includes a manhole cover 1230 positioned on the ring support 250G inside the manhole 62. The interface 92 (see FIG. 3) may also include the ventilation stack 132 (see FIG. 3). However, this is not a requirement. In this embodiment, the air moving assembly 90 (see FIG. 3) is implemented as a wind catcher or an air scoop 1220 formed in the manhole cover 1230. Optionally, the air moving assembly 90 (see FIG. 3) may also include any of the air moving assemblies described herein. However, this is not a requirement. Optionally, the circulation system 1200 may also include the duct system 700 (see FIGS. 16, 20, 21, 24, and 25) installed below the manhole cover 1230.

Figure 31:
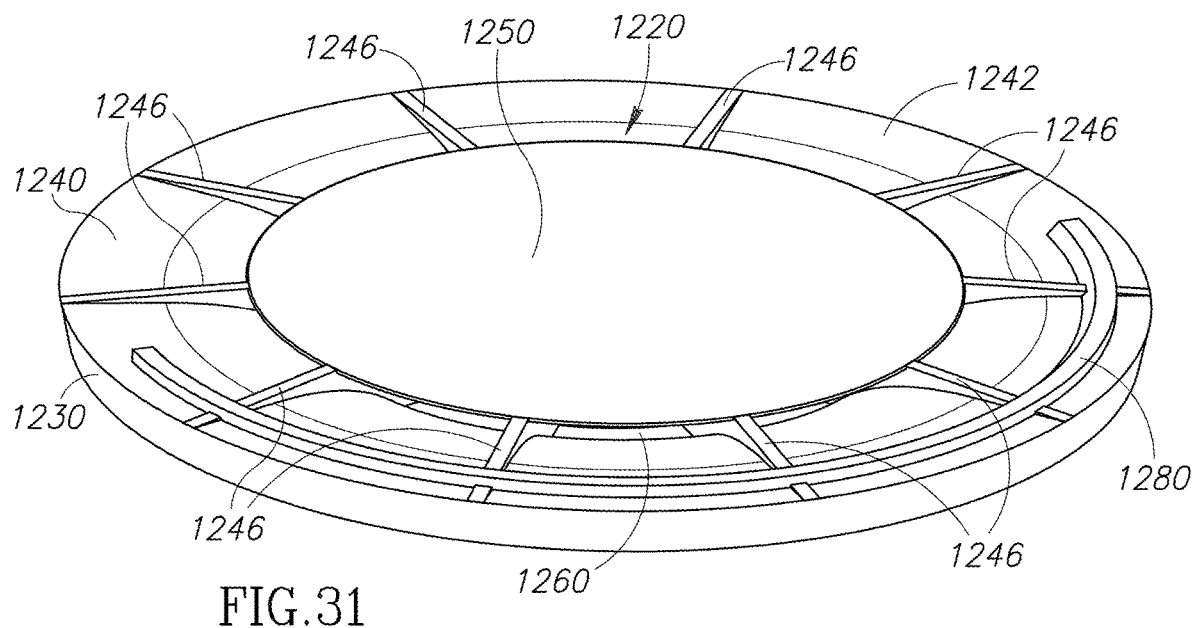
FIG. 31 is a perspective view of a top portion of the manhole cover of FIG. 30.
Figure 32:
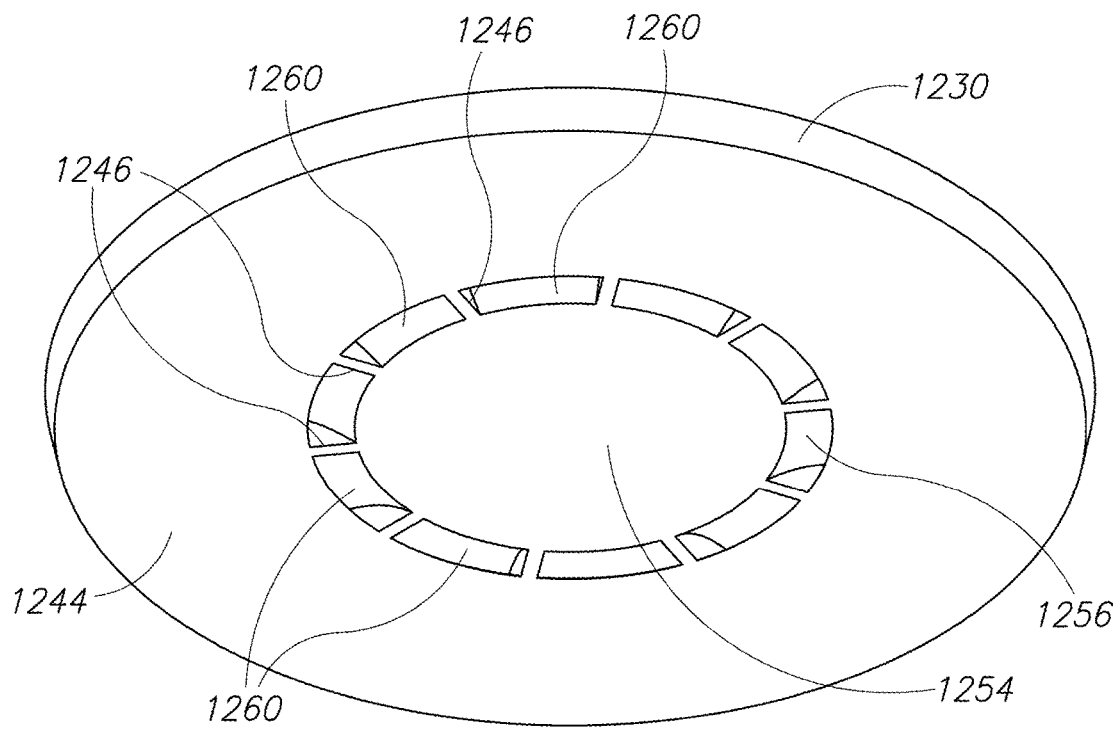
FIG. 32 is a perspective view of a bottom portion of the manhole cover of FIG. 30.
Figure 33:
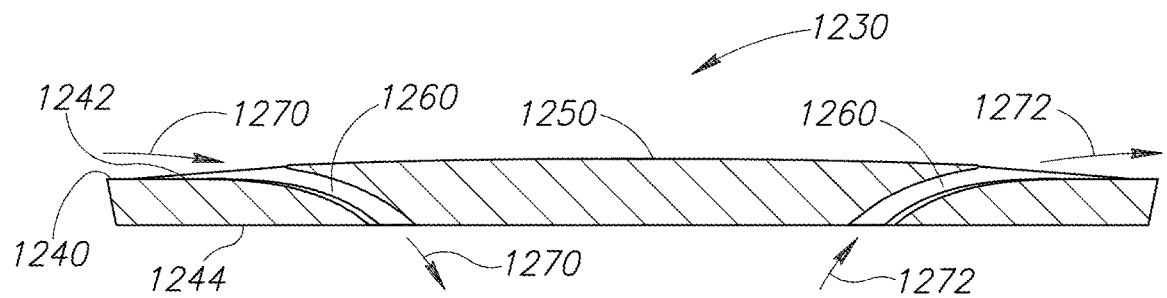
FIG. 33 is a cross-sectional view of the manhole cover of FIG. 30.

Referring to FIG. 31, the manhole cover 1230 includes an outer ring-shaped portion 1240 having an upper surface 1242 and a lower surface 1244 (see FIGS. 32 and 33). A plurality of radially extending support walls 1246 extend upwardly from the upper surface 1242 and support a central portion 1250. The support walls 1246 space the central portion 1250 apart from the outer ring-shaped portion 1240. As may be seen in FIG. 33, the upper surface 1242 of the outer ring-shaped portion 1240 curves downwardly under a peripheral portion of the center portion 1250. Referring to FIG. 30, the center portion 1250 has an upper surface 1252 opposite a lower surface 1254. A side surface 1256 extends between the upper and lower surfaces 1252 and 1254. The side surface 1256 is spaced apart from the upper surface 1242 (see FIG. 31) of the outer ring-shaped portion 1240. Referring to FIGS. 31 and 32, an open-ended channel 1260 is defined between each adjacent pair of the support walls 1246.

The air scoop 1220 passively vents the vault 12 by directing air (e.g., wind) into the vault 12. Referring to FIG. 33, air (depicted by curved arrows 1270) flowing over the manhole cover 1230 is directed by the upper surface 1242 of the outer ring-shaped portion 1240 into one or more of the channels 1260. This air flows from the channel(s) 1260 into the vault 12 (see FIG. 30). Thus, the manhole cover 1230 provides a passive means of capturing street-level wind (e.g., the air depicted by the curved arrows 1270) and directing the captured wind into the vault 12 (see FIG. 30) for ventilation. Alternatively or additionally, a pressure differential caused by the street-level wind may exhaust at least a portion (depicted by curved arrows 1272) of the internal atmosphere 104 (see FIG. 3) into the external atmosphere 102 (see FIG. 3) through one or more of the channels 1260. Further, the flow of air into and/or out of the vault 12 may circulate the internal atmosphere 104 (see FIG. 3) inside the vault 12.

Referring to FIG. 31, the manhole cover 1230 may have radial symmetry to allow orientation-independent positioning of the manhole cover 1230. Optionally, the manhole cover 1230 may include one or more orientation-dependent features. For example, the manhole cover 1230 may include a curved dam 1280 positioned on the outer ring-shaped portion 1240 that extends along a portion of the upper surface 1242 to help reduce or prevent water ingress through the channels 1260 formed in the manhole cover 1230. The manhole cover 1230 may be installed with the dam 1280 facing a direction in which street water is expected to flow (e.g., uphill).

Eighth Embodiment

Figure 34:
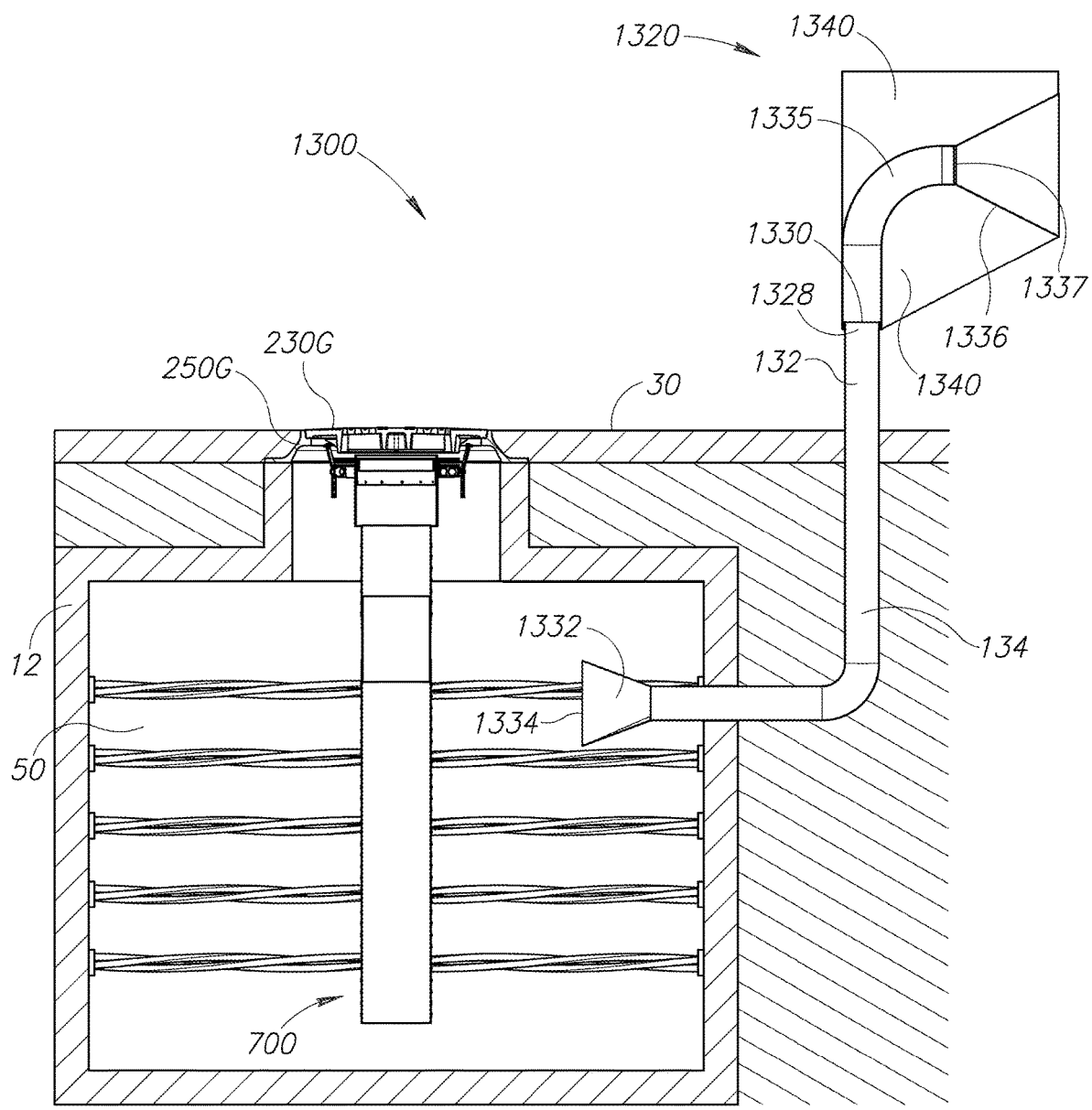
FIG. 34 is a cross-sectional view of an eighth embodiment of the circulation system including a wind catcher coupled to a ventilation stack.

FIG. 34 is a cross-section of an eighth embodiment of a circulation system 1300 that is an exemplary implementation of the circulation system 100 (see FIG. 3). In this embodiment, the interface 92 (see FIG. 3) includes the ventilation stack 132. The interface 92 (see FIG. 3) may also include the manhole cover 230G (or another vented manhole cover) positioned on the ring support 250G. However, this is not a requirement. In this embodiment, the air moving assembly 90 (see FIG. 3) is implemented as a wind catcher 1320 formed in or attached to the ventilation stack 132. Optionally, the air moving assembly 90 (see FIG. 3) may also include any of the air moving assemblies described herein. However, this is not a requirement. Optionally, the circulation system 1300 may also include the duct system 700 installed below the manhole cover 230G (or another vented manhole cover).

The ventilation stack 132 has a first end portion 1328 with an inlet opening 1330 positioned above the surface 30 and a second end portion 1332 with an outlet opening 1334 in communication with the interior 50 of the vault 12. A portion of the exterior atmosphere 102 (see FIG. 3) may enter the inlet opening 1330 travel through the passageway 134 and exit the outlet opening 1334 into the interior 50 of the vault 12.

The wind catcher 1320 is formed in or attached to the first end portion 1328 of the ventilation stack 132. Thus, the ventilation stack 132 may be characterized as being capped by the wind catcher 1320. The wind catcher 1320 directs airflow into the interior 50 of the vault 12 whereat the airflow displaces and/or circulates at least a portion of the internal atmosphere 104 (see FIG. 3). Thus, the wind catcher 1320 provides passive venting of the vault 12.

The wind catcher 1320 has an open-ended internal passageway 1335 in fluid communication with the inlet opening 1330 of the ventilation stack 132. The internal passageway 1335 has an opening 1337 into the external atmosphere 102 (see FIG. 3). The wind catcher 1320 may include a flared or funnel shaped portion 1336 that extends outwardly from the opening 1337. The portion 1336 helps collect wind and channel that wind into the internal passageway 1335, which is in fluid communication with the inlet opening 1330 of the ventilation stack 132. Thus, any wind channeled into the internal passageway 1335 exits therefrom into the passageway 134 and flows therethrough into the interior 50 of the vault 12. The second end portion 1332 may also direct the outlet opening 1334 toward equipment (e.g., the equipment 84 illustrated in FIG. 3) or used to generally enhance cooling within the manhole vault 12.

The wind catcher 1320 may be configured to turn or swivel with respect to the ventilation stack 132. For example, the wind catcher 1320 may include a wind vane or tail 1340 configured to turn or rotate the funnel shaped portion 1336 of the wind catcher 1320 toward oncoming wind. In this manner, the wind catcher 1320 may be self-adjusting and turn to face the direction of the wind as it changes. Alternatively, the wind catcher 1320 may be fixed with respect to the ventilation stack 132. In such embodiments, the wind catcher 1320 may be aligned with a predetermined direction (e.g., a direction of a street on the surface 30, the typical direction of the wind, and the like).

In the embodiment illustrated, the manhole cover 230G includes the vent holes 252G and the exhaust holes 253G through which at least a portion of the internal atmosphere 104 (see FIG. 3) may be vented into the external atmosphere 104 (see FIG. 3). Alternatively or additionally, a portion of the internal atmosphere 104 (see FIG. 3) may be vented through the conduits 20A-20C (see FIG. 1) into other vaults.

Figure 35:
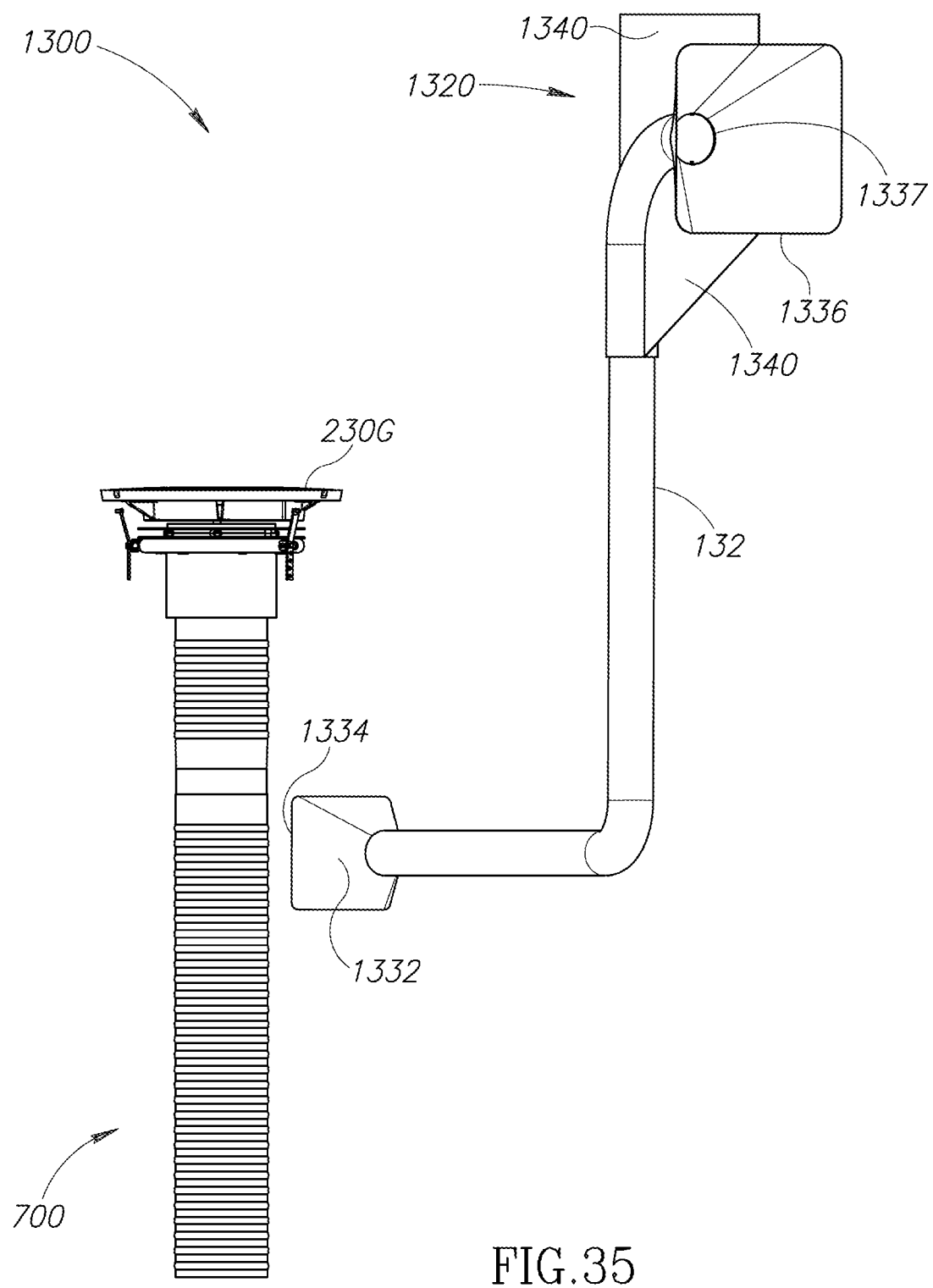
FIG. 35 is a perspective view of the circulation system of FIG. 34.
Figure 36:
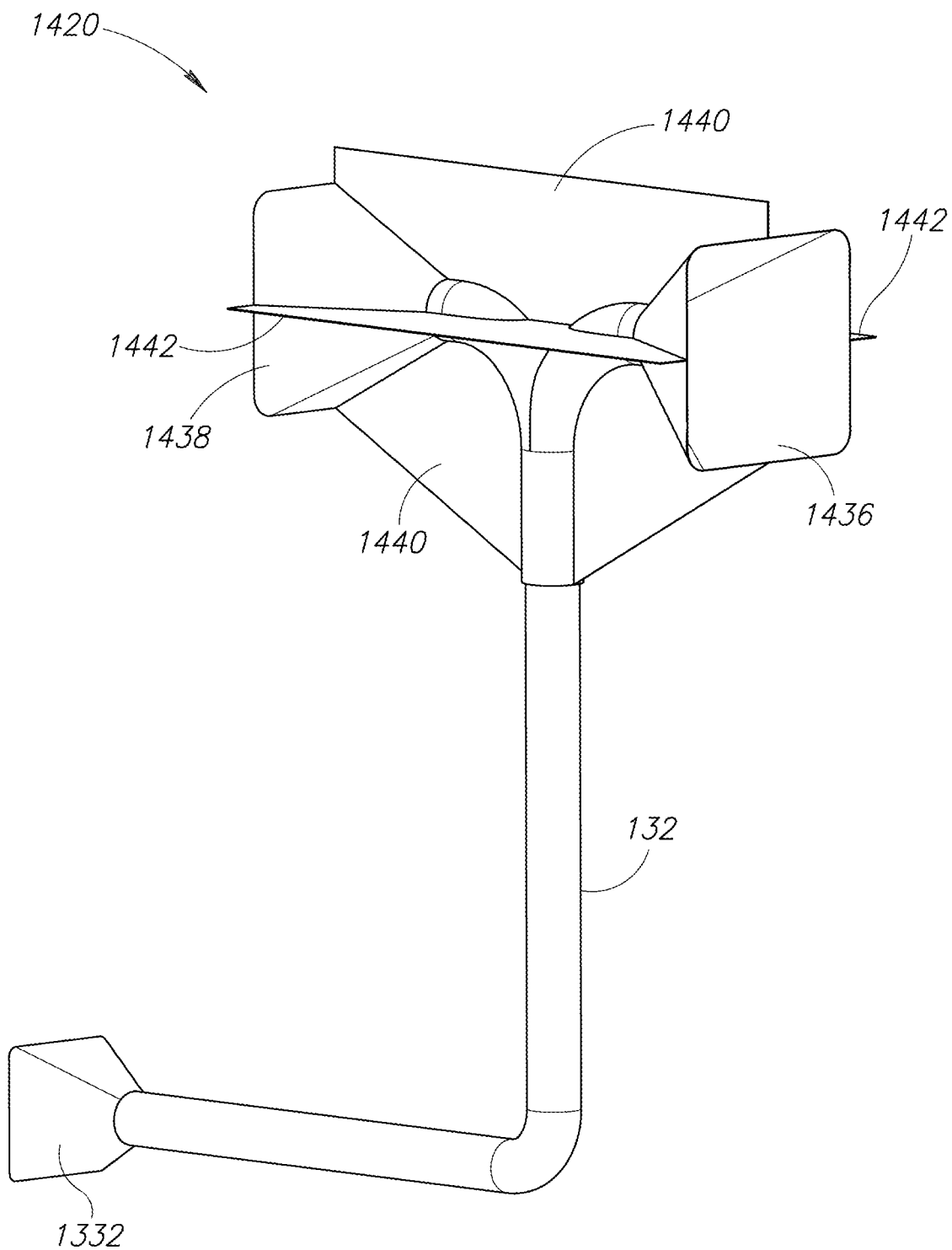
FIG. 36 is a perspective view of an alternate embodiment of a wind catcher.
Figure 37:
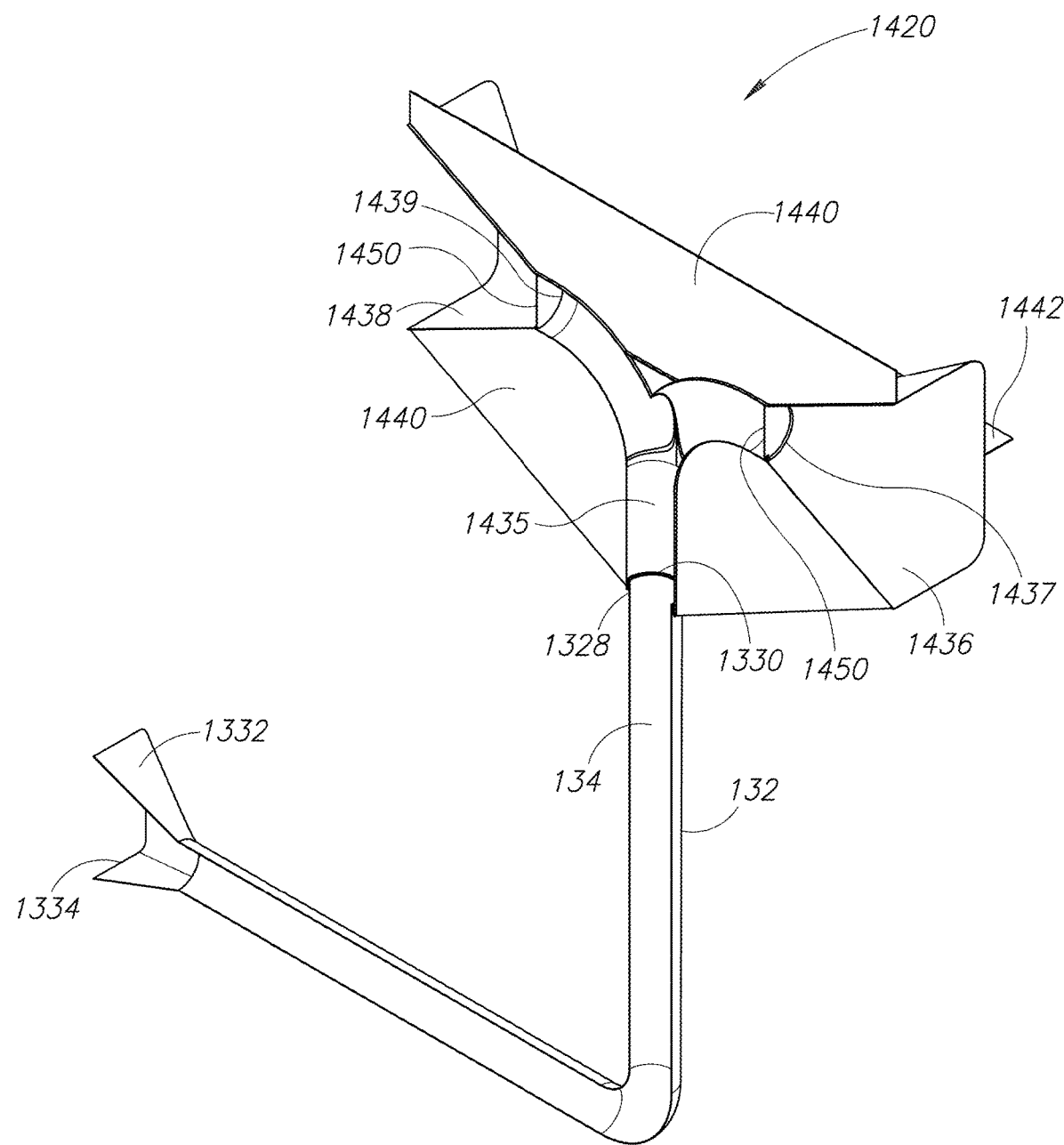
FIG. 37 is a cross-sectional view of the wind catcher of FIG. 36.
Figure 38:
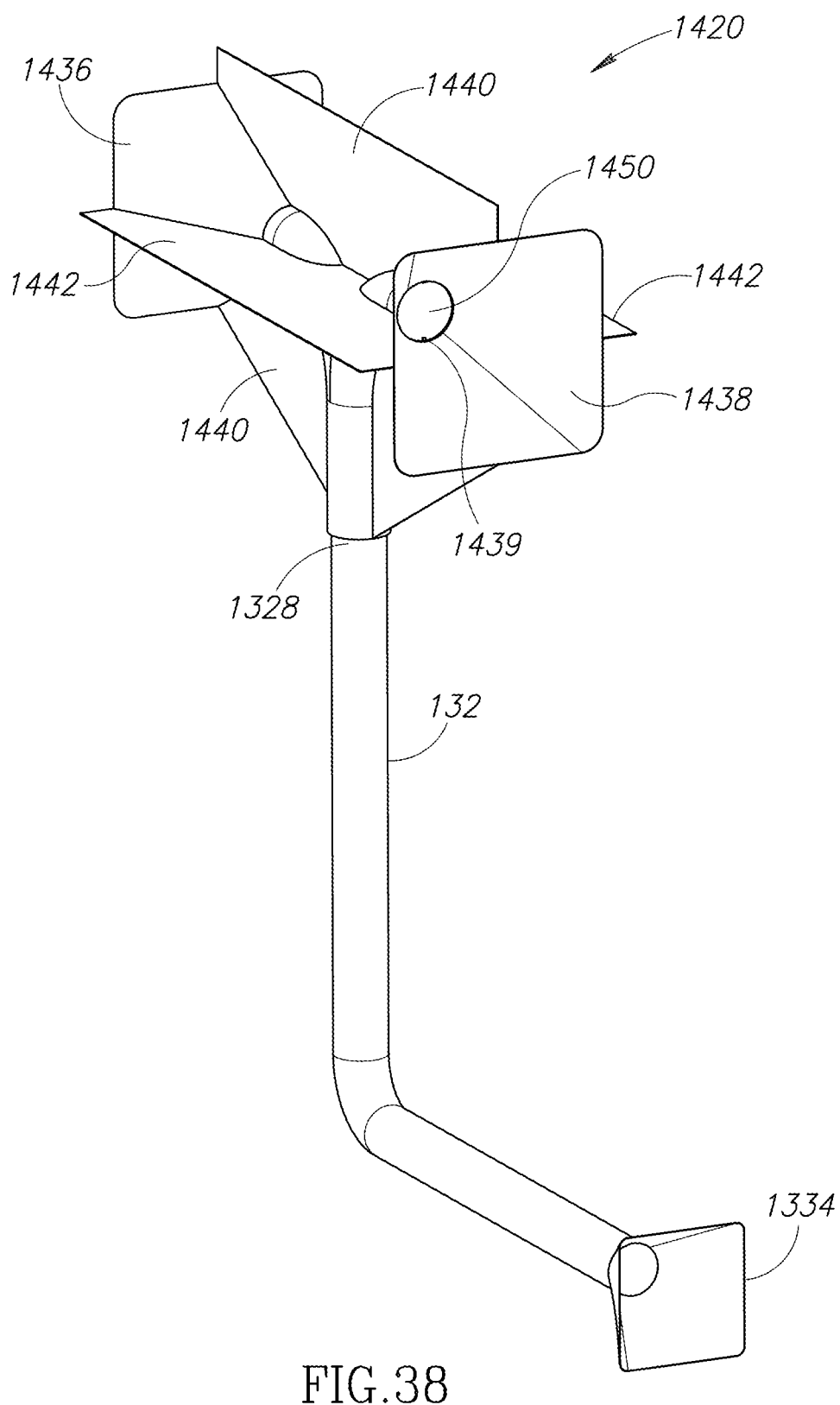
FIG. 38 is a perspective view of the wind catcher of FIG. 36.

FIGS. 36 and 37 depict an alternate embodiment of a wind catcher 1420 that may be used instead and in place of the wind catcher 1320 (see FIGS. 34 and 35) in the circulation system 1300 (see FIGS. 34 and 35). Thus, referring to FIG. 37, the wind catcher 1420 may be formed in or attached to the first end portion 1328 (see FIG. 34) of the ventilation stack 132. The wind catcher 1420 is configured to direct airflow into the interior 50 (see FIG. 34) of the vault 12 (see FIG. 34) whereat the airflow displaces and/or circulates at least a portion of the internal atmosphere 104 (see FIG. 3). Thus, the wind catcher 1420 provides passive venting of the vault 12.

Referring to FIG. 37, the wind catcher 1420 has an internal passageway 1435 in fluid communication with the inlet opening 1330 of the ventilation stack 132. The internal passageway 1435 may be branched (e.g., generally Y-shaped) and have a first opening 1437 opposite a second opening 1439. Both of the first and second openings 1437 and 1439 are in fluid communication with the external atmosphere 102 (see FIG. 3).

The wind catcher 1420 may include a first funnel shaped portion 1436 that extends outwardly from the first opening 1437 and a second funnel shaped portion 1438 that extends outwardly from the second opening 1439. Each of the funnel shaped portions 1436 and 1438 helps collect wind and channel that wind into the internal passageway 1435, which is in fluid communication with the inlet opening 1330 of the ventilation stack 132. Thus, any wind channeled into the internal passageway 1435 exits therefrom into the passageway 134 and flows therethrough into the interior 50 of the vault 12.

A check valve 1450 may be positioned in each of the first and second openings 1437 and 1439. The check valves 1450 allow air (e.g., wind) to enter the first and second openings 1437 and 1439 but not to exit therefrom. Thus, the check valves 1450 prevent the wind from blowing into one of the first and second openings 1437 and 1439 and out the other.

The wind catcher 1420 may be configured to turn or swivel with respect to the ventilation stack 132. For example, the wind catcher 1420 may include one or more wind vanes 1440 and 1442 configured to turn or rotate the wind catcher 1320 to position one of the funnel shaped portions 1436 and 1438 toward oncoming wind. In this manner, the wind catcher 1420 may be self-adjusting and turn to face the direction of the wind as it changes. Alternatively, the wind catcher 1420 may be fixed with respect to the ventilation stack 132. In such embodiments, the wind catcher 1420 may be aligned with a predetermined direction (e.g., a direction of a street on the surface 30, the typical direction of the wind, and the like).

Ninth Embodiment

Figure 39:
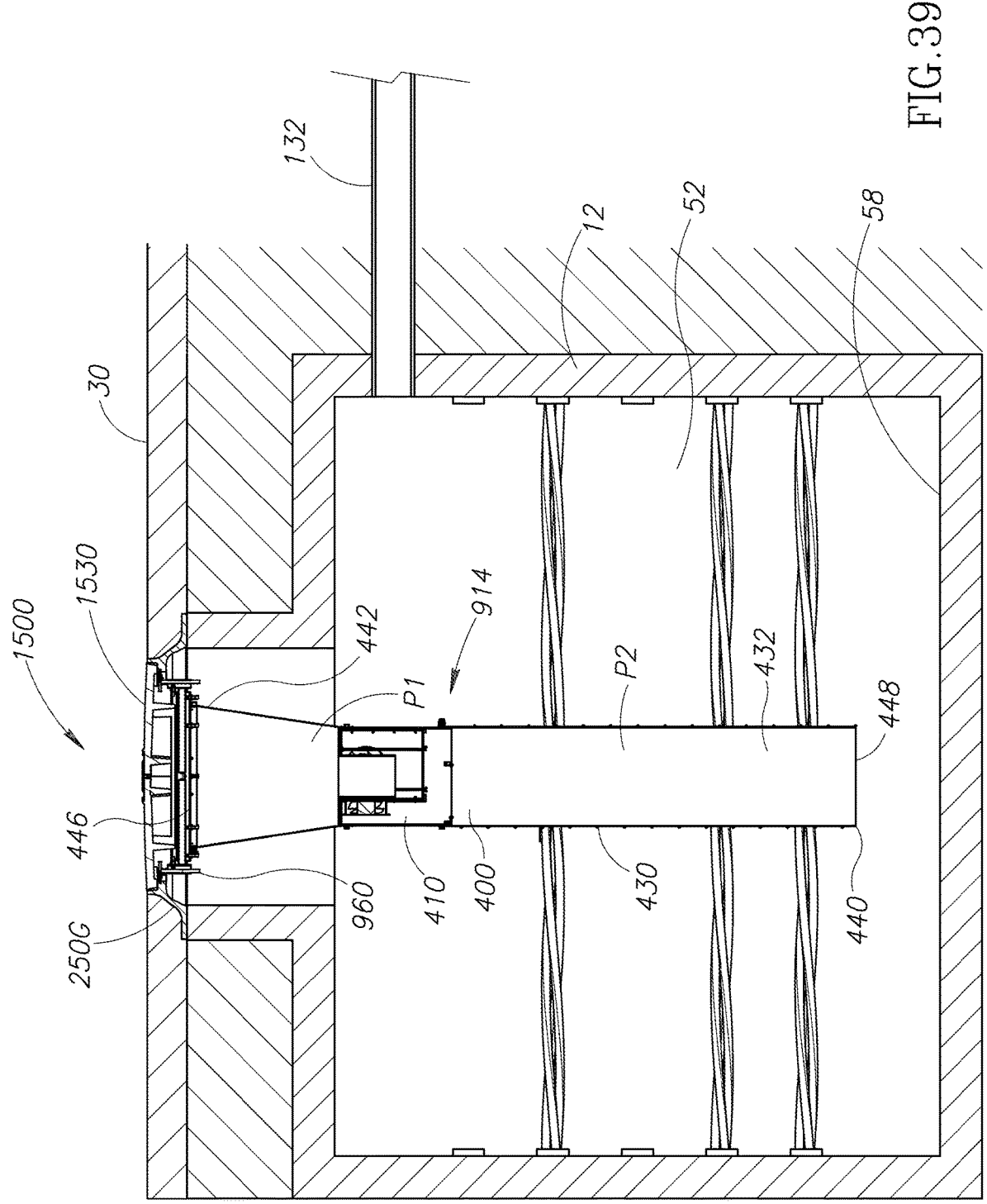
FIG. 39 is a cross-sectional view of a ninth embodiment of the circulation system including a manhole cover and a support bracket assembly.

FIG. 39 depicts a ninth embodiment of a circulation system 1500 that is an exemplary implementation of the circulation system 100 (see FIG. 3). The circulation system 1500 is substantially similar to a ventilation system 910 described in U.S. patent application Ser. No. 15/084,321. However, the circulation system 1500 includes a manhole cover 1530 instead of and in place of the manhole cover 230G (see FIGS. 4-5B, 34, and 35). In the circulation system 1500, the interface 92 (see FIG. 3) includes the manhole cover 1530 and the air moving assembly 90 (see FIG. 3) is implemented as an air moving assembly 914 (described in U.S. patent application Ser. No. 15/084,321). The circulation system 1500 may also include the ventilation stack 132. However, this is not a requirement. FIGS. 23-30 are identical to FIGS. 42-49 of U.S. patent application Ser. No. 15/084, 321. FIG. 50 is substantially similar to FIG. 31 of U.S. patent application Ser. No. 15/084,321 but includes the manhole cover 1530 instead of the manhole cover 230G (see FIGS. 4-5B, 34, and 35).

Figure 40:
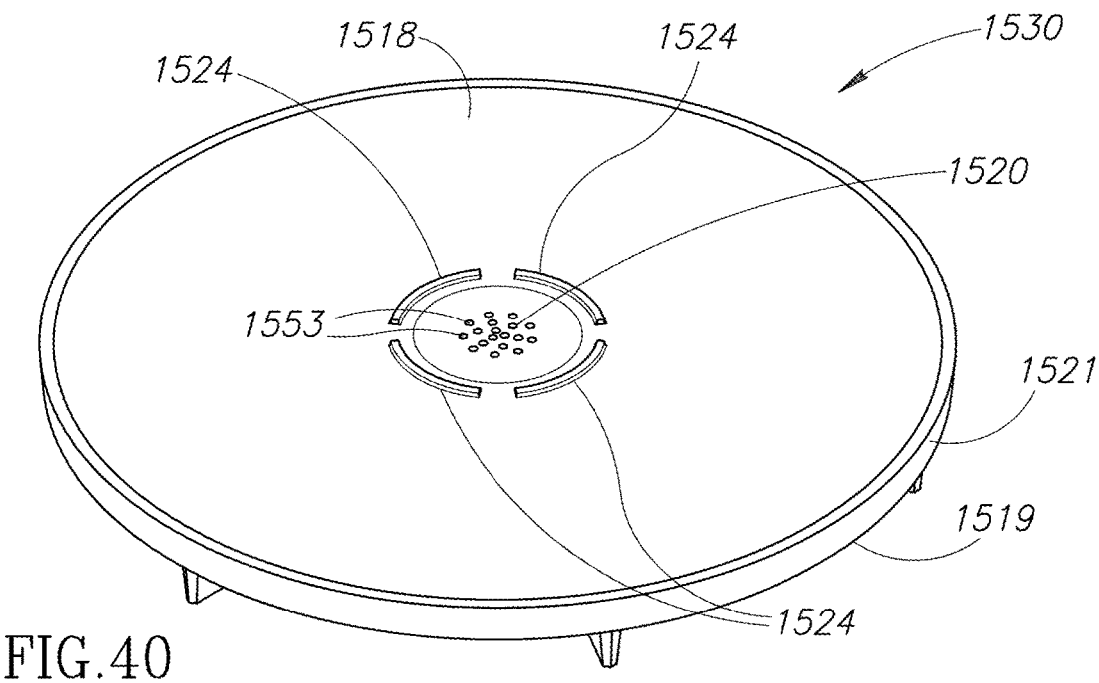
FIG. 40 is a perspective view of a top side of the manhole cover of the circulation system of FIG. 39.

Referring to FIG. 40, the manhole cover 1530 has an outwardly facing top side 1518 opposite an inwardly facing bottom side 1519. The manhole cover 1530 has a center portion 1520 surrounded by a peripheral edge 1521. Although the manhole cover 1530 has been illustrated as having a traditional round manhole cover shape, the manhole cover 1530 may have an alternate shape, such as rectangular.

A plurality of outlets or exhaust holes 1553 are positioned in the center portion 1520. In the embodiment illustrated, the exhaust holes 1553 (which are implementations of the through-holes 151 depicted in FIG. 3) allow a portion (represented by the arrow A2 in FIG. 3) of the internal atmosphere 104 (see FIG. 3) to flow into the external atmosphere 102 (see FIG. 3). As will be explained below, referring to FIG. 39, the air moving assembly 914 generates sufficient air pressure below the manhole cover 1530 to oppose intrusion of water through the exhaust holes 1553 (see FIGS. 40 and 41). The exhaust holes 1553 are small enough (e.g., have diameters of about ¼ inch or about ⅛ inch) to allow sufficient pressure differential with a realistic airflow rate. While the exhaust holes 1553 are illustrated as round holes, other shapes (such as slots) may be used. A portion of the external atmosphere 102 (see FIG. 3) or make up air may be passively pulled into the vault 12 through the ventilation stack 132 or the conduits 20A-20C (see FIG. 1) connected to adjacent vaults (e.g., the vault 14 illustrated in FIG. 1). The ventilation stack 132 may provide make up air if flow through the conduits 20A-20C (see FIG. 1) or air leaks in the vault 12 provide too little airflow.

The manhole cover 1530 may include water control features. For example, the top side 1518 may include dams 1524 arranged to prevent precipitation and surface water from flowing into the exhaust holes 1553. The dams 1524 may partially or completely surrounds the exhaust holes 1553.

The top side 1518 of the manhole cover 1530 may have a curved or generally domed shape that is taller near the center portion 1520 and curves downwardly toward the peripheral edge 1521. This domed shape helps direct water away from the center portion 1520 and toward the peripheral edge 1521. The domed shape also positions the exhaust holes 1553 above the surface 30 (see FIG. 39) by a predetermined amount (e.g., about ⅛ inch, about ⅜ inches in accordance with requirements specified by Americans with Disabilities Act, at least about ⅛ inches, or about ⅜ inches.

Along its periphery, the manhole cover 1530 may include one or more conventional closed end wells (like the wells 928 depicted in FIG. 5A) configured to be used to lift the manhole cover 1530 from the manhole 62.

Figure 41:
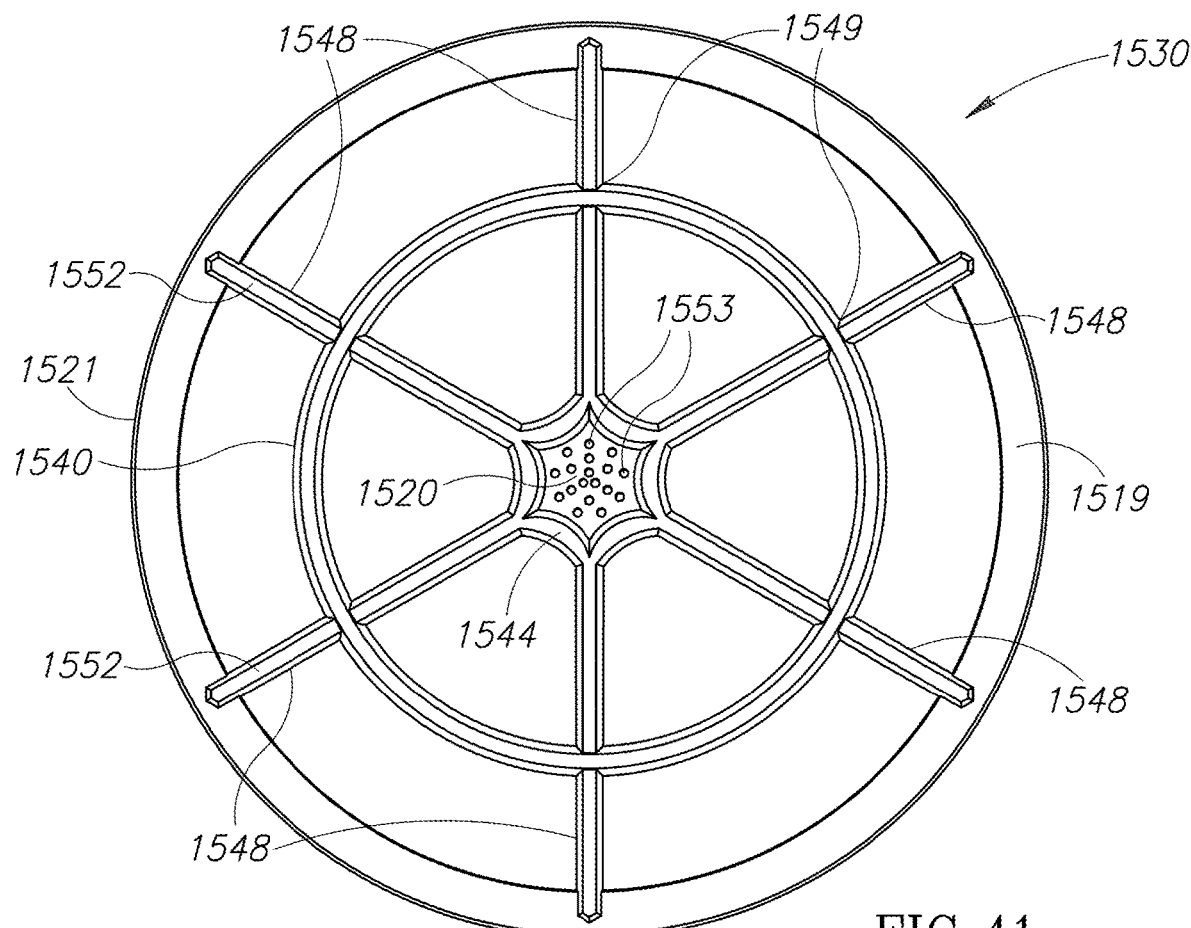
FIG. 41 is a bottom view of the manhole cover of the circulation system of FIG. 39.

Optionally, referring to FIG. 41, the bottom side 1519 includes a downwardly extending ring-shaped wall 1540 that surrounds the exhaust holes 1553. The bottom side 1519 may include a downwardly extending structure 1544 positioned inside the wall 1540. In the embodiment illustrated, the structure 1544 is generally hexagonally shaped and positioned at or near the central portion 1520 of the manhole cover 1530. A plurality of support walls 1548 extend radially outwardly from the structure 1544 and pass through rounded fillets 1549 formed in the wall 1540. Each of the walls 1548 has a tapered distal end portion 1552 that terminates before reaching the peripheral edge 1521. The exhaust holes 1553 are positioned between the structure 1544 and the wall 1540. The wall 1540, the structure 1544, and the support walls 1548 are substantially identical to the wall 940, the structure 944, and the support walls 948, respectively, of the manhole cover 230G (see FIGS. 4-5B, 34, and 35).

Air Moving Assembly

Referring to FIG. 39, the air moving assembly 914 includes a ventilation pipe 400 and a ventilator 410. The air moving assembly 914 may include a support bracket assembly 960 coupled inside the ring support 250G. As will be described in further detail below, the ventilator 410 may be implemented as a ventilator assembly 1100 (see FIGS. 46, 49, and 50).

Support Bracket Assembly

Figure 42:
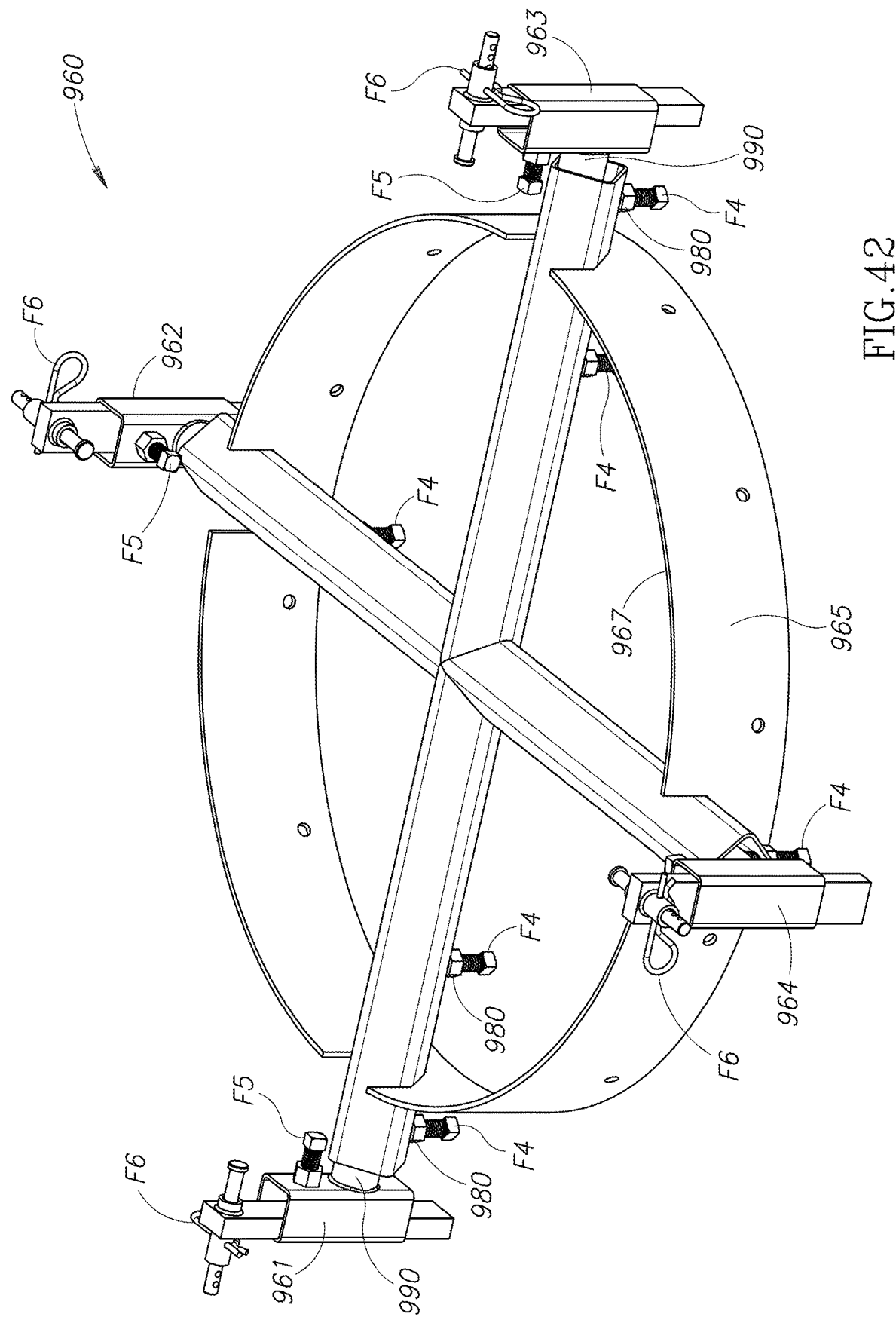
FIG. 42 is a perspective view of the support bracket assembly including a support frame and a plurality of mounting assemblies.
Figure 43:
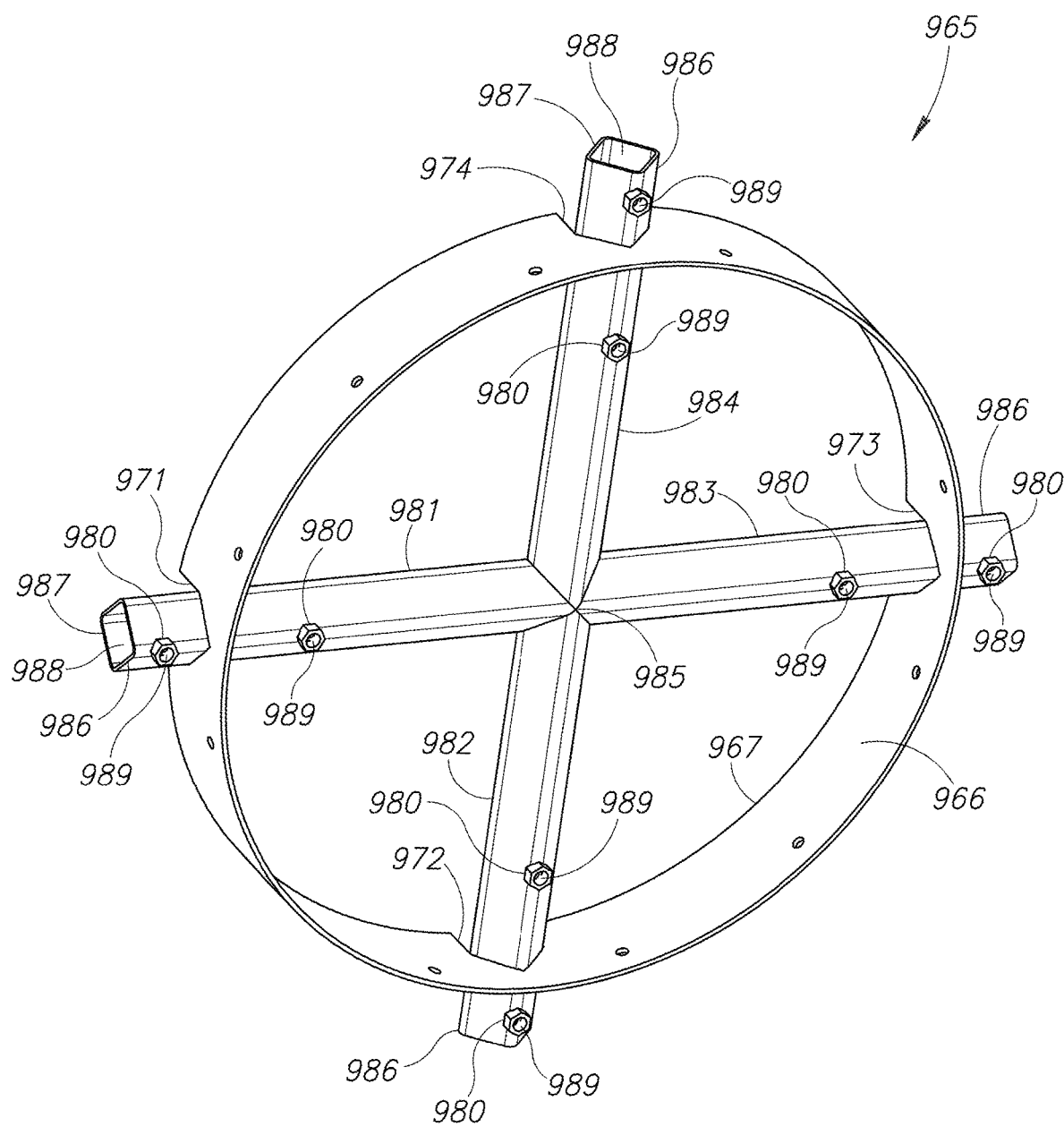
FIG. 43 is a perspective view of an underside of the support frame of the support bracket assembly.

Referring to FIG. 42, the support bracket assembly 960 has a plurality of mounting assemblies 961-964 coupled to a support frame 965. Referring to FIG. 43, the support frame 965 includes a ring-shaped wall 966 having an upper edge portion 967 configured to couple to the ring-shaped wall 1540 (see FIG. 41) of the manhole cover 1530 (see FIGS. 39-41 and 50). Optionally, a seal (not shown) may be positioned between the walls 1540 and 966. The ring-shaped wall 966 includes slots or cutouts 971-974 that extend downwardly from the upper edge portion 967.

The support frame 965 includes a plurality of elongated frame members 981-984 that extend outwardly from a center portion 985. The frame members 981-984 are substantially identical to one another. The frame members 981-984 extend from the center portion 985, through the cutouts 971-974, respectively, and are affixed to the ring-shaped wall 966 within the cutouts 971-974, respectively. The frame members 981 and 983 are aligned with one another longitudinally and are therefore collinear with one another. Similarly, the frame members 982 and 984 are aligned with one another longitudinally and are therefore collinear with one another. In the embodiment illustrated, inside angles of approximately 90 degrees are defined between adjacent ones of the frame members 981-984. However, this is not a requirement. Each of the frame members 981-984 has a free distal end 986 with an opening 987 into a longitudinally extending channel 988. Further, each of the frame members 981-984 has one or more transverse through-holes 989 that provide lateral access into the channel 988 of the frame member. Referring to FIG. 42, the through-holes 989 (see FIG. 43) are each configured to receive a fastener F4 (e.g., a set screw). In the embodiment illustrated, an outwardly extending threaded portion 980 surrounds each of the through-holes 989 (see FIG. 43). The threaded portions 980 each have inside threads aligned with the through-hole 989 (see FIG. 43) and configured to mate with outside threads formed on each of the fasteners F4. Thus, the fasteners F4 maybe threaded into and out of the through-holes 989 (see FIG. 43).

Referring to FIG. 42, the mounting assemblies 961-964 are substantially identical to one another. For the sake of brevity, only the mounting assembly 961 will be described in detail below. However, the like reference numerals have been used to identify substantially identical components of the mounting assemblies 961-964.

Figure 44:
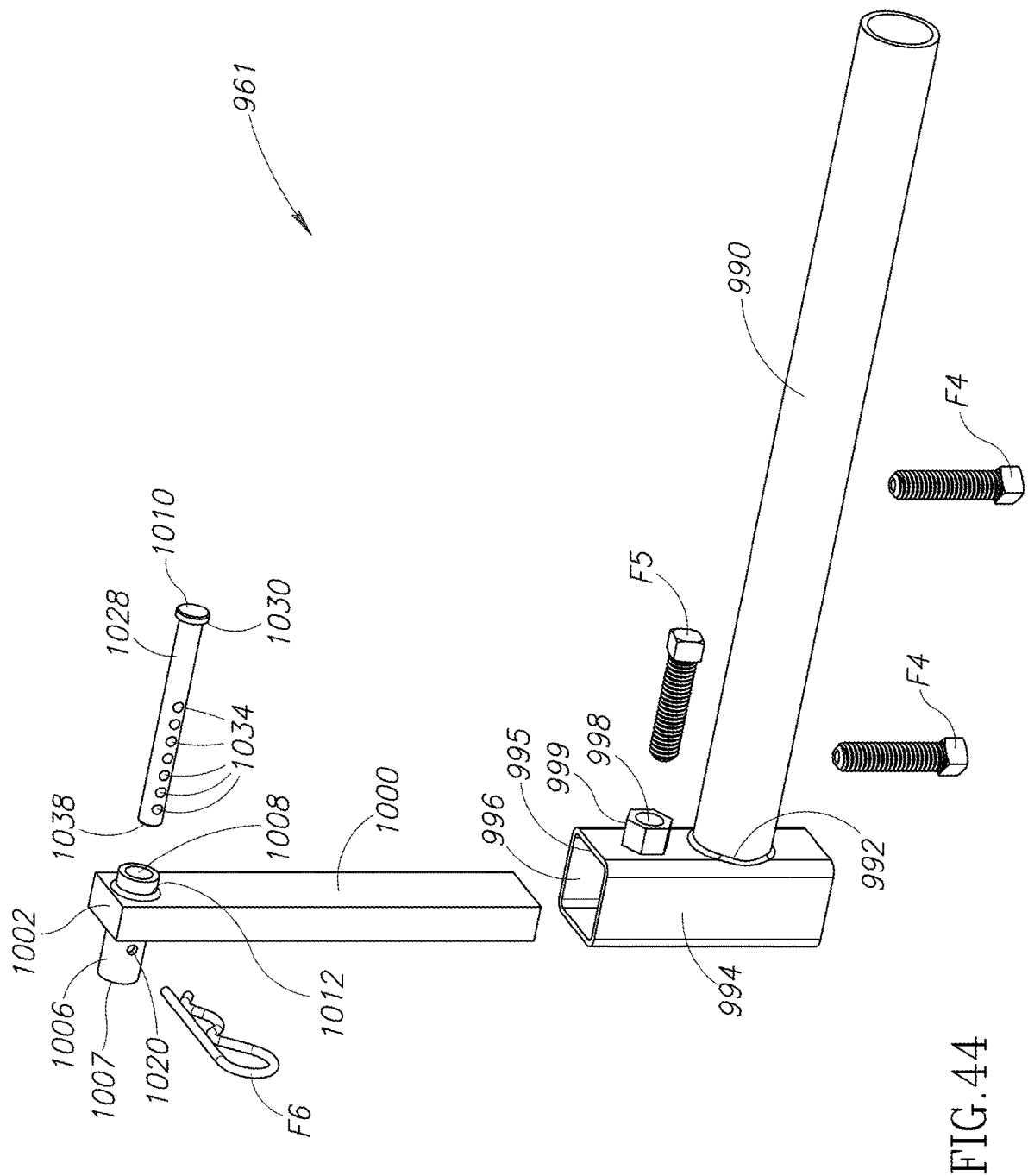
FIG. 44 is an exploded perspective view of one of the mounting assemblies of the support bracket assembly.

Referring to FIG. 44, the mounting assembly 961 has an elongated support member 990 configured to be received inside the channel 988 (see FIG. 43) of the frame member 981 (see FIG. 43) and to slide longitudinally (horizontally) therein. Thus, the support members 990 of the mounting assemblies 961-964 (see FIG. 42) may be characterized as telescoping (horizontally) with respect to the frame members 981-984 (see FIG. 42), respectively. Referring to FIG. 42, the fasteners F4 may be threaded into the through-holes 989 (see FIG. 43) and positioned therein to laterally engage the support members 990 and prevent the support members 990 from sliding within the channels 988 (see FIG. 43). In this manner, referring to FIG. 42, the fasteners F4 lock the (horizontal) position of the support members 990 of the mounting assemblies 961-964 with respect to the frame members 981-984, respectively.

Referring to FIG. 44, the support member 990 has a distal end 992 configured to be positioned outside the channel 988 (see FIG. 43) beyond the free distal end 986 (see FIG. 43) of the frame member 981. An upright support member 994 is coupled to the distal end 992 of the support member 990. The upright support member 994 has one or more sidewalls 995 that define a through-channel 996. At least one transverse through-hole 998 is formed in one of the sidewalls 995 and configured to provide lateral access into the through-channel 996. The through-hole 998 is configured to receive a fastener F5 (e.g., a set screw). In the embodiment illustrated, an outwardly extending threaded portion 999 surrounds the through-hole 998. The threaded portion 999 has inside threads aligned with the through-hole 998 and configured to mate with outside threads formed on the fastener F5. Thus, the fastener F5 may be threaded into and out of the through-hole 998.

The through-channel 996 is configured to receive an upright sliding member 1000 that is configured to slide within the through-channel 996 of the upright support member 994. Thus, the sliding member 1000 may be characterized as telescoping (vertically) with respect to the upright support member 994. The fastener F5 may be inserted into the through-hole 998 and positioned therein to laterally engage the sliding member 1000 and prevent the sliding member 1000 from sliding within the through-channel 996. In this manner, the fastener F5 may be used to lock the (vertical) position of the sliding member 1000 with respect to the upright support member 994.

The sliding member 1000 has an upper end portion 1002 with transverse tube-shaped member 1006 coupled thereto. The tube-shaped member 1006 has a through-channel 1008 formed therein configured to slideably receive a pin 1010. In the embodiment illustrated, the tube-shaped member 1006 traverses a through-hole 1012 formed in the upper end portion 1002 and is welded to the sliding member 1000. The tube-shaped member 1006 has an end face 1007 that faces away from the sliding member 1000. The tube-shaped member 1006 has a transverse through-hole 1020 that passes through the through-channel 1008 between the sliding member 1000 and the end face 1007. The through-hole 1020 provides lateral access into the through-channel 1008 and is configured to receive a fastener F6 (e.g., a cotter pin).

The pin 1010 has a body portion 1028 configured to slide within the through-channel 1008 and a head portion 1030 that is too large to enter and pass through the through-channel 1008. A series of spaced apart through-holes 1034 are formed in the body portion 1028. The pin 1010 may be characterized as telescoping (horizontally) with respect to the tube-shaped member 1006 and the sliding member 1000. As the body portion 1028 of the pin 1010 slides within the through-channel 1008 of the tube-shaped member 1006, a different one of the through-holes 1034 may be selectively aligned with the transverse through-hole 1020. Then, the fastener F6 may be inserted through the transverse through-hole 1020 and into the selected through-hole 1034 formed in the pin 1010. In this manner, the fastener F6 may be used to lock the position of the pin 1010 with respect to the tube-shaped member 1006 and the sliding member 1000. The body portion 1028 of the pin 1010 has a free distal end 1038 configured to be inserted into a hole 1040 (see FIG. 45B) drilled to sufficient depth (e.g., ¾ inch) in the inside surface 256G (see FIGS. 45A and 45B) of the ring support 250G (see FIGS. 39, 45A, and 45B).

Figure 45A:
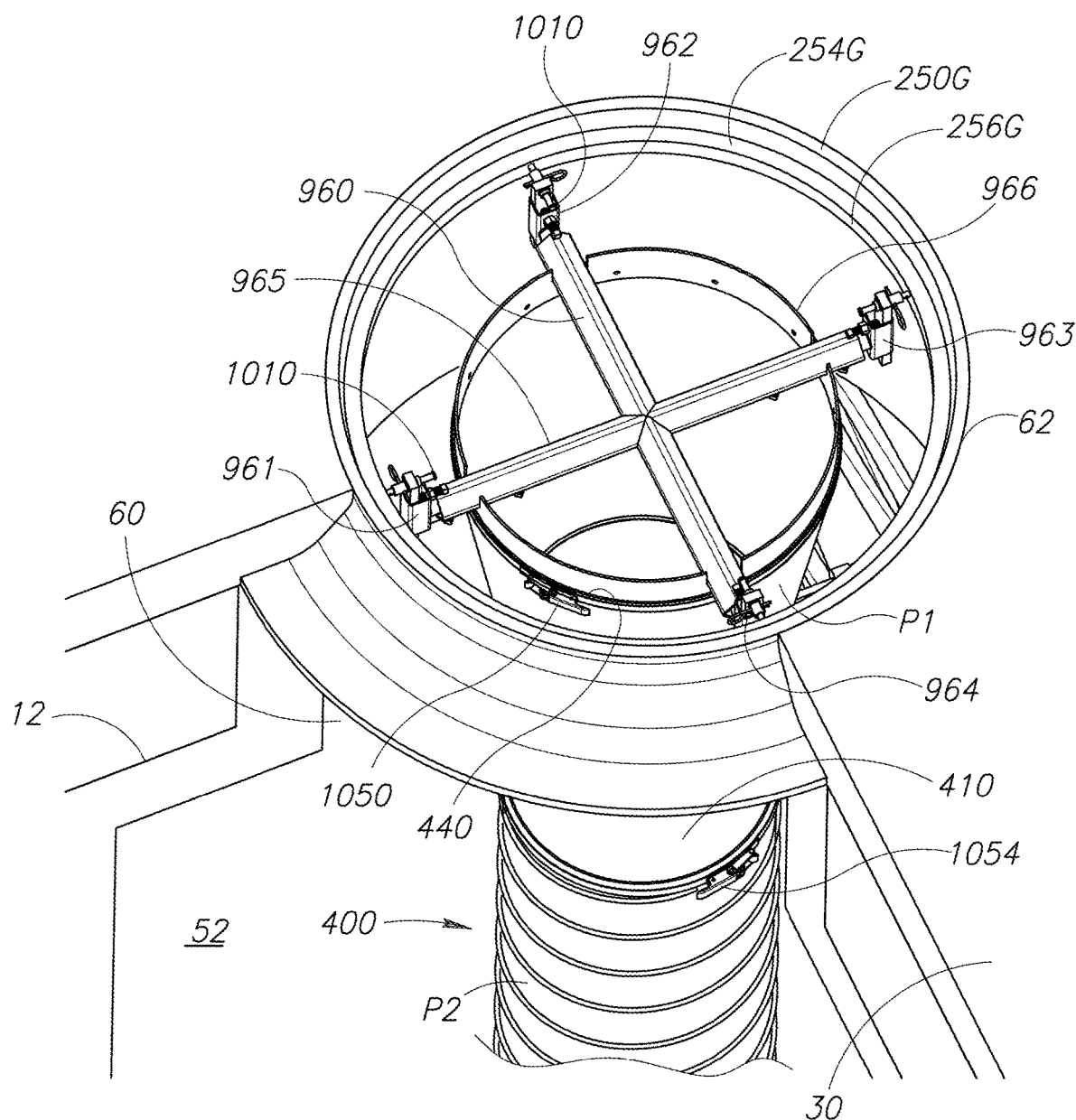
FIG. 45A is a perspective view into the manhole vault with the manhole cover of the circulation system of FIG. 39 removed.
Figure 45B:
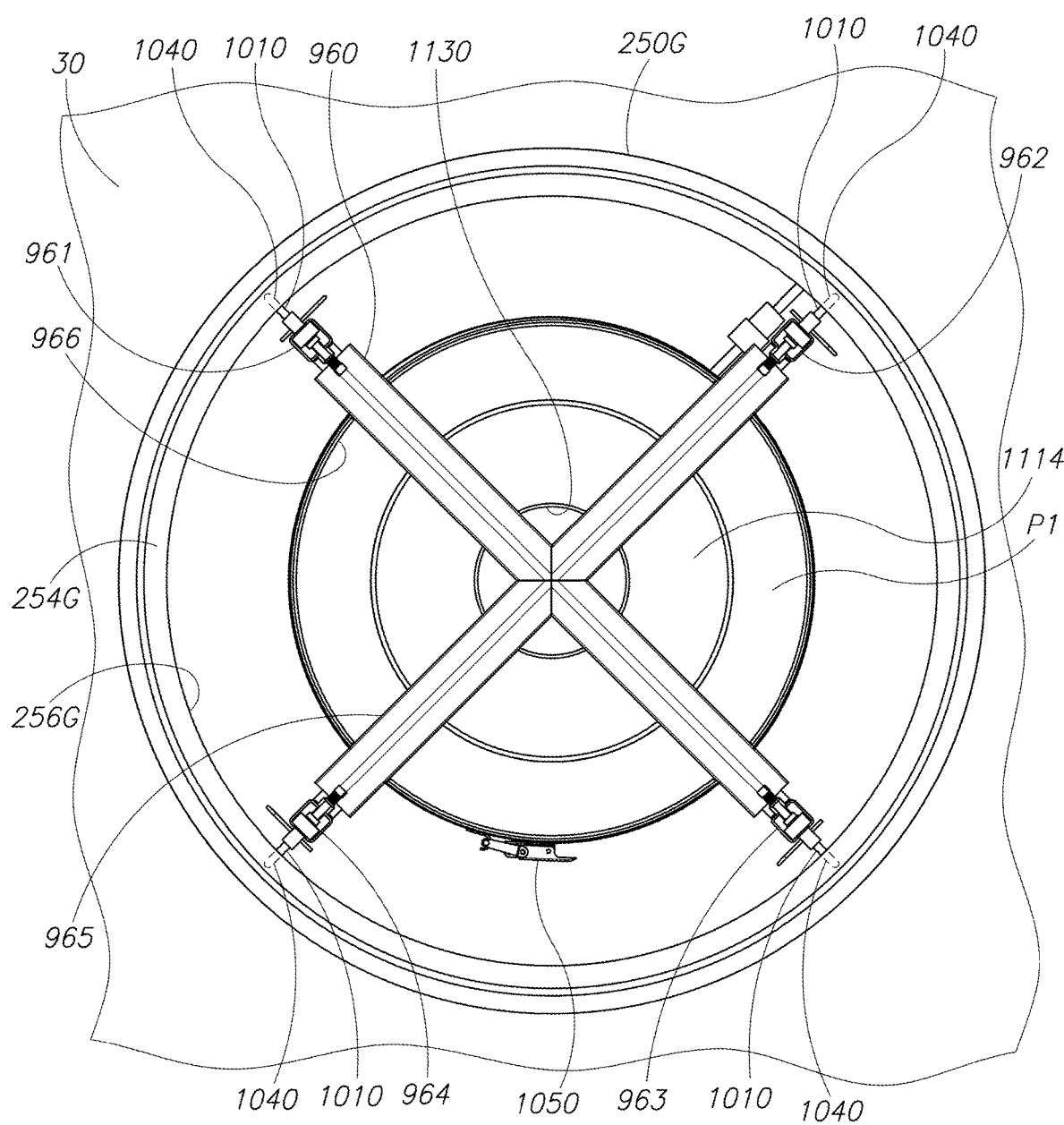
FIG. 45B is a top view of the circulation system of FIG. 39 with the manhole cover removed.

Referring to FIG. 45B, the support bracket assembly 960 is coupled to the ring support 250G by positioning the free distal ends 1038 (see FIG. 44) of the pins 1010 of the mounting assemblies 961-964 within the holes 1040 drilled in the inside surface 256G of the ring support 250G. Referring to FIG. 44, the fasteners F4-F6 may be loosened and/or removed and the positions of the support members 990, the sliding members 1000, and the pins 1010, respectively, adjusted so that the free distal ends 1038 of the pins 1010 mate with the holes 1040 (see FIG. 45B) drilled in the inside surface 256G of the ring support 250G. In this manner, the pins 1010 maintain the ring-shaped wall 966 centered within a diameter of the ledge 254G and locate the support bracket assembly 960 at a given height within the ring support 250G. By adjusting the positioning of the support members 990, the sliding members 1000, and the pins 1010 with respect to the support frame 965 (see FIGS. 42, 43, 26A, and 26B), the support bracket assembly 960 may be configured for use with ring supports (like the ring support 250G) having different inside shapes and sizes as well as to conform to the holes 1040 (see FIG. 45B) that may be hand drilled and not be precisely located. This adjustability also allows the ring-shaped wall 966 to be centered, leveled, and/or height adjusted so that when the manhole cover 230G is installed, the upper edge portion 967 of the ring-shaped wall 966 is in contact or in near proximity with the ring-shaped wall 1540.

The support bracket assembly 960 may be easy to install, operate, and remove. On initial installation, the telescoping features are utilized by an installation craftsmen (e.g., the worker 61 illustrated in FIGS. 1 and 3) to correctly position the ring-shaped wall 966 for mating with the ring-shaped wall 1540. For example, the worker 61 (see FIGS. 1 and 3) may grasp one of the frame members 981-984, insert the support bracket assembly 960 into the ring support 250G via the manhole 62. Then, the worker 61 (see FIGS. 1 and 3) may adjust the support member 990 and the sliding members 1000 to place the end face 1007 of the tube-shaped members 1006 in contact with the inside surface 256G at each of the four holes 1040 (see FIG. 45B) drill therein. Then, the fasteners F4 and F5 (e.g., set screws) are tightened. The pins 1010 are slid into the holes 1040 (see FIG. 45B) as far as they will go and affixed with the fasteners F6 (e.g., cotter pins). To remove the support bracket assembly 960, all the fasteners F4 and F5 (e.g., set screws) may be left fully tightened such that the support bracket assembly 960 remains essentially rigid and fixed in configuration. Then, the fasteners F6 (e.g., cotter pins) and the pins 1010 may be removed freeing the support bracket assembly 960.

It may be beneficial to identity the rotational positional of the support bracket assembly 960 within the ring support 250G (e.g., by spray painting one of the frame members 981-984 and its immediate surroundings) before removing the support bracket assembly 960. This allows the support bracket assembly 960 to be installed without performing system alignment.

The support bracket assembly 960 may be configured to be durable. By way of non-limiting examples, the support bracket assembly 960 may be constructed from aluminum alloys, plated steel, stainless steel, fiberglass, etc.

Ventilation Pipe

As mentioned above, referring to FIG. 39, the air moving assembly 914 includes the ventilation pipe 400. Referring to FIG. 3, the term "ventilation pipe" as used herein is given its broadest definition and includes any hollow structure that can convey a portion of the internal atmosphere 104 (e.g., the gaseous composition 106) and/or a portion of the external atmosphere 102 therethrough. This terminology thus includes such elements as a tube, channel, duct, conduit, or hose and can be a separate structure, or one that is, at least in part, incorporated into the design of the vault 12.

Referring to FIG. 39, the ventilation pipe 400 has one or more walls 430 that define an interior through-channel 432. By way of a non-limiting example, the ventilation pipe 400 may have a generally circular cross-sectional shape with an inner diameter (defined by the wall(s) 430) of about 8 inches to about 20 inches. For example, the inner diameter may be about 12 inches to about 16 inches. The through-channel 432 of the ventilation pipe 400 is large enough to move a desired amount of air.

The ventilation pipe 400 has a first open end 440 opposite a second open end 442 with the ventilator 410 (when present) positioned therebetween. The ventilation pipe 400 may include (or be constructed from) multiple sections. For example, the embodiment of the ventilation pipe 400 illustrated includes sections P1 and P2. By way of additional non-limiting examples, the sections of the ventilation pipe 400 may be angled, tapered, curved, and the like. Further, different sections of the ventilation pipe 400 may have different cross-sectional sizes and/or shapes.

In this implementation, the ventilator 410 is positioned between the sections P1 and P2. Referring to FIG. 49, a lower end 401 of the section P1 and an upper end 403 of the section P2 are both coupled to the ventilator 410. In the embodiment illustrated, the lower end 401 of the section P1 may be clamped (e.g., by a band or pipe clamp 1052) to the ventilator 410 and the upper end 403 of the section P2 may be clamped (e.g., by a band or pipe clamp 1054) to the ventilator 410.

The first open end 440 has at least one outlet or first opening 446 that is in fluid communication with the interior through-channel 432 of the ventilation pipe 400. The first open end 440 of the ventilation pipe 400 is positioned proximal to the exhaust holes 1553 (see FIGS. 40 and 41) of the manhole cover 1530 (e.g., at its bottom side 1519) such that there is fluid communication between the interior through-channel 432 of the ventilation pipe 400 and the exhaust hole 1553 (via the first opening(s) 446).

The second open end 442 of the ventilation pipe 400 is positioned in the main chamber 52 of the vault 12. The ventilation pipe 400 has at least one intake or second opening 448 in fluid communication with both the internal atmosphere 104 (see FIG. 3) and the interior through-channel 432. In the embodiment illustrated, the second opening 448 includes the opening of the interior through-channel 432 defined by the wall(s) 430 at the second open end 442 of the ventilation pipe 400. Optionally, the second opening(s) 448 may include one or more holes formed in the wall(s) 430 of the ventilation pipe 400 and located proximal to the second open end 442. The ventilation pipe 400 may be configured to position its second open end 442 and/or at least one second opening 448 at any desired vertical position or level within the vault 12. For example, the ventilation pipe 400 may also be configured to draw the gaseous composition 106 (see FIG. 3) from any desired point(s) (e.g., lower levels of the main chamber 52) within the vault 12.

Referring to FIG. 39, the second open end 442 may be positioned near (e.g., at a predetermined distance from) the floor 58. In this manner, the ventilator 410 may remove air from the vault 12 near the floor 58, which will circulate a portion of the internal atmosphere 104 (see FIG. 3) near the floor 58. By way of a non-limiting example, the second opening 448 may be positioned at a location between about one foot above the floor 58 and substantially at floor level. When the second opening 448 is substantially at floor level, a sufficient gap may be provided between the second opening 448 and the floor 58 to allow air to flow into and/or out of the second opening 448.

Of course, one of ordinary skill in the art will appreciate that the above exemplary values for placement of the second opening(s) 448 of the ventilation pipe 400 may vary according to one or more factors, e.g., vault dimensions, nature of gases likely to be encountered, environmental parameters, floor profile, vault shape, and equipment located within the vault. One of ordinary skill in the art can determine suitable (e.g., optimal) placement of the second opening(s) 448 for a given situation by applying ordinary skill in the art to the present teachings.

Figure 51:
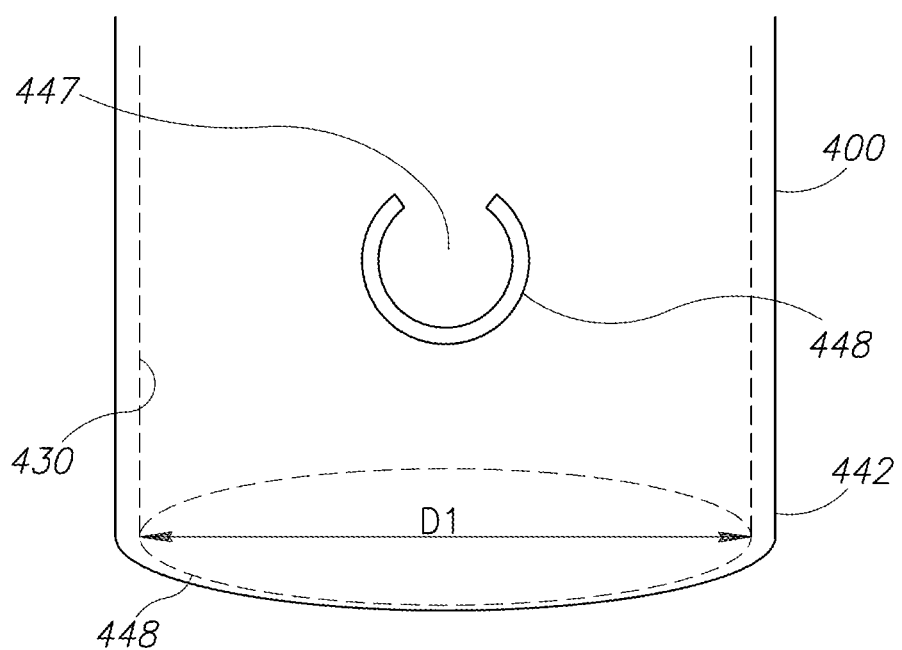
FIG. 51 is a side perspective view of an exemplary implementation of an open second end of the ventilation pipe of the circulation system.

Optionally, referring to FIG. 51, the second opening(s) 448 may include one or more holes formed in the wall(s) 430 of the ventilation pipe 400 and located proximal to the second open end 442. In embodiments in which at least some of the second opening(s) 448 are formed in the wall(s) 430, the second open end 442 of the ventilation pipe 400 may be completely or partially closed (or blocked). Those of the second opening(s) 448 formed in the wall(s) 430 may be generally circular. In such embodiments, the second opening (s) 448 may have a diameter that is less than a predetermined percentage (e.g., about 5% or about 10%) of the inner diameter D1 of the ventilation pipe 400. Those of the second opening(s) 448 that extend laterally through one of the wall(s) 430 may be at least partially covered or blocked by a flap portion 447 (defined in one of the wall(s) 430). Those of the second opening(s) 448 formed in the wall(s) 430 that are positioned above water partially filling the vault 12 (see FIGS. 39 and 45A) allow the internal atmosphere 104 (see FIG. 3) to enter the ventilation pipe 400 and/or the external atmosphere 102 (see FIG. 3) to exit the ventilation pipe 400 therethrough. Optionally, the second opening(s) 448 may be positioned in proximity to electrical equipment (e.g., the equipment 84 illustrated in FIG. 3) to enhance cooling within the vault 12.

The section P1 may have a tapered shape and may be constructed from a rigid material (e.g., metal, fiberglass, PVC, and the like). The section P2 may have a generally cylindrical shape. In the implementation illustrated, the section P2 is flexible and optionally configured to collapse (or function like a bellows) to be compacted (or collapsed) during installation, transport, and/or removal. For example, the portion P2 may be collapsed to a relatively short length by hooking onto the second open end 442 (e.g., using a hook attached to a line or pole) and lifting the second open end 442 upwardly. The section P2 may be constructed from a durable fabric (e.g., neoprene coated polyester) that is chemically resistant, UV resistant, steam resistant, non-conductive, and/or water proof. The section P2 may be durable enough to withstand being dragged across the surface 30 and dropped thereupon.

In this embodiment, referring to FIG. 45A, the first open end 440 (which is positioned on an upper end of the section P1) is coupled to the support bracket assembly 960 (that is attached to the ring support 250G). In the embodiment illustrated, the first open end 440 is clamped (e.g., by a band or pipe clamp 1050) to the support bracket assembly 960.

Ventilator Assembly

Figure 46:
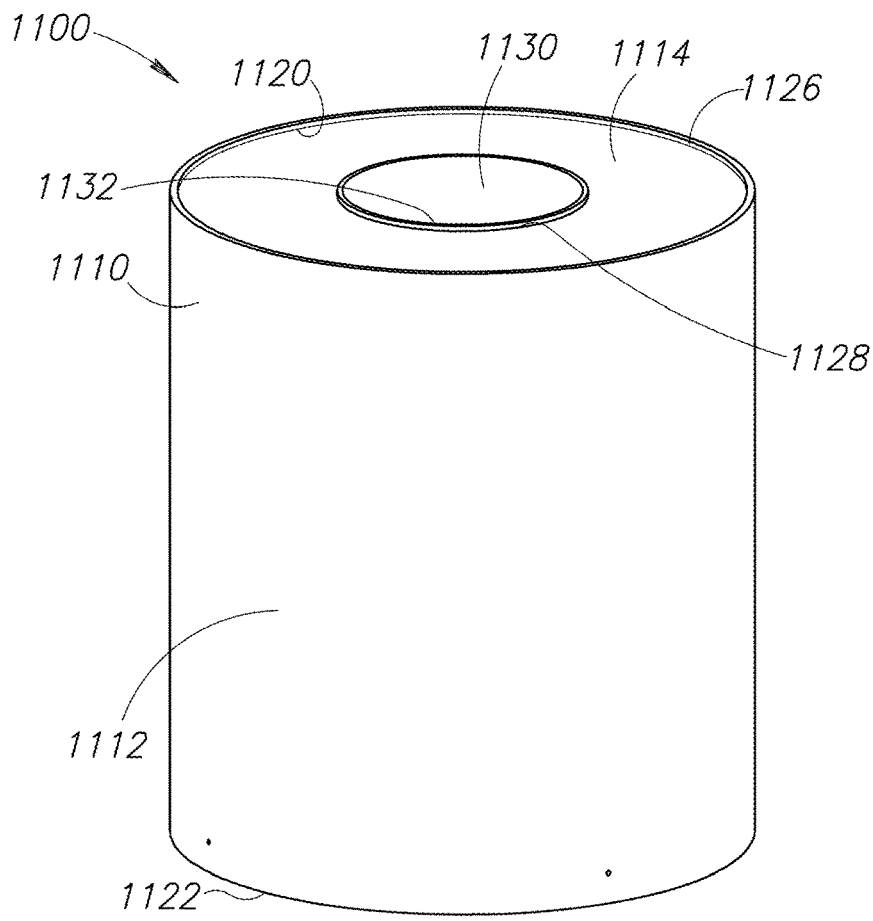
FIG. 46 is a perspective view of the ventilator assembly of the circulation system of FIG. 39.

Referring to FIG. 39, as mentioned above, in the circulation system 1500, the ventilator 410 may be implemented as the ventilator assembly 1100 illustrated in FIG. 46. Referring to FIG. 46, the ventilator assembly 1100 may be oriented to blow air from the external atmosphere 102 (see FIG. 3) into the internal atmosphere 104 (see FIG. 3) or vice versa.

As shown in FIG. 46, the ventilator assembly 1100 has an outer housing 1110 formed by a substantially hollow outer housing body 1112 and a housing cover 1114. The outer housing body 1112 has an open first end 1120 opposite an open second end 1122. Referring to FIG. 49, the open first and second ends 1120 and 1122 (see FIGS. 46 and 49) are each connected to the ventilation pipe 400 and in fluid communication with the interior through-channel 432 of the ventilation pipe 400. The open first end 1120 may be inserted inside the lower end 401 of the section P1 and coupled thereto by the pipe clamp 1052. Similarly, the open second end 1122 may be inserted inside the upper end 403 of the section P2 and coupled thereto by the pipe clamp 1054. In the embodiment illustrated, the outer housing body 1112 has a generally cylindrical outer shape with a generally circular cross-sectional shape.

Referring to FIG. 46, in the embodiment illustrated, the housing cover 1114 is generally planar and ring shaped. The housing cover 1114 is coupled to and partially closes the open first end 1120 of the outer housing body 1112. An airtight seal may be formed along a peripheral edge 1126 of the housing cover 1114 between the housing cover 1114 and the open first end 1120 of the outer housing body 1112. The housing cover 1114 has a central opening 1128.

An inner housing body 1130 extends into the outer housing body 1112 from the housing cover 1114. Referring to FIG. 49, the inner housing body 1130 has an open first end 1132 positioned inside the central opening 1128 of the housing cover 1114 and an open second end 1134 opposite the open first end 1132 positioned inside the outer housing body 1112. An airtight seal may be formed between the open first end 1132 of the inner housing body 1130 and the housing cover 1114 along the central opening 1128. In the embodiment illustrated, the inner housing body 1130 has a generally cylindrical outer shape with a generally circular cross-sectional shape. The open first end 1132 is in fluid communication with the interior through-channel 432 of the ventilation pipe 400.

Figure 47:
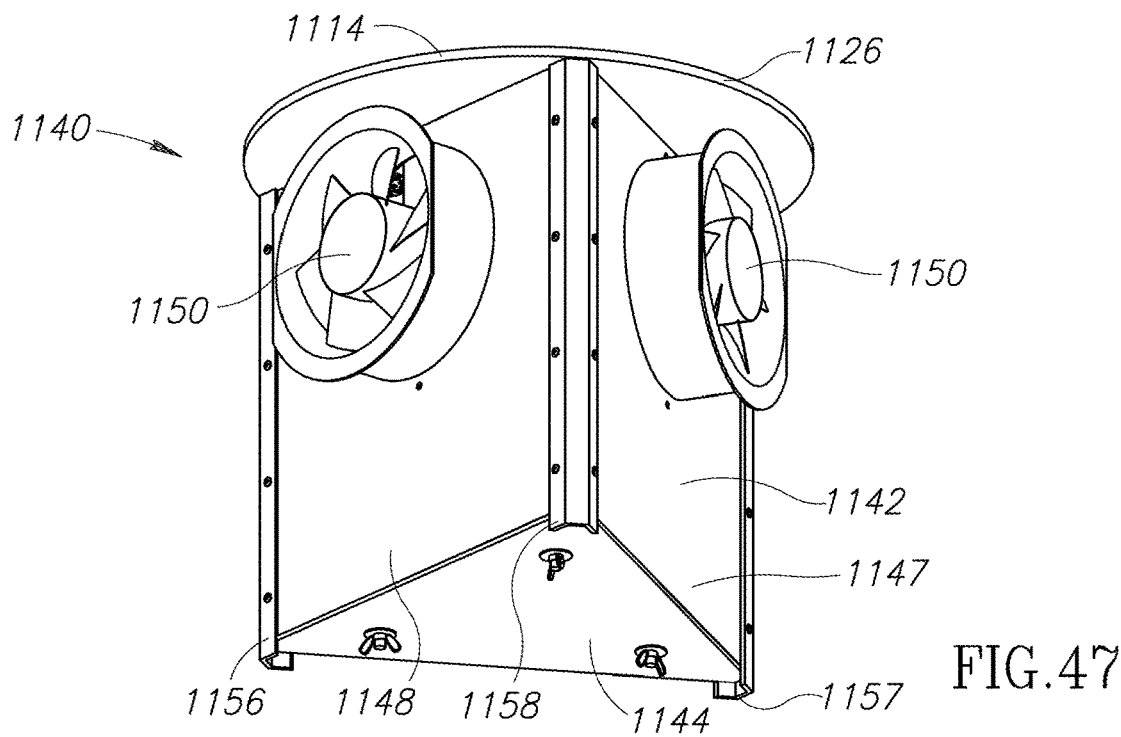
FIG. 47 is a perspective view of a fan assembly of the ventilator assembly of FIG. 46.

The ventilator assembly 1100 has a fan assembly 1140 housed inside the outer housing 1110. The fan assembly 1140 may be configured to generate sufficient airflow to completely replace the internal atmosphere 104 (see FIG. 3) with a portion of the external atmosphere 102 (see FIG. 3) within a predetermined amount of time (e.g., one day or one hour). Referring to FIG. 47, the fan assembly 1140 includes a fan housing 1142, a cover 1144, and one or more fan(s) 1150.

Figure 48:
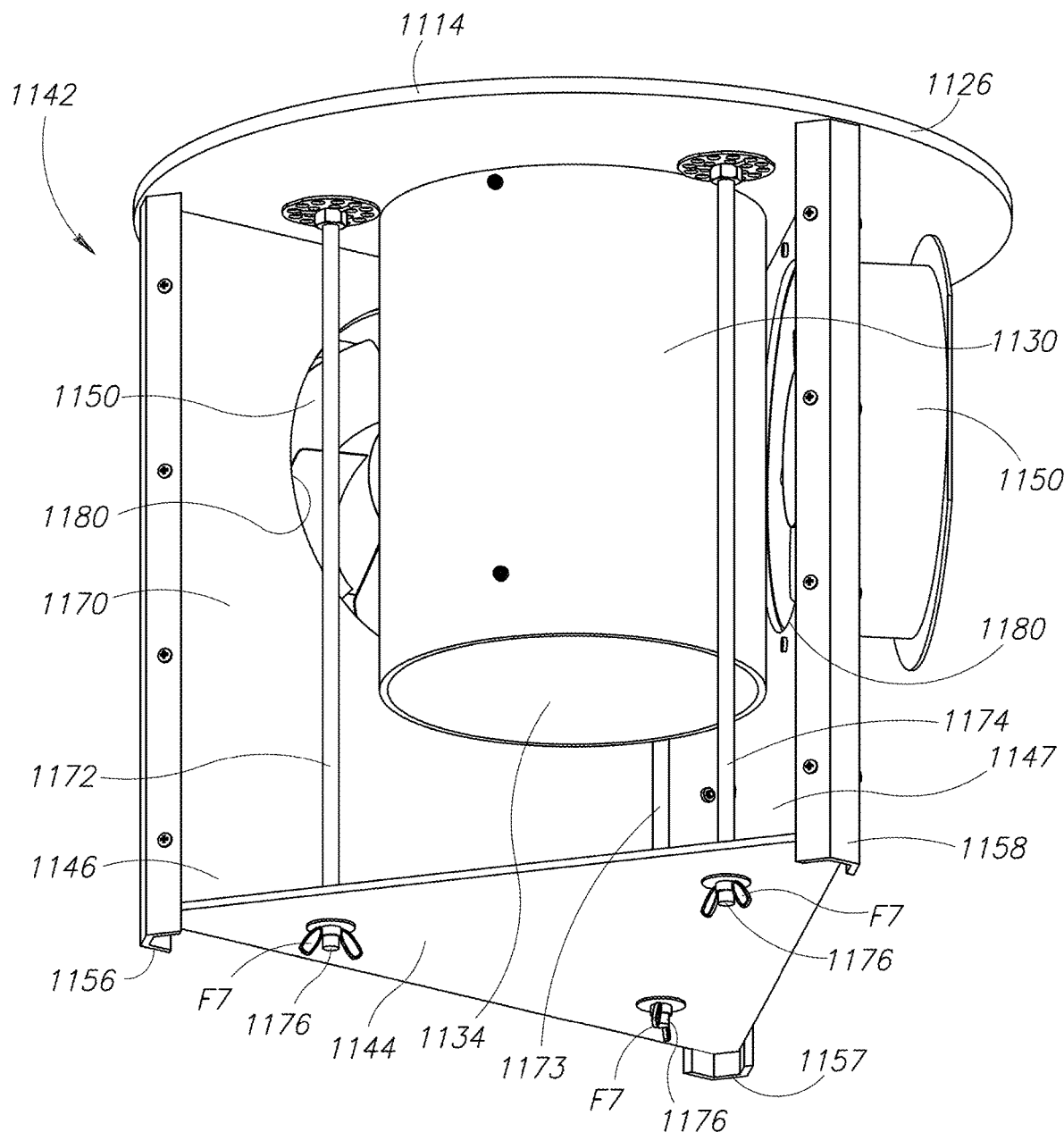
FIG. 48 is a perspective view of the fan assembly of FIG. 47 with one of its panels removed to reveal structures inside the fan assembly.
Figure 49:
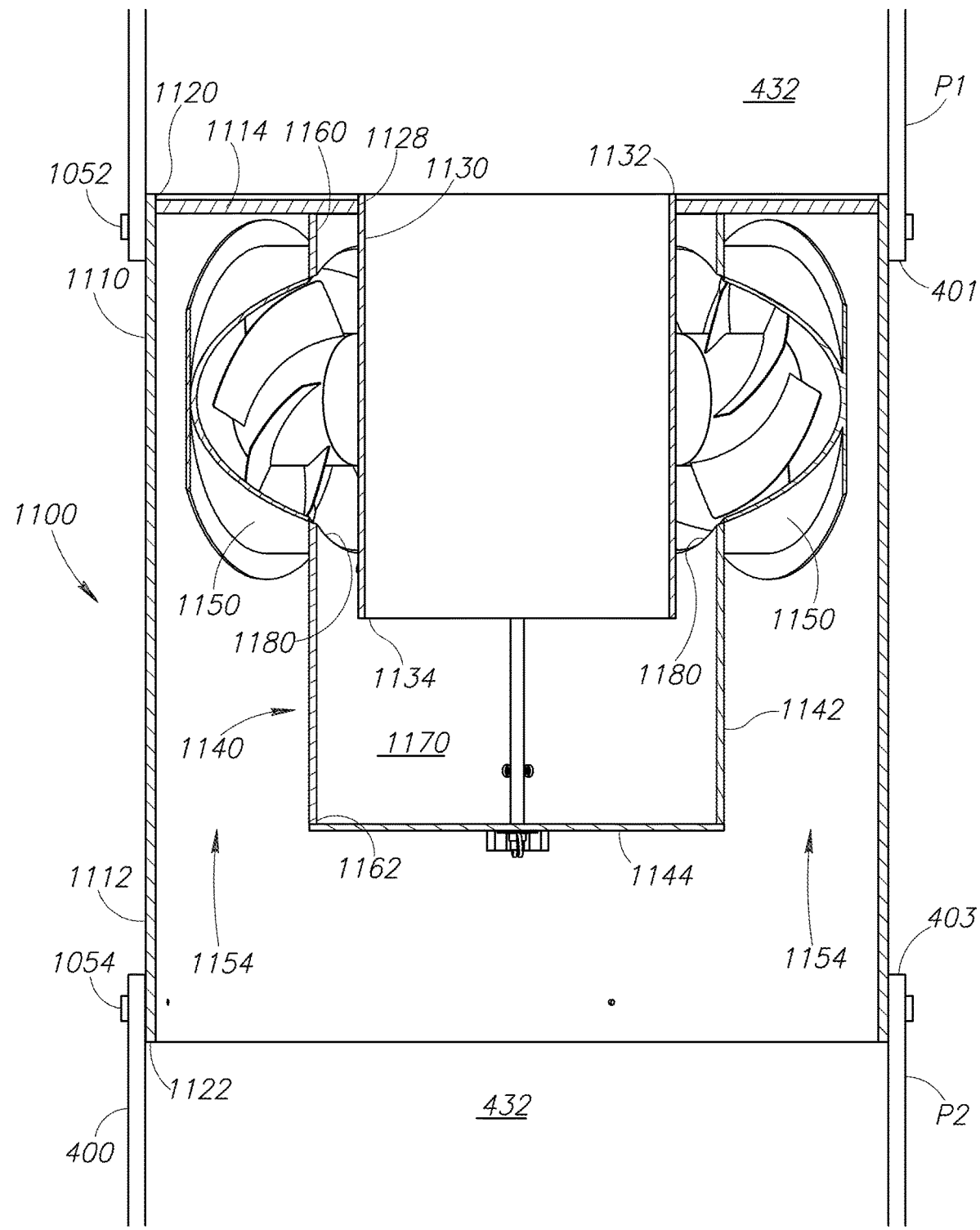
FIG. 49 is a cross-sectional view of the ventilator assembly.
Figure 50:
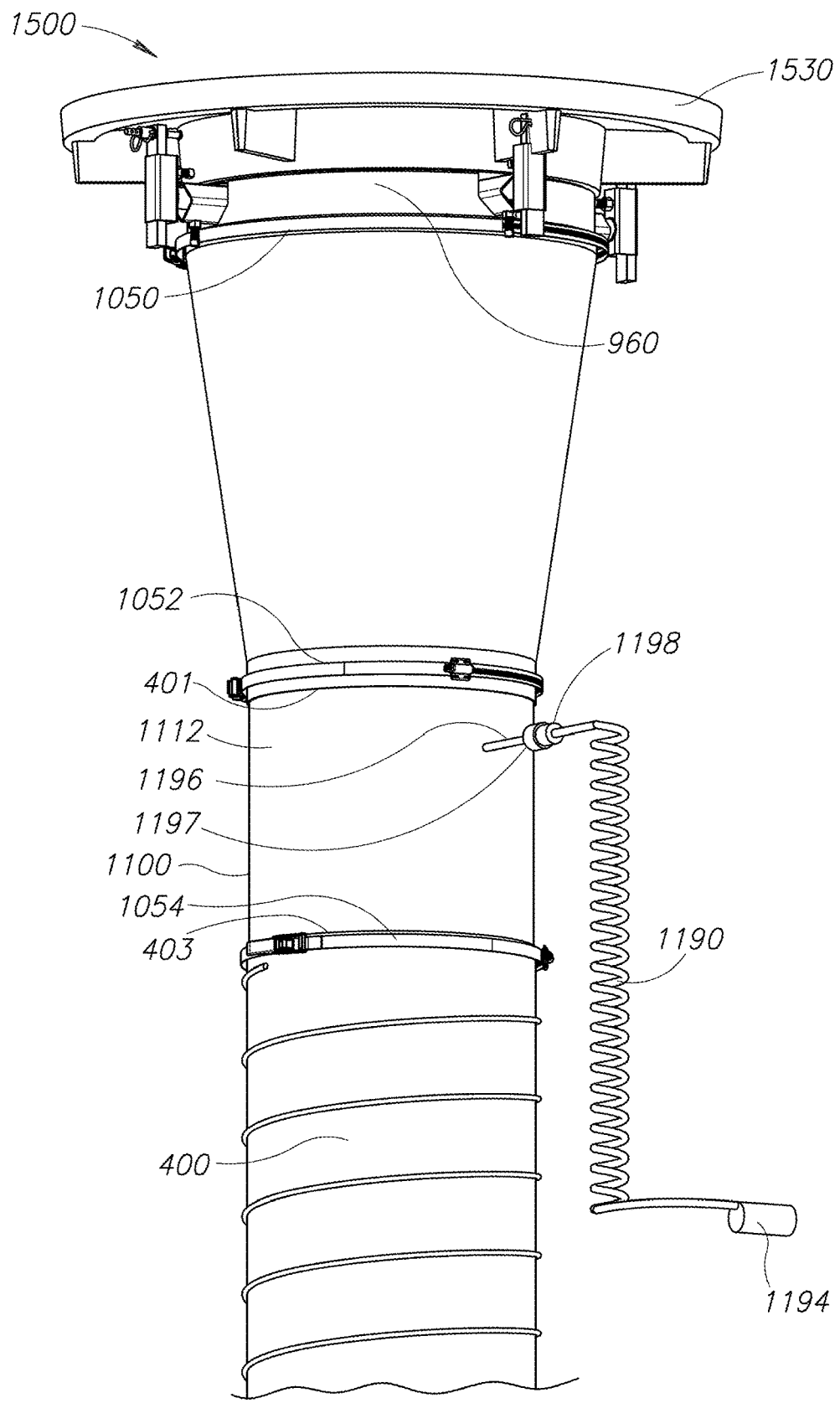
FIG. 50 is a side view of the circulation system of FIG. 39.

Referring to FIG. 49, the fan housing 1142 is positioned inside the outer housing body 1112 with one or more vertical air channels 1154 defined therebetween. Referring to FIG. 48, in the embodiment illustrated, the fan housing 1142 has a generally triangular cross-sectional shape defined by substantially planar panels 1146, 1147, and 1148 (see FIG. 47) coupled together along their edges by brackets 1156, 1157, and 1158. Referring to FIG. 49, as mentioned above, the outer housing body 1112 may have a circular cross-sectional shape. Thus, in the embodiment illustrated, the fan housing 1142 has a different cross-sectional shape than the outer housing body 1112. However, this is not a requirement.

The fan housing 1142 has an open first end 1160 opposite an open second end 1162. The open first end 1160 may be immediately adjacent the housing cover 1114. The housing cover 1114 protects or shields the fan(s) 1150 from debris and water falling through the ventilation pipe 400 from above the ventilator assembly 1100.

The inner housing body 1130 extends downwardly through the open first end 1160 part way through the fan housing 1142. The cover 1144 is coupled to and closes the open second end 1162 of the fan housing 1142. Thus, an internal chamber 1170 is defined within the fan housing 1142. The outer housing body 1112 extends beyond the inner housing body 1130 to position the open second end 1122 of the outer housing body 1112 away from the cover 1144.

Referring to FIG. 48, in the embodiment illustrated, rods 1172-1174 extend downwardly from the housing cover 1114 and through the internal chamber 1170. Distal ends 1176 of the rods 1172-1174 pass through the cover 1144. Fasteners F7 (e.g., wingnuts) are attached to (e.g., threaded onto) the distal ends 1176 and removably couple the cover 1144 in place.

One or more through-holes 1180 are formed in the fan housing 1142 between its open first and second ends 1160 and 1162. In the embodiment illustrated, a different through-hole 1180 has been provided for each fan 1150. Referring to FIG. 49, each fan 1150 is mounted on the fan housing 1142 and positioned to blow air into (or from) the internal chamber 1170 through the through-hole(s) 1180. In other words, referring to FIG. 49, the fan(s) 1150 effect an air exchange between the air channels 1154 and the internal chamber 1170. This air exchange causes air to flow into (or from) the open second end 1134 of the inner housing body 1130, which causes air exchange between the inner housing body 1130 and the interior through-channel 432 of the ventilation pipe 400 (via the open first end 1132 of the inner housing body 1130).

Referring to FIG. 39, when the fan assembly 1140 (see FIGS. 47 and 49) is blowing air (as exhaust) from the main chamber 52 of the vault 12, a portion ("exhausted air") of the internal atmosphere 104 (see FIG. 3) inside the main chamber 52 is pulled into the second opening 448 of the ventilation pipe 400. Referring to FIG. 49, the exhausted air flows into the open second end 1122 of the outer housing body 1112 from the ventilation pipe 400 (e.g., via the upper end 403 of the section P2), travels through the air channels 1154, and is blown by the fan(s) 1150 through the through-holes 1180 into the internal chamber 1170. Next, the exhausted air enters the open second end 1134 of the inner housing body 1130, flows therethrough, and exits its open first end 1132 into the ventilation pipe 400 (e.g., into the lower end 401 of the section P1). From that point, referring to FIG. 21A, the exhausted air travels through the exhaust holes 1553 in the manhole cover 1530 and into the external atmosphere 102 (see FIG. 3).

Referring to FIG. 49, the ventilator assembly 1100 illustrated may be characterized as implementing a diving bell that helps protect the fan(s) 1150 when the vault 12 (see FIG. 39) is at least partially filled with water. Air inside the outer housing body 1112 may exit therefrom through either the inner housing body 1130 or the open second end 1122 of the outer housing body 1112. Thus, when both the open second end 1122 of the outer housing body 1112 and the open second end 1134 of the inner housing body 1130 are submerged in water, any air trapped between the housing cover 1114, the inner housing body 1130, and the outer housing body 1112 cannot escape from inside the ventilator assembly 1100. Because the open second end 1134 of the inner housing body 1130 is positioned below the fan(s) 1150, the fan(s) 1150 are positioned within the trapped air and protected from being fully submerged in the event of a flood. Thus, expensive submersible fans are not required to implement the ventilator assembly 1100. Also, a complicated control system is not needed to shut-off the fan(s) 1150 during a flood event when the water reaches the ventilator assembly 1100.

While the ventilator assembly 1100 has been illustrated as including multiple fans 1150, some implementation may include a single fan. Further, while each fan 1150 has been illustrated as being an axial fan that uses blades (or propellers) to move air, alternate types of fans (e.g., centrifugal fans, radial fans, in-line radial fans, etc.) could be used. The fan(s) 1150 may be selected based on compatibility with the operating environment (which may include water, salt, steam, freezing temperatures, petrochemical exposure, life expectancy, spark-less motor, explosion proof, etc.) inside the vault 12 (see FIG. 39). The fan(s) 1150 may be IP55 rated, dust protected, and/or water-jet protected. It may be desirable to implement the fan(s) 1150 with fans configured to have a working lifespan of at least a predetermined duration (e.g., about 50,000 hours) and/or to operate within a predetermined temperature range (e.g., about −30° C. to about 80° C.).

The fan(s) 1150 may be powered by alternating current ("AC"). By way of non-limiting examples, the fan(s) 1150 may be configured to operate within a voltage range of 100 VAC to 120 VAC, 200 VAC to 240 VAC, or 440 VAC to 480 VAC. When the fan assembly 1140 includes multiple fans 1150, they may be implemented as redundant fans powered by alternating current ("AC") in parallel. Alternatively, direct current ("DC") or three-phase AC power may be used to power the fan(s) 1150.

Referring to FIG. 50, power may be supplied to the ventilator assembly 1100 by a connection 1190 to a power source. The power source may be the cable 110 (see FIG. 3), which may be configured to deliver 120 VAC, 240 VAC, or 480 VAC. In such implementations, the connection 1190 may include a splice 1194 onto the cable 110 (see FIG. 3) or an inductive coil positioned alongside the cable 110. Alternatively, if the vault 12 includes the wall plug/receptacle (not shown), the connection 1190 may simply include a conventional power cord with a plug configured to mate with and receive power from the plug/receptacle. By way of another non-limiting example, the connection 1190 may draw parasitic power if no service voltage is available in the vault 12. The outer housing body 1112 may provide connection points for the connection 1190.

In the embodiment illustrated in FIG. 50, the fan(s) 1150 (see FIGS. 47-49) are connected to and receive power via a wire or cord 1196 that extends outwardly from the outer housing body 1112 and terminates at a plug or power receptacle 1197. Alternatively, the cord 1196 may be housed inside the outer housing body 1112 and the power receptacle 1197 may be mounted on the outer housing body 1112. The connection 1190 has a plug 1198 configured to mate with and supply power to the power receptacle 1197. The connection 1190 receives power from the splice 1194 connected to the cable 110 (see FIG. 3).

Referring to FIG. 50, the worker 61 (see FIGS. 1 and 3) may manually connect the plug 1198 of the connection 1190 to the power receptacle 1197. Optionally, one or both of the plug 1198 and the power receptacle 1197 may be magnetic to help maintain the connection therebetween and facilitate connecting the two components together.

The circulation system 1500 may be used to pull air from neighboring vault(s) 14 illustrated in FIG. 1 (via the conduits 20A-20C) and/or push air into the neighboring vault(s) 14 (via the conduits 20A-20C). Thus, the circulation system 1500 need not be installed in every vault within a system (e.g., the system 10 illustrated in FIG. 1) to reduce manhole events.

Referring to FIG. 21A, while the ventilator 410 of the circulation system 1500 has been illustrated as being implemented by the ventilator assembly 1100 (see FIGS. 46 and 50), the ventilator 410 may alternatively be implemented by an in-line heater. By way of additional non-limiting examples, the ventilator 410 may be implemented as a forced convection device, a powered bellows, a compressor, a piston pump, a piston ventilator, an in-line pump, a fan, a blower, a cartridge heater, a coil heater, or a heat-generating device configured to provide passive heating, such as a transformer, generator, compressor, and the like. It is also contemplated that a redundant system employing more than one type of air moving device may be advantageous in particularly critical applications. Further, more than one air moving device of the same type may be used.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for use with a manhole vault containing an alternating current ("AC") power source and manhole air, the manhole vault comprising a neck that extends from a manhole to a main chamber, the system comprising:
   a ventilation pipe configured to extend from the neck into the main chamber; and
   an electric powered air-moving device configured to be positioned entirely inside the manhole vault and powered by the AC power source inside the manhole vault, the electric powered air-moving device being configured to circulate the manhole air inside the manhole vault and exchange the manhole air with fresh air outside the manhole vault, the exchange causing at least one undesired gas inside the manhole vault to flow into the fresh air thereby reducing a concentration of the at least one undesired gas inside the manhole vault, the reduced concentration reducing a frequency or a severity, or both the frequency and the severity of manhole events occurring in the manhole vault or at least one neighboring manhole vault, each of the manhole events comprising smoke generation, a fire, an explosion, or a combination thereof, the main chamber having a ceiling, the electric powered air-moving device being positioned connected to the ventilation pipe at a location that positions the air-moving device at least partially below the ceiling of the main chamber when circulating the manhole air inside the manhole vault.

2. The system of claim 1, further comprising:
   a manhole cover configured to be positioned in the manhole, the manhole cover comprising at least one through-hole, at least a portion of the manhole air circulated by the electric powered air-moving device exiting the manhole vault via the at least one through-hole when the manhole cover is positioned in the manhole.

3. The system of claim 2, wherein each of the at least one through-hole has a diameter of ¼ inch or ⅛ inch.

4. The system of claim 2, wherein each of the at least one through-hole is a slot.

5. The system of claim 2, further comprising:
   a membrane positioned adjacent the at least one through-hole, the membrane being configured to allow the portion of the manhole air circulated by the electric powered air-moving device to exit therethrough and prevent water from flowing therethrough.

6. The system of claim 5, further comprising:
   a grate positioned on top of the membrane, the membrane being positioned on top of the manhole cover.

7. The system of claim 5, wherein the membrane is constructed from microporous polytetrafluoroethylene.

8. The system of claim 2, wherein the at least one through-hole is configured to allow at least a portion of the fresh air to enter the manhole vault via the at least one through-hole.

9. The system of claim 1 for use with the manhole vault comprising a ventilation stack, wherein at least a portion of the manhole air circulated by the electric powered air-moving device enters the manhole vault via the ventilation stack.

10. The system of claim 1, wherein the electric powered air-moving device is a blower.

11. The system of claim 1, further comprising:
    a manhole cover comprising a check valve component.

12. The system of claim 11, wherein the check valve component is configured to open when pressure inside the manhole vault exceeds a predetermined amount.

13. The system of claim 11, wherein the check valve component is configured to open when an automobile passes over the manhole cover and pressure above the manhole vault drops.

14. The system of claim 1, further comprising:
    a manhole cover; and
    a pump assembly formed in the manhole cover, the pump assembly being configured to expel a portion of the manhole air into the fresh air when pressed upon with a sufficient amount of force.

15. The system of claim 1, further comprising:
    a manhole cover comprising at least one through-hole and an air scoop component, the air scoop component being configured to direct wind into the at least one through-hole of the manhole cover.

16. The system of claim 1, further comprising:
    a ventilation stack comprising a channel having a first open end and a second open end, the first open end opening into the manhole vault; and
    a wind catcher configured to direct wind into the second open end of the channel, the channel conducting the wind into the manhole vault.

17. The system of claim 16, wherein the wind catcher is rotatable with respect to the ventilation stack, and
    the wind catcher comprises a wind vane configured to rotate the wind catcher with respect to the ventilation stack to catch the wind.

18. The system of claim 1, wherein the main chamber has a floor and a lower portion adjacent to the floor, and the system further comprises:
    a duct having a first open end adjacent to the electric powered air-moving device and a second open end positioned in the lower portion of the manhole vault, the duct being configured to channel air toward the lower portion of the manhole vault, over equipment inside the manhole vault to improve cooling, away from the lower portion of the manhole vault, or a combination thereof.

19. The system of claim 1, wherein the electric powered air-moving device comprises one or more fans.

20. The system of claim 1, wherein the electric powered air-moving device is a heater.

21. A system for use with a manhole vault containing manhole air and a portion of an electrical cable carrying alternating current ("AC"), the system comprising:

an electric powered air-moving device configured to be positioned entirely inside the manhole vault, the electric powered air-moving device comprising a connection configured to receive AC power from a splice that is connected to the electrical cable inside the manhole vault, the electric powered air-moving device being powered by the AC power drawn from the electrical cable, the electric powered air-moving device being configured to circulate the manhole air inside the manhole vault and exchange the manhole air with fresh air outside the manhole vault, the exchange causing at least one undesired gas inside the manhole vault to flow into the fresh air thereby reducing a concentration of the at least one undesired gas inside the manhole vault.

22. The system of claim 21, further comprising:
a manhole cover comprising at least one through-hole, at least a portion of the manhole air circulated by the electric powered air-moving device exiting the manhole vault via the at least one through-hole.

23. The system of claim 22, wherein at least a portion of the fresh air enters the manhole vault via the at least one through-hole.

24. The system of claim 21, wherein the electric powered air-moving device is a blower.

25. The system of claim 21, wherein the electric powered air-moving device comprises one or more fans.

26. The system of claim 21, wherein the electric powered air-moving device is a heater.

27. A system for use with a manhole vault containing manhole air and a portion of an electrical cable carrying alternating current ("AC"), the system comprising:

an inductive coil configured to be positioned inside the manhole vault and alongside the electrical cable; and an electric powered air-moving device configured to be positioned entirely inside the manhole vault, connected to the inductive coil inside the manhole vault, and powered by AC power drawn from the inductive coil, the electric powered air-moving device being configured to circulate the manhole air inside the manhole vault and exchange the manhole air with fresh air outside the manhole vault, the exchange causing at least one undesired gas inside the manhole vault to flow into the fresh air thereby reducing a concentration of the at least one undesired gas inside the manhole vault.

28. The system of claim 27, further comprising:
a manhole cover comprising at least one through-hole, at least a portion of the manhole air circulated by the electric powered air-moving device exiting the manhole vault via the at least one through-hole.

29. The system of claim 28, wherein at least a portion of the fresh air enters the manhole vault via the at least one through-hole.

30. The system of claim 27, wherein the electric powered air-moving device is a blower.

31. The system of claim 27, wherein the electric powered air-moving device comprises one or more fans.

32. The system of claim 27, wherein the electric powered air-moving device is a heater.

* * * * *